United States Patent [19]
Sankrithi

[11] Patent Number: 5,404,868
[45] Date of Patent: Apr. 11, 1995

[54] APPARATUS USING A BALLOON SUPPORTED REFLECTIVE SURFACE FOR REFLECTING LIGHT FROM THE SUN

[75] Inventor: Mithra M. K. V. Sankrithi, Bellevue, Wash.

[73] Assignee: Vedanta Society of Western Washington, Seattle, Wash.

[21] Appl. No.: 861,031

[22] Filed: Mar. 31, 1992

[51] Int. Cl.6 .......................... E05F 15/20; F24J 3/02
[52] U.S. Cl. .................................. 126/604; 126/696; 126/697
[58] Field of Search ............... 126/696, 697, 684, 600, 126/604, 607

[56] References Cited

U.S. PATENT DOCUMENTS

| | | | |
|---|---|---|---|
| 3,125,091 | 3/1964 | Sleeper | 126/697 |
| 3,182,654 | 5/1965 | Culling | 126/697 |
| 4,002,032 | 1/1977 | Bash | 126/697 X |
| 4,002,158 | 1/1977 | Radebold | 126/270 |
| 4,166,446 | 9/1979 | Youngs | 126/696 X |
| 4,491,125 | 1/1985 | Sainsbury | 126/697 X |
| 4,581,897 | 4/1986 | Sankrithi | 60/641.12 |
| 4,870,949 | 10/1989 | Butler | 126/690 X |
| 4,930,493 | 6/1990 | Sallis | 126/696 X |

FOREIGN PATENT DOCUMENTS

| | | | |
|---|---|---|---|
| 0030193 | 6/1981 | European Pat. Off. | 126/697 |
| 2300913 | 10/1976 | France | |
| 2604345 | 8/1977 | Germany | 126/697 |
| 2748645 | 5/1979 | Germany | |
| 2754114 | 6/1979 | Germany | |
| 2830335 | 1/1980 | Germany | |
| 0071905 | 12/1983 | Sweden | 126/697 |

OTHER PUBLICATIONS

Design and ... Heliostat, Solar Kinetics, Inc. Dec. 1989.
An Assessment ... Mirror Modules, Houser et al. Feb. 1990.
Selection ... For Today's Markets, Beninga et al., Jan. 1990.
Stretch Membrane ... Power Plants, Alpert et al., 1989.
Status ... Heliostats, Houser et al., 1990.
Technical ... Membrane Heliostats, May 1983.

Primary Examiner—Edward K. Look
Assistant Examiner—Hoang Nguyen

[57] ABSTRACT

The invention provides a family of apparatus using a balloon supported reflective surface for reflecting light from the Sun. A basic embodiment of such an apparatus is a light weight, low cost heliostat using a balloon supported reflective surface. Another embodiment is a solar power concentration apparatus using multiple heliostats with balloon supported reflective surfaces. Yet another embodiment is a solar electric power apparatus, also using multiple heliostats with balloon supported reflective surfaces. Variant embodiments of these apparatus can be sited on land or water surfaces or in the air or in space.

61 Claims, 53 Drawing Sheets

Fig. 17A.
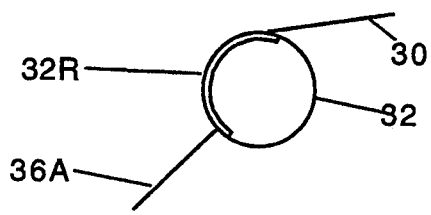
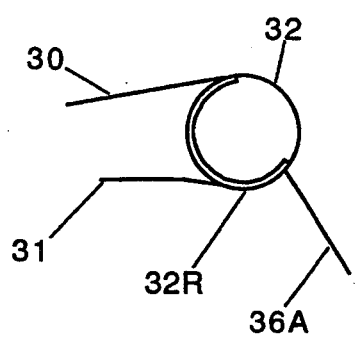
Fig. 17B.
Fig. 17C.
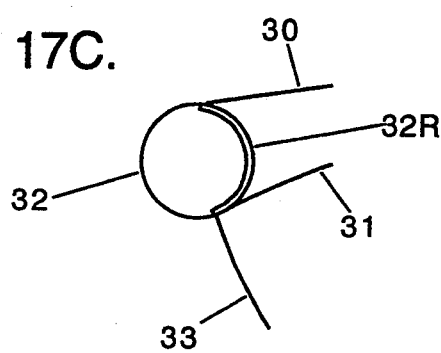
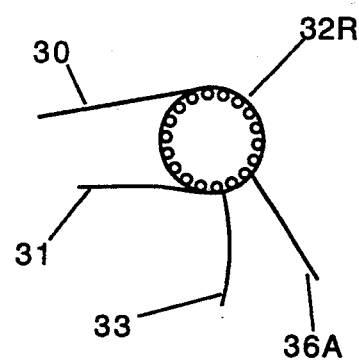
Fig. 17D.
Fig. 17E.
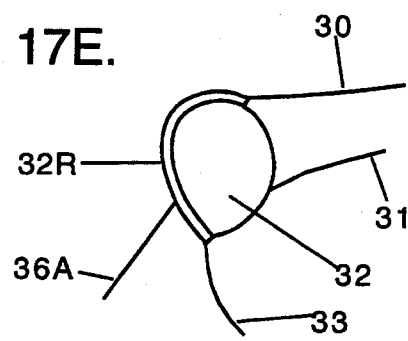

APPARATUS USING A BALLOON SUPPORTED REFLECTIVE SURFACE FOR REFLECTING LIGHT FROM THE SUN

FIELD OF THE INVENTION

This invention relates to solar reflectors such as heliostats for reflecting incident solar radiation. The invention also relates to solar power concentration systems and to solar thermal electric power systems.

DISCUSSION OF PRIOR ART

Several types of solar power collection devices including solar thermal powerplants are prior art devices. One type of solar thermal powerplant focuses sunlight onto a central receiver element. The concentrated sunlight heats the receiver to a high temperature. The heat flux into the receiver can subsequently be used to drive a thermodynamic cycle powerplant, which in turn can drive an electric generator to generate electric power. Central receiver solar thermal powerplants, like the 10 MW proof-of-concept powerplant 'Solar One' which was built at Barstow, Calif., use a central receiver atop a tower structure, onto which sunlight is focused by a 'field' of many heliostats. The heliostats are mirrors, typically planar, which are made to change their orientation over time in such a manner as to continue to reflect incident sunlight onto the central receiver, even as the Sun executes its daily and seasonal apparent motions across the sky. The heliostats change orientation in two degrees of freedom (azimuth and elevation) in order to perform their intended function.

Heliostats typically are the single most expensive part of prior art solar thermal powerplants. The high relative expense of heliostats occurs because of the large reflective area needed for solar thermal powerplants, and despite the relatively unsophisticated technology involved in their design and manufacture. Prior art heliostats typically use large, heavy, and expensive glass mirrors. In addition to the glass mirror costs, there are the costs of the large and heavy mirror support structures needed to enable the mirrors to resist wind loads, and the cost of the mirror pointing control motors and system.

It has been recognized (reference 1) that heliostat costs need to be significantly reduced before central receiver solar thermal electric power generation becomes cost competetive relative to fossil fuel (e.g., coal, oil, or natural gas) driven electric power generation. Two of the more promising prior art approaches to designing lower cost heliostats involve either (i) the use of transparent covering structure over the heliostats to reduce wind loads the heliostat proper must sustain, or (ii) design of a heliostat with a circular stretched membrane reflector supported around its periphery by a rigid ring structure in circumferential compression (references 1,2). While these two approaches hold some promise for reducing heliostat cost, it is not yet known whether they will help enough to justify large scale construction of solar thermal powerplants in place of new fossil fuel (or possibly nuclear) powerplants.

OBJECTS OF THE INVENTION

It is an object of the invention to produce improved apparatus using balloon supported reflective surfaces for reflecting light from the Sun.

It is an object of the invention to provide improved heliostats for the reflection and subsequent collection of solar power for lighting, heating, and/or electric power generation.

It is an object of the invention to provide heliostats for solar power collection which are significantly lighter and less expensive than available in the prior art.

It is an object of the invention to provide low cost heliostats which are durable and easy to maintain.

It is an object of the invention to provide heliostats which can be built in a variety of sizes.

It is an object of the invention to provide heliostats which are easily transportable to site and erectable on site.

It is an object of the the invention to provide land-, water-, and air-supported heliostat embodiments.

It is an object of the invention to provide heliostats with light focusing capability.

It is an object of the invention to provide low cost heliostats of a type which can be used in large numbers (e.g., in arrays) to enable solar thermal powerplants to be cost competetive with other types of electric power generation powerplants.

It is the object of the invention to provide heliostats for space as well as terrestrial applications.

It is an object of the invention to provide an improved solar power concentration apparatus using multiple heliostats with balloon supported reflective surfaces.

It is an object of the invention to provide an improved solar electric power apparatus using multiple heliostats with balloon supported reflective surfaces.

Further objects and aims of the invention will become apparent from a complete consideration of the descriptive portion of this specification, drawings, and claims.

SUMMARY OF THE INVENTION

This invention provides a new and novel class of lightweight, low cost heliostats which are intended to very substantially reduce the cost of heliostats, solar power concentration systems, and solar thermal electric power systems. The invention is intended to provide the economic advantage necessary to motivate large scale construction of solar thermal powerplants in place of new fossil fuel or nuclear powerplants. A key feature of the invention is the use of at least one inflated balloon as a structural element for supporting and sustaining a heliostat's reflective surface element in its desired position and orientation. By using one or more inflated balloons as structural support elements, substantially rigid support structure can be made at low weight levels, even for large size structural elements. The low weight in turn should yield the advantage of low structural cost, to an extent partially depending upon the cost per unit weight of the materials utilized. Low structural cost should thence lead to the advantages of lowered heliostat and solar thermal powerplant costs, and to the advantage of improved solar thermal powerplant cost competetiveness relative to fossil fuel, nuclear, or other powerplant types.

The invention may also be applied to provide advantageous cost reductions to heliostats for heliostat applications other than solar thermal powerplants. Examples of other applications include solar furnaces, solar power concentration apparatus for heat generation, solar heat source for retorting of oil shale, solar evaporators or desalinators, solar daylighting applications, solar concentrators for lunar, planetary, and space applications, solar reflectors for space sited applications, and nonsolar optical trackers or concentrators.

In addition to heliostat weight and cost reduction, the invention is intended to provide advantages in terms of simplified heliostat construction (especially for large heliostats); ease in transportation to site and in movement and erection of heliostats; and potential improvements in heliostat durability, maintainability, repairability, and life.

The invention can also provide the advantage of improved reflector focusing by pressure differential shaping of the reflector, thereby enabling increased solar concentration to a smaller receiver or the use of fewer, larger heliostats for a fixed receiver size. Increased concentration of solar power and increased thermodynamic efficiency can thereby be achieved.

Further advantages of the invention will become apparent from a complete consideration of this specification and the accompanying drawings.

BRIEF DESCRIPTION OF THE DRAWINGS

FIGS. 17A through 17E illustrate semirigid toroidal balloon options.

DETAILED DESCRIPTION

Figure 1:
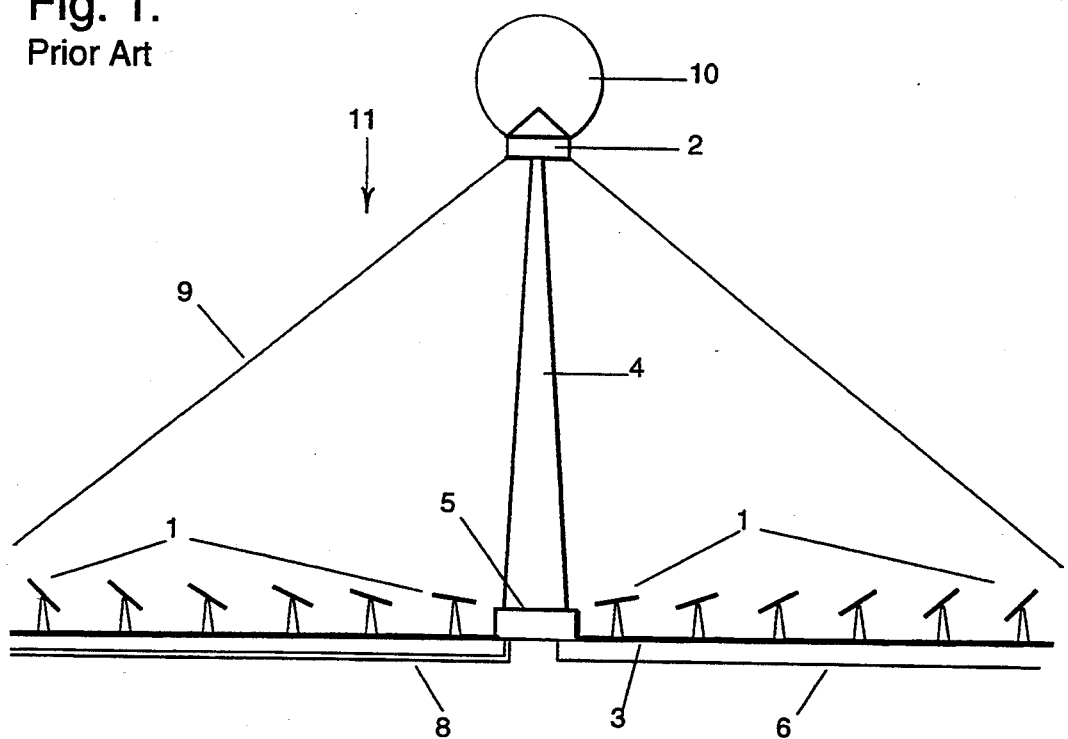
FIG. 1 shows a solar thermal powerplant with a field of heliostats reflecting incident solar radiation onto a solar receiver.

The detailed description will commence with definitions of the meanings certain words and expressions are to be understood to convey in the descriptive portion of this specification and in the appended claims.

The term heliostat is to be understood to mean a reflective surface or mirror which changes orientation to track an incident light beam from a light source (e.g., the Sun) with real and/or apparent motion relative to the reference frame in which a target region (and a solar receiver) is located, in such manner as to produce a reflected light beam (formed by reflection of the incident light beam by the reflective surface or mirror) which remains aimed at the target region despite the real and/or apparent motion of the incident light beam.

The term balloon is to be understood to mean an object with an enclosed volume and an enclosing surface which encloses the enclosed volume, wherein the enclosing surface is at least partially flexible, wherein the enclosed volume is occupied by a fluid (e.g., gas or liquid), and wherein incremental pressure of this enclosed fluid relative to the pressure distribution environment outside the enclosing surface contributes towards maintaining the balloon in its inflated configuration (i.e., substantially well defined inflated shape and size). A balloon may optionally incorporate shaping and/or rigidifying structural elements forming part of or connecting to the enclosing surface, in a manner analogous to the use of keel or lattice (e.g., frame and stringer) framework elements in prior art "semirigid" or "rigid" airships or dirigibles. A balloon can be a structural entity which is substantially rigid (and load-bearing) when inflated even if the balloon were semirigid or nonrigid prior to inflation.

Heliostats which have reflective surfaces which are supported by support means comprising an inflated balloon may also be referred to as "heliostats with balloon supported reflective surfaces" or "balloon supported heliostats" or simply "balloon heliostats."

The term tether is to be understood to mean a string-, rope-or cable-like or membrane-like object capable of sustaining tension loads while connecting two objects or elements and tending to pull these two objects or elements together by means of the aforesaid tension. Braided multifilament ropes or cables are also considered to be tethers under this definition.

The term toroidal is to be understood to apply to an object when that oject is toroidal (i.e., donut-like) in a general or topological sense. Note that a toroidal object does not necessarily need to have either circular symmetry or circular cross-section. Objects comprised of a plurality of elements making up a segmented toroid (e.g., circumferentially or cross-sectionally segmented) are also to be construed as toroidal objects.

The term computer refers to means for computing, and should be construed in the broadest sense to include a wide variety of devices including analog and/or digital electronic computing devices, electronic chips or cards, microprocessors, computational hardware, software, and "firmware", and means for computing using fluidic, mechanical, and/or optical principles.

Having defined certain words and expressions, it is appropriate to proceed with a detailed description of the preferred embodiments illustrated in the Figures.

FIG. 1 shows a sectional overview of a typical prior art solar thermal powerplant. A plurality of heliostats 1 (also referred to as a "field of heliostats") are reoriented in two degrees of freedom (azimuth and elevation) as a function of time-of-day and time-of-year so as to reflect incident solar radiation 11 (sunlight from the Sun) falling on said heliostats from a solar radiation incident direction which is a function of time-or-day and time-of-year, to a target region in which a solar receiver 2 is located. The combination of the plurality of heliostats and the solar receiver function as a solar power concentration apparatus. The target region is typically high above the ground surface 3, and the solar receiver 2 is typically supported at this high location by a tower 4. The tower may be a freestanding structure or may be braced against wind loads by guy wires or tethers 9. The weight of the solar receiver may optionally be partially or fully supported by an aerostat 10 (e.g., a Helium balloon). The use of aerostatic means for upholding a solar receiver has been described earlier in U.S. Pat. No. 4,581,897 to Mithra Sankrithi, entitled "Solar Power Collection Apparatus".

Concentrated solar power received at the solar receiver 2 may be used for heating or lighting purposes. For example, hot fluid heated by the incident solar power in the solar receiver may be taken out to provide heat to users via means for transmitting hot fluid 8 such as an insulated pipe. Alternatively or additionally, the solar power received may be used to supply power to an electricity generating powerplant 5. In this case the solar power concentration apparatus is a solar thermal powerplant, with an electricity generating powerplant 5 providing conversion means for converting at least a portion of the solar power received at the solar receiver into electric power. The electricity generating powerplant 5 will typically be a thermodynamic cycle (e.g., steam, Brayton cycle, or Rankine cycle) powerplant with electricity being generated by a solar heated working fluid driving a turbine generator apparatus.

The electricity generating powerplant may also incorporate electric power conditioning means for conditioning the electric power to have desirable transmission characteristics (e.g., DC or AC, voltage and phase characteristics, time variability, filtering and transient suppression). The conditioned electric power is taken from the powerplant by means for transmitting electric power 6 (e.g., high voltage powerlines), to ultimately feed into the electric power grid and provide electric power to industrial, commercial, residential, and/or other customers.

As already discussed, FIG. 1 shows means for transmitting hot fluid 8 in addition to the means for transmitting electric power 6. These means for transmitting hot fluid 8 can transmit fluid heated by the solar receiver 2 or use waste heat from the powerplant 5. The hot fluid is transmitted to heat-using customers or to a cooling facility (e.g., cooling tower(s)), and cooled fluid may be returned to the powerplant site. The heat can be used for a variety of purposes including industrial process heat application, and building heating or hot water supply for industrial, commercial, residential, or other buildings.

Figure 2:
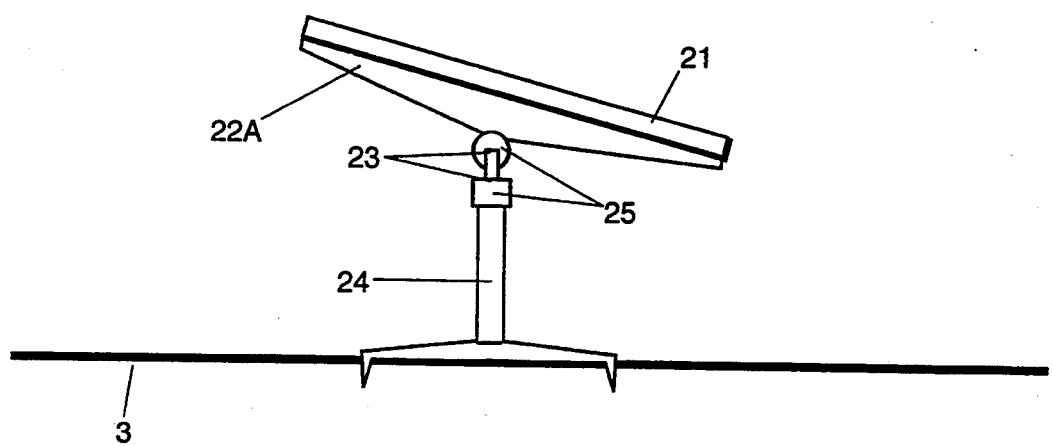
FIG. 2 shows a conventional glass mirror heliostat.

FIG. 2 illustrates a conventional heliostat 20A of the type typically used in prior art solar thermal powerplants. The heliostat comprises a conventional glass mirror 21, which is back-supported by mirror support structure 22A. The mirror support structure 22A in turn is supported through two-degree-of-freedom hinged attachment means 23 for attaching the mirror support structure 22A to a pedestal 24 affixed in the ground surface 3. Pointing control motors 25 provide precise pointing of the heliostat in its two degrees of freedom of motion (i.e., elevation and azimuth) as required for the heliostat to track the Sun's apparent motion and to continue to reflect incident solar radiation to the desired target (e.g., solar receiver) position even as the Sun executes its apparent motion.

Figure 3:
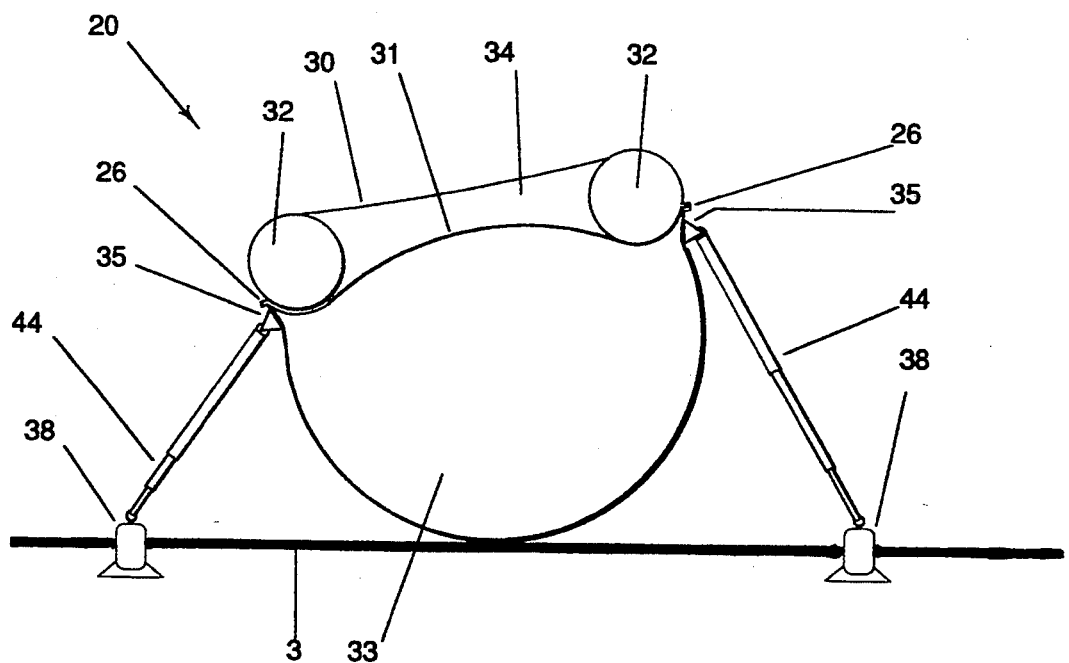
FIGS. 3, 4, 5A, 5B, 6A–C, 7A, 7B, 8A, 8B, 9A and 9B show embodiments of "balloon heliostats" which include a base balloon and a toroidal balloon.

FIG. 3 illustrates a sectional view of a basic preferred embodiment of a new and improved heliostat 20 provided by the invention. This new and improved heliostat 20 can also be considered as an apparatus using a balloon supported reflective surface for reflecting solar radiation from the Sun, and can be called a "balloon heliostat" for reasons which will become evident from the following decription.

The conventional glass mirror 21 of FIG. 2 is replaced in FIG. 3 by a reflective surface 30. The reflective surface 30 is supported around its periphery by a toroidal balloon 32. Note that the toroidal balloon obtains rigidity and stability through inflation. A preferably high superambient (inflation) pressure in the toroidal balloon produces an outward force which will react the tension load imposed by the reflective surface. The toroidal balloon 32 in turn is supported by a base balloon 33, which in turn is supported by the ground surface 3. The base balloon will also be inflated to a superambient pressure, though not necessarily to an equally high level as the toroidal balloon. The balloons may be of single or multi-sheet construction, with multiple adjacent or laminate sheets connected along seams or by other means. The balloons may be made out of a variety of materials, including synthetics such as Tedlar, Mylar, Dacron, polyurethane, or nylon.

Thus FIG. 3 shows a heliostat 20, comprising a reflective surface 30, support means for supporting said reflective surface 30 above a ground surface 3, said support means comprising an inflated balloon (e.g., inflated base balloon 33 supported by said ground surface 3), and control means (here comprising control ring 35 and control rods 44 whose control roles will be described subsequently) for rotationally orienting said reflective surface 30 as a function of time so as to reflect incident solar radiation, falling on said reflective surface from a solar radiation incident direction (see 11 in FIG. 38A) which is a function of time, to a target region 10 (which feature will be subsequently discussed with reference to its illustration in FIG. 38A). The support means (including inflated base balloon 33 supported by the ground surface 3) provide means for supporting the reflective surface 30 above the ground surface 3. The support means in FIG. 3 further comprises additional support means (which additional support means comprises the inflated toroidal balloon 32) for contributing to the support of the reflective surface above the base balloon 33.

The support means may further comprise means for securing the reflective surface around its periphery to the toroidal balloon. As previously mentioned, the inflated toroidal balloon exerts outward inflation-induced forces tending to maintain the reflective surface in tension. For the case when the reflective surface is a membrane, a second membrane in tension (e.g., a bottom surface 31) may also be secured around its periphery to the toroidal balloon, and means may be provided between the reflective membrane and the second membrane for causing the reflective membrane to deflect to a shape which is concave on the reflective side of the reflective membrane. Such means will be discussed further in the following paragraphs.

The reflective surface 30 typically comprises a reflective or reflectorized membrane, also known as a stretched membrane reflector. For example, reflectorized metal membranes could be used, comprising metal membrane substrate and glued-on, clamped-on, or vacuum attached-on polymer film reflector such as silvered acrylic film. Thin mirror segments may be optionally used in lieu of the polymer film reflective surface. A reflective surface as used in prior art toy mylar balloons could also optionally be used. Various other constructions of the reflective surface 30 could also be used within the spirit and scope of the invention.

In the illustrated embodiment, the reflective surface 30 is a reflective or reflectorized membrane (i.e., stretched membrane reflector) with a reflective side (upper side in illustration) on the side facing incident solar radiation coming from solar radiation incident direction (see 11 in FIG. 38A), and an other side (lower side or underside of reflective surface 30 in illustration) which need not be reflective. The inflated base balloon 33 is located between the ground surface 3 and the other side of the reflective surface 30, as illustrated. The reflective surface 30 is in a desired shape configuration which is concave on its reflective side (i.e., concave upwards to enhance solar concentration in a target region substantially at which a solar receiver 2 is located—see FIG. 38A). The preferred means for maintaining the reflective surface in this desired shape configuration comprises means for providing differential pressure across the reflective surface, with pressure acting on the reflective surface other (lower) side being lower than (ambient) pressure acting on the reflective surface reflective (upper) side. The sub-ambient pressure acting on the reflective membrane lower surface (other side) is contained in an enclosed volume 34 whose bounding surfaces include the reflective surface (other side) on top, a bottom surface 31 below the enclosed volume 34, and also the toroidal balloon 32 around its perimeter. The enclosed volume 34 can be viewed as an intersurface/intermembrane cavity in this embodiment. Note that the bottom surface 31 also serves as the top surface of the base balloon 33 in the illustrated embodiment of FIG. 3.

Control means are provided for orienting the reflective surface 30 along with the balloon heliostat 20 so as to reflect incident solar radiation to a target region and perform its heliostatic function. In the illustrated embodiment the control means comprise a control ring 35, control rods 44, and control rod base elements 38. The control ring 35, preferably substantially rigid, is fitted (using adhesive bonding, pressure fit, seam, or other attachment means) around the upper outer perimeter of the base balloon 33. A plurality (typically 3 or more) of control rods 44 are secured to certain specific points along the perimeter (i.e., distributed around the azimuth) of the control ring 35, The control rods 44 connect the control ring 35 with control rod base elements 38 which are anchored in the ground surface 3. The effective lengths of the control rods 44 are individually controllable by use of telescoping, screwing, or other motions between rod segments to perform the length varying function. Individually varying the effective lengths of the plurality of control rods 44 will enable the control means to provide means for orienting the reflective surface in two degrees of freedom (wherein the two degrees of freedom are elevation angle and azimuth angle).

The control rods 44 will preferably be in tension to avoid the possibility of buckling, especially if the rods are of a long thin aspect. Thus in this preferred case the control means includes at least three elongated control elements (here the control rods 44), which elongated control elements provide tension links between substantially rigid structure (which here comprises the substantially rigid control ring 35) to which the reflective surface is connected, on the first hand, and base elements 38 affixed to the ground surface 3, on the second hand. Depending on heliostat location relative to the target region, different control rods to that heliostat may have different length and travel ranges as required for that particular heliostat to function properly. A variety of base element sizes, shapes, ground anchors or screws, etc. are also feasibile within the spirit and scope of the current invention.

Note that when the control means changes the orientation of the reflective surface, the inflated base balloon 33 as a whole changes orientation along with the reflective surface; and maintains a substantially constant shape configuration, substantially constant volume configuration, and substantially constant enclosed gas mass configuration (through the orientation change). Under this scenario the inflated toroidal balloon 32 as a whole also changes orientation along with the reflective surface; and maintains a substantially constant shape configuration, substantially constant volume configuration, and substantially constant enclosed gas mass configuration (through the orientation change). Of course, ground, tether, and wind loads may cause some small deformations in the shapes and volumes of the toroidal and base balloons. Note that the base balloon 33 executes a rolling motion on the ground surface when the control means change the orientation of the reflective surface and the balloon heliostat.

To control the gas pressures in the inflated toroidal balloon 32 and the inflated base balloon 33, pressure control valves 26 are optionally provided. These valves, in conjunction with conventional pressure sources such as pressurized gas tanks, compressors, tubes, gas "plumbing", pressure sensors, and guages, together serve as means for varying and controlling gas pressures in the inflated balloons. The pressure control enabling hardware is optional as it may be possible to have well sealed balloons with extremely low leakage (e.g., some existing mylar balloons have very low leakage).

An additional control valve 26 is also shown leading to the enclosed volume 34, to enable control of the sub-ambient pressure contained therein and to thereby enable control of the degree of upward concavity of the reflective surface (e.g., membrane) 30. Again, additional conventional pressure control hardware may also be utilized. The control valve 26 and the additional pressure control hardware may also enable rapid pressurization of the enclosed volume 34 to ambient or superambient pressure to defocus the reflective surface 30 in case of an emergency. A rapid pressure increase in the base balloon 33 or toroidal balloon 32 may also have a defocusing effect on the reflective surface, acting on reflective surface concavity indirectly through distortion of their interfaces with the enclosed volume 34. Increasing toroidal balloon pressure will also reduce reflective surface upper surface concavity by increasing toroidal balloon-induced reflective surface tension. Even in non-emergency circumstances, pressure modulation in the base balloon 33 or toroidal balloon 32 may be used to produce desired shape-changing effects on the reflective surface.

Figure 4:
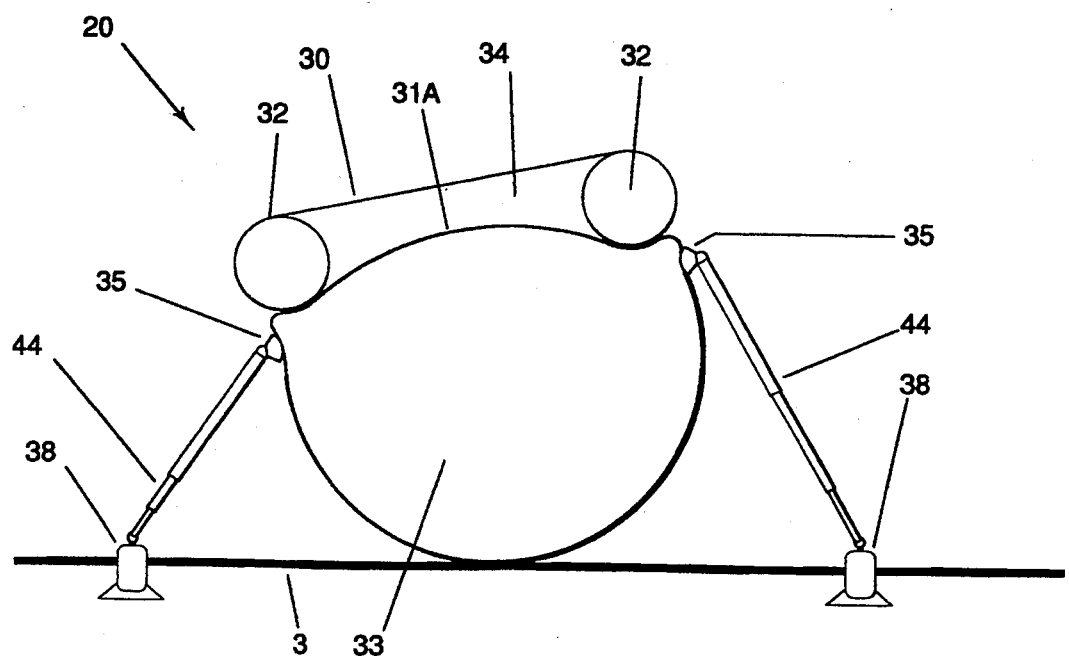

FIG, 4 shows an embodiment of a heliostat similar to that shown in FIG. 3, but with an independent bottom surface 31 replaced by a continuation of the surface of the base balloon 33 around an upper lip to form a base balloon top surface 31A which also serves as a bottom surface to the enclosed volume 34. The bottom of the toroidal balloon 32 may be fastened (e.g., by glue, pressure or heat welding, or other means) to the top of the base balloon 33 along the ring shaped region where they contact each other, Alternatively, the toroidal balloon may be held in place primarily by pressure forces associated with sub-ambient pressure in the enclosed volume 34, for the case when the pressure in enclosed volume 34 is sub-ambient. FIG. 4 and most subsequent Figures show a reflective surface 30 which is substantially planar, as opposed to FIG. 3 which shows a reflective surface 30 which is significantly concave on its Sunward side (i.e., upwards in the illustration). The more planar surface shown in FIG. 4 andmost subsequent Figures can be achieved by using greater tension in the reflective surface 30, or a pressure in enclosed volume 34 which is only slightly sub-ambient or is substantially ambient, or a combination of these two factors. The desired degree of sunward-side concavity for the reflective surface is a function of distance to the solar receiver and receiver size as seen from the heliostat. The reflective surface 30 may incorporate viscoelastic materials or components to improve damping of surface deflections induced by air gusts or other causes. Pressure control valves 26 are not explicitly shown in FIG. 4 or most subsequent Figures, but pressure control valves such as the valves 26 shown in FIG. 3 could be used in the FIG. 4 and subsequent embodiments as well.

The balloon heliostat embodiment illustrated in FIG. 4, as in the case of the embodiment illustrated in FIG. 3, provides control means for orienting the reflective surface 30, which control means includes an elongated control element (here a control rod 44) and means for controlling effective length of this elongated control element. The means for controlling effective length here comprise the use of multiple rod segments in each control rod 44, which multiple rod segments can telescope or screw into adjacent segments. By differentially varying effective lengths of different control rods 44, the heliostat can be oriented in elevation and azimuth and thereby perform its Sun-tracking function. While three segment control rods are shown, two, four, or greater numbers of segments could alternatively be used. The different control rod segments may telescope into each other or employ a screwing motion (e.g., the center element of the 3 illustrated control rod segments rotating relative to nonrotating upper and lower segments in the illustration) to vary their lengths. This concept of control rod control will be explained further with respect to FIG. 23. Control rodscould also be made thinner or thicker than illustrated (thinner may be feasible without fear of buckling if all the control rods are always maintained in tension).

Figure 5A:
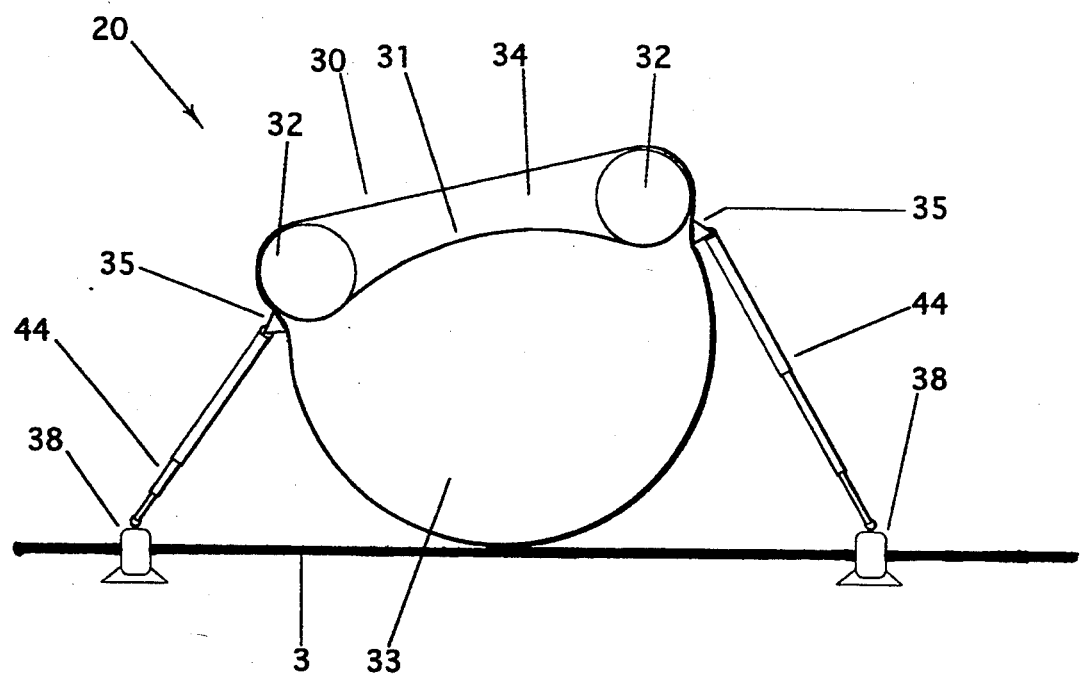

FIG. 5A shows an embodiment of a heliostat somewhat similar to that shown in FIG. 3, in which the reflective surface 30 is effectively a continuation of the same surface which encloses the base balloon 33, extended around the outside of the toroidal balloon 32. The toroidal balloon may be secured to the combined base balloon and reflective surface by various means including glueing, heat welding, and pressure. Attachment of the toroidal balloon may also be along a manufacturing/assembly seam used to join the reflective surface and base balloon surfaces. In this embodiment, note that the inflated (base) balloon 33 comprises an inflated volume enclosed by plural enclosing surface elements (here the bottom and side surface sheet of the base balloon 33, the bottom of the toroidal balloon 32, and the underside of the bottom surface 31), with adjacent enclosing surface elements (preferably) attached to each other along seam lines. FIG. 5A also shows control means for orienting the reflective surface which control means includes an elongated control element (i.e., control rod 44) and means for controlling effective length of the elongated control element (e.g., telescoping or screwing mechanisms between the illustrated segments of the control rods).

Figure 5B:
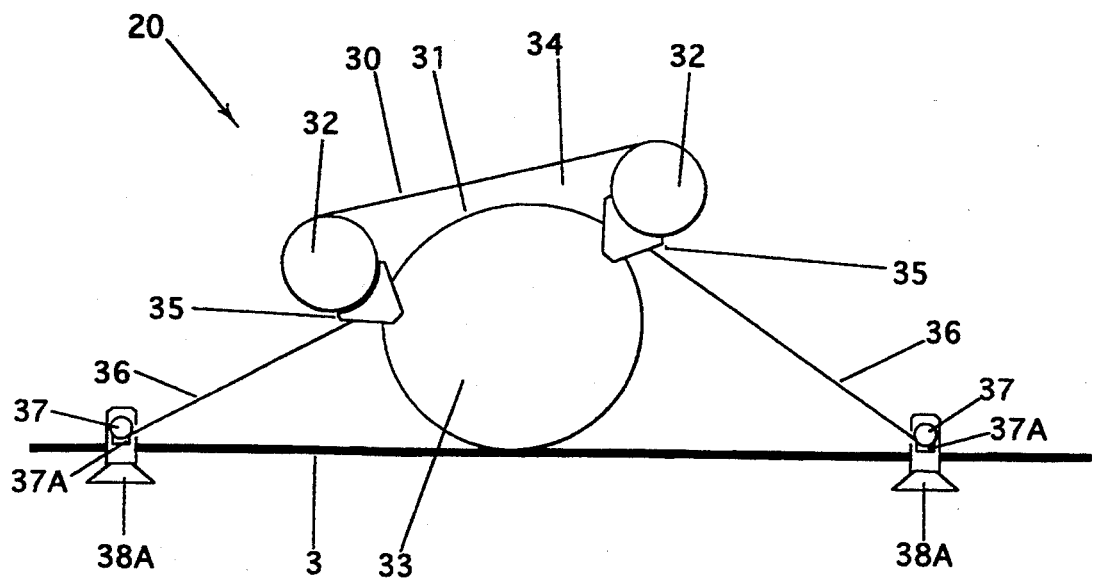

FIG. 5B shows another embodiment of a heliostat somewhat similar to that shown in FIG. 3. FIG, 5B shows a new and improved heliostat 20, also called a balloon heliostat, comprising a reflective surface 30, support means comprising an inflated toroidal balloon 32 for supporting the reflective surface, and control means for orienting the reflective surface so as to reflect incident light from the Sun to a target region. The support means further comprises means (such as seam attaching, gluing, or other means) for securing the reflective surface 30 around its periphery to the toroidal balloon 32.

Relative to FIG. 3, FIG. 5B differs in featuring a relatively smaller base balloon 33, a relatively larger cross-section control ring 35 which also serves as the connecting interface between the base balloon 33, the toroidal balloon 32, and the bottom surface 31. The control means for orienting the reflective surface here includes (i) an elongated control element (a control tether 36 in place of the control rod 44), (ii) means for controlling effective length of the elongated control element (a tether positioning motorized reel 37), and (iii) at least one controllable positioning motor (motor 37A for the tether positioning motorized reel).

The control tethers 36 connect the control ring 35 to control tether base elements 38A which are anchored in the ground surface 3. Control tethers may be solid or hollow with various shapes in cross-section, and made of inelastic, elastic, or viscoelastic materials. Control tether cross-section and design will preferably reduce the susceptability of the tethers to vibrational excitation by winds or other external forces.

Means for individually controlling the effective lengths of the multiple elongated control elements (i.e., control tethers 36) comprise means for reeling the tethers in/out relative to the base elements using tether positioning motorized reels 37 driven by motors 37A. While motorized reels are preferred, nonmotorized reels may be substituted in place of these motorized reels. While the control tethers are shown reeling out from the bottom of the reels, they may reel out from the tops or sides of alternate reel embodiments. By varying the effective lengths of the control tethers 36 which attach to the control ring at different points along its perimenter, the reflective surface will be caused to orient itself in the desired manner. For various embodiments of the invention, control tethers or control rods may be alternatively used within the scope of the invention. For the case where control tethers are used, the reels 37 may be located at the bottom or top ends of the tethers, or both ends, or the middle, within the scope of the invention.

It should be noted (relative to FIGS. 5A and 5B and in general) that control rods, control tethers, base elements, and reels may be varied in size, shape, or geometric configuration within the spirit and scope of the present invention.

In the embodiment of FIG. 5B, tensile loads in the bottom surface 31 may be partially or fully sustained by circumferential compression in the control ring 35. Circumferential compression in the control ring 35 may also contribute to maintaining tension in the reflective surface 30, in which case the control ring in conjunction with the toroidal balloon 32 provides a substantially rigid structure of toroidal topology for supporting the reflective surface 30 in tension. Variations in the control ring cross-section are possible within the scope of the invention.

Figure 6A:
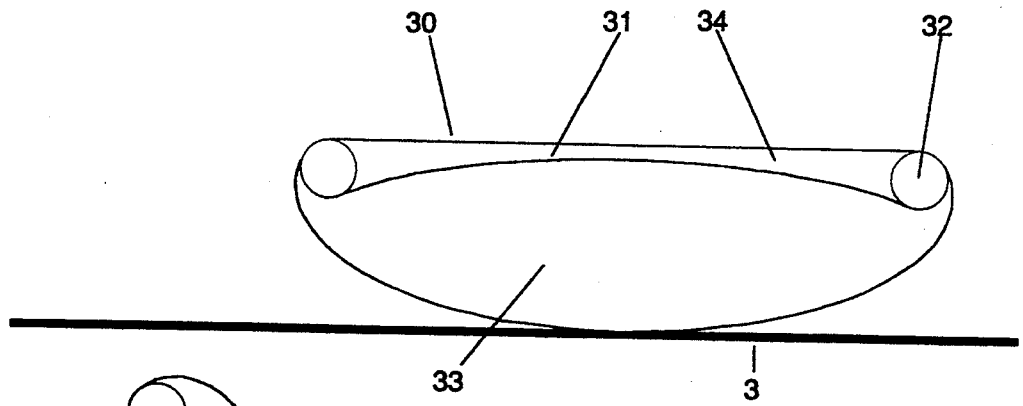
Figure 6B:
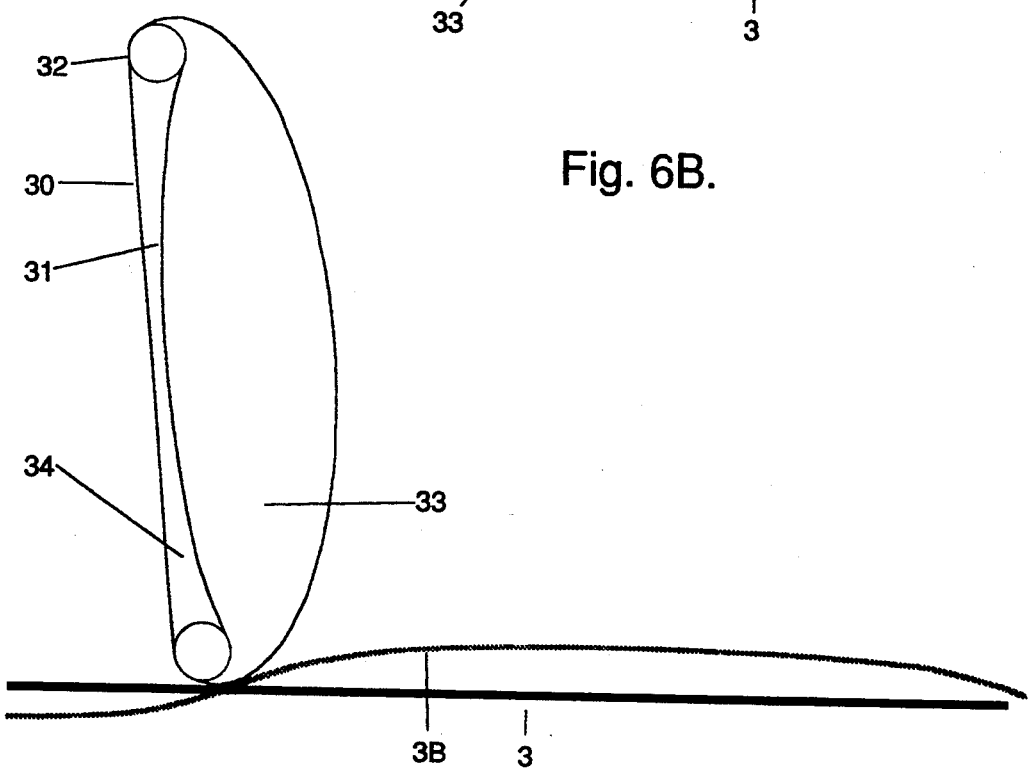
Figure 6C:
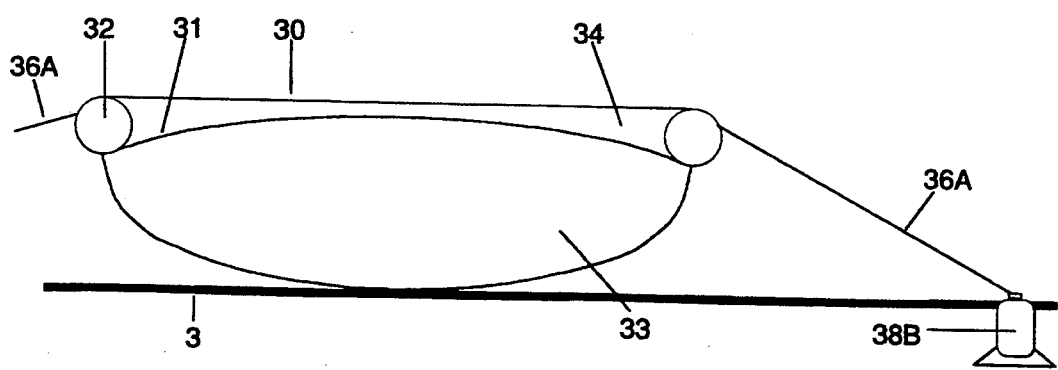

FIGS. 6A, 6B, and 6C illustrate an embodiment of a heliostat with a low profile base balloon 33. FIGS. 6A and 6B show a vertical plane sectional cut through the heliostat at a pair of azimuth locations which fall between control rod/tether attachment azimuths. FIG. 6B shows how the heliostat can be rolled to a configuration where the reflective surface 30 is facing sideways and a little bit downwards in a "stowed heliostat" position to provide protection for the reflective surface against falling and/or blowing rain, snow, sleet, hail, sand etc. The use of a alternate ground surface profile 3B with a contoured "bump" (e.g., graded earth with a cover sheet/plate or paved surface) may facilitate achievement of a more downward inclined reflective surface orientation. The reflective surface will preferably face not only slightly downward but also approximately to leeward relative to the prevailing wind, to further reduce the possibilities for wear and damage to the reflective surface 30. The ability to stow a heliostat with the reflective surface facing leeward and downward can serve as contributory means for maintaining the reflective surface in good condition. FIG. 6C shows the same embodiment as FIG. 6A, but with a vertical plane sectional cut through the heliostat at a pair or azimuth locations which fall substantially at control rod/tether attachment azimuths (e.g., diametrically opposing attachment points for a 4 or 6 control tether/rod configuration). This view shows that the base balloon 33 has sidewalls which attach lower down on the toroidal balloon 32 surface at these azimuths than at the azimuths in FIG. 6A or 6B, to facilitate the greater than 90 degree tilt capability shown in FIG. 6B. Thus the upper edge of the base balloon sidewall will have an up and down wavy attachment line to the toroidal balloon around its perimeter. Control tethers/rods 36A connect the upper part of the toroidal balloon 32 (optionally through a control ring, not shown, or through "hardpoint" type attachment fittings on a nonrigid toroidal balloon, or directly to an inflated rigid hoop type of toroidal balloon) with control tether/rod base elements 38B. The upper ends of the control tethers/rods may optionally be bifurcated tether connectors connecting to azimuthally separated attachment points on the toroidal balloon/control ring, connected to lower end control tether or rod components.

Figure 7A:
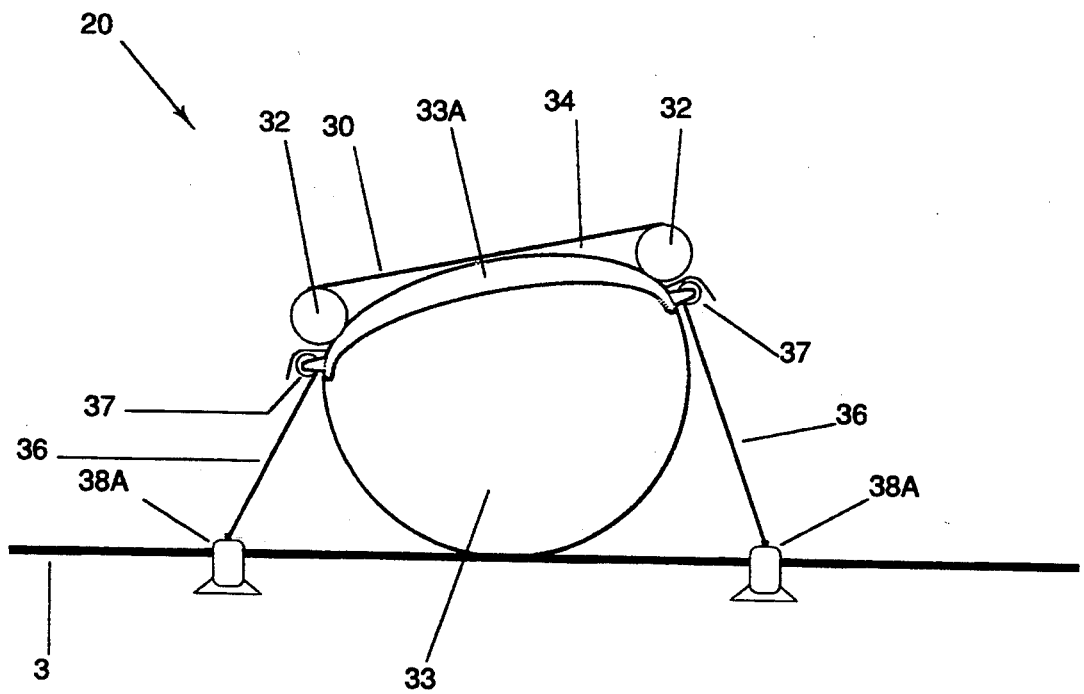

FIG. 7A illustrates an embodiment similar to FIG. 5B, with the following differences. A base balloon cap 33A is provided in place of the combination of control ring 35 and bottom surface 31. The base balloon cap 33A is a structural element which serves the multiple purposes of (i) providing a top enclosing surface or cap for the base balloon 33, (ii) providing a bottom surface for the enclosed volume 34, and (iii) supporting toroidal balloon 32. Thus the base balloon in FIG. 7A can be considered to be a semirigid or partially rigid base balloon, with a flattened rigid top part providing a precise interface with the toroidal balloon 32. In FIG. 7A the tether positioning motorized reels 37 are shown at the top ends of the control tethers 36 instead of the bottom ends as shown in FIG. 6. In general, tethers could terminate in tether positioning reels on their bottom and/or top termini.

Figure 7B:
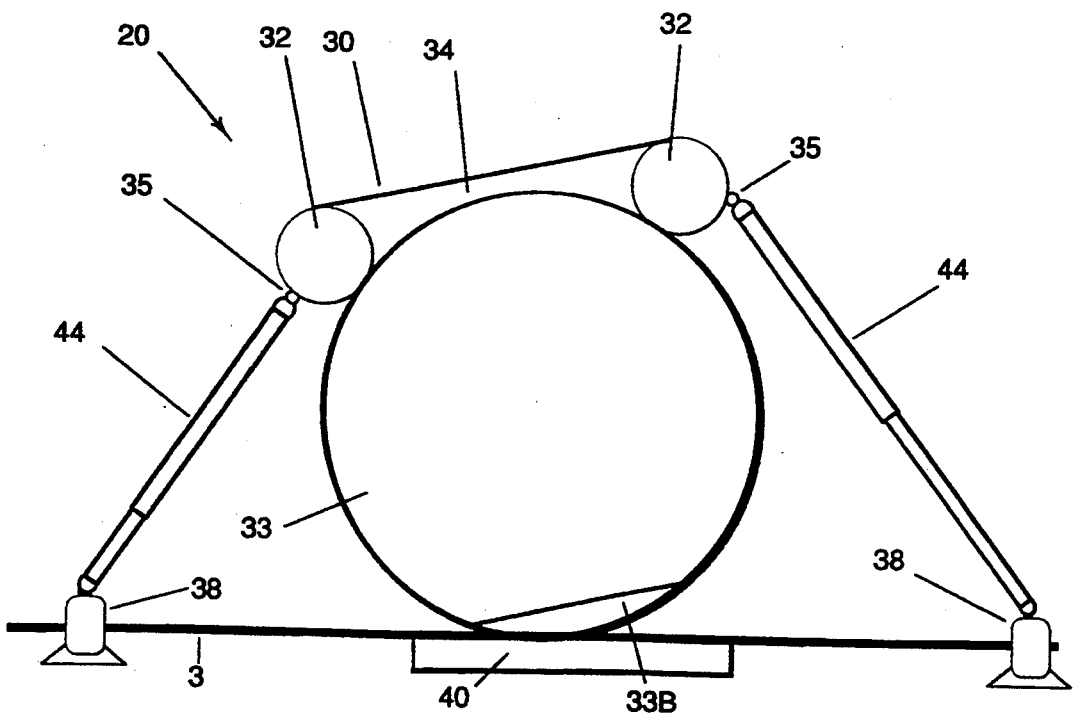

FIG. 7B shows an embodiment similar to FIG. 4, with the following differences. The base balloon is now substantially spherical rather than substantially semispherical. The base balloon is now semi-rigid, with base balloon bottom 33B shown as being substantially rigid and contacting a substantially rigid base plate 40 secured to the ground surface 3. The rigid base plate 40 may be constructed of a variety of materials ranging from concrete to asphalt to metal to plastic to styrofoam block to other materials. Fully solid or partially hollow (e.g., honeycomb sandwich) construction may be utilized. The base plate also serves in a contributory role as support means for supporting the reflective surface 30.

Such rigid base balloon bottoms and/or base plates may be used in various heliostat embodiments to provide smooth rolling contact of the base balloon over the ground as the heliostat is oriented to track the Sun, and to improve pointing accuracy. The embodiment shown in FIG. 7B also differs from the FIG. 4 embodiment in that the control ring 35 is secured to the toroidal balloon 32 rather than to the base balloon 33.

Figure 8A:
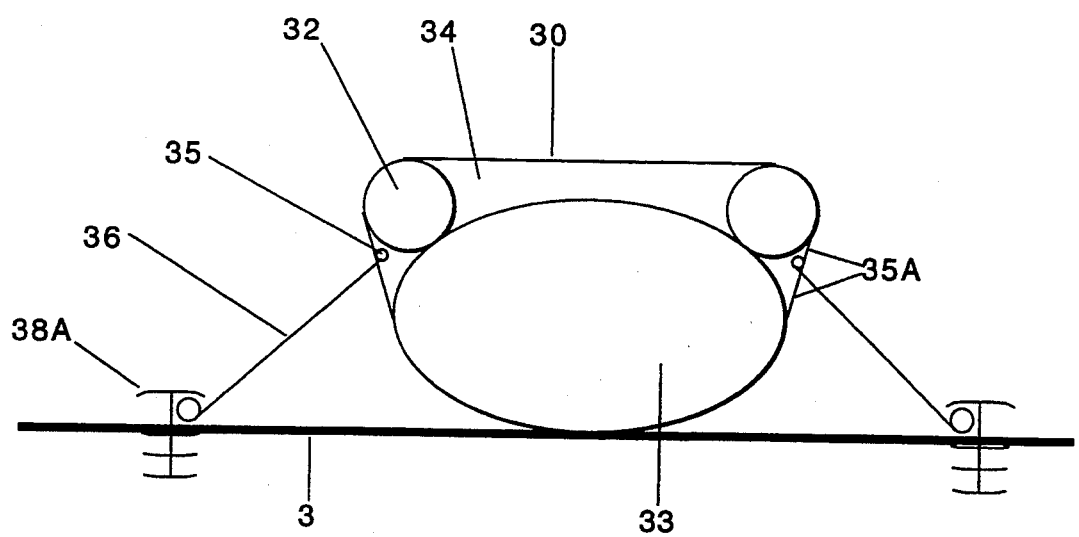

FIG. 8A shows an embodiment similar to FIG. 7B, with the following differences. The base balloon 33 is substantially ellipsoidal rather than substantially spherical. The rigid base balloon bottom and base plate features are not shown, though they could optionally be used. Control tethers 36 are used to control the orientation of the heliostat, in a manner similar to that shown in FIGS. 5B and 6. Preferably at least three control tethers will be used around the periphery of the heliostat. The upper ends of the control tethers 36 attach to a control ring 35, which in turn is attached by toroidal-balloon-to-control-ring-to-base-balloon connecting elements 35A to both the toroidal balloon 32 and the base balloon 33. These connecting elements 35A can be rod type or tether type elements, and will preferably be in tension. A plurality of these connecting elements will preferably be located around the periphery of the heliostat. Alternately, the connecting elements 35A may comprise a continuous sheet around the periphery of the heliostat. The illustrated control tether base elements 38A are an alternate type from those shown in FIG. 6. Each of the illustrated base elements could serve as a base element to more than one adjoining heliostat, though control tethers are only shown to the single illustrated heliostat. Actual base elements may be of relatively smaller size compared to the heliostat base balloon, toroidal balloon, and reflector sizes than the proportions shown in the illustration for clarity of concept presentation.

Figure 8B:
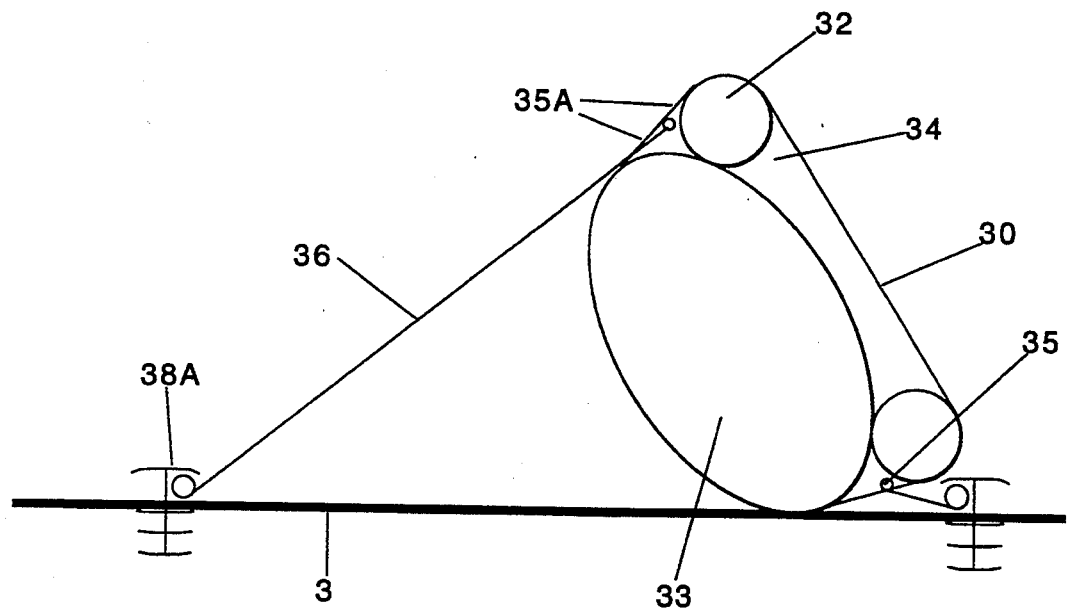

FIG. 8B shows the same heliostat embodiment as shown in FIG. 8A, but in an inclined orientation configuration. The heliostat can reorient from the FIG. 8A configuration to the FIG. 8B configuration as the base balloon 33 executes a rolling motion on the ground surface 3 when the (heliostat orientation) control means (e.g., combination of control tethers 36, control tether base elements 38A, and control ring 35) changes the orientation of (the heliostat and) the reflective surface 30. Thus in FIG. 8B the base balloon 33 has "rolled" over the ground to a new position as well as a new orientation. In FIG. 8B note also how the left side control tether is almost fully extended while the right side control tether is almost fully reeled in, to achieve the approximately 60 deg. heliostat tilt shown. The large tilt angle of FIG. 8B may be used not only when warranted by the Sun's position but also for stowage at maximum inclination in inclement weather (e.g., to enhance rain runoff from the refletive surface and to orient the reflective surface to leeward in wind or dust or sand storms). Of course, a still greater tilt as shown earlier in FIG. 6B would be even more preferable under such inclement weather conditions.

Figure 9A:
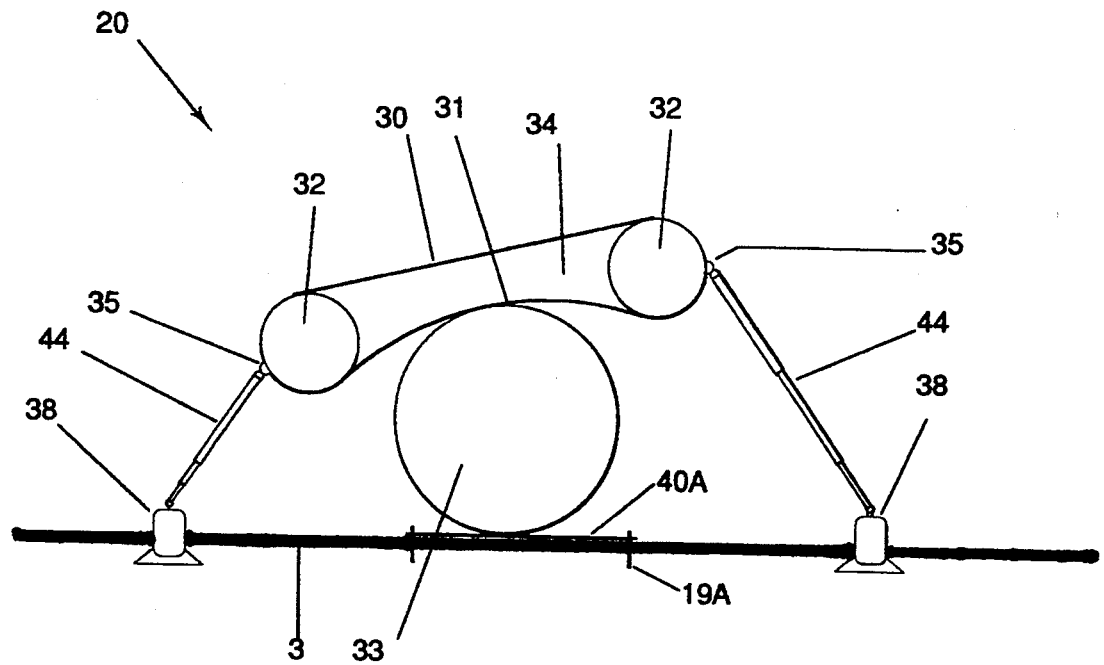

FIG. 9A shows an embodiment similar to that shown in FIG. 7B, with the following differences. The bottom of the enclosed volume 34 is now enclosed by a separate bottom surface 31 rather than by the top surface of the base balloon 33. The rigid base balloon bottom 33B and base plate 40 are not shown, though they may be used singly or in combination in this embodiment as well. A base sheet 40A is shown under the base balloon and above the ground surface 3. The base sheet 40A is secured by base sheet anchoring means 19A for anchoring the base sheet 40A to the ground surface 3. As the heliostat is reoriented to track the Sun, the contact area between the bottom sheet 31 and the top of the base balloon 33 may have either fixed or rolling contact. An advantage of the FIG. 9A embodiment is that it can facilitate the use of a smaller base balloon than the FIG. 7B embodiment.

Thus the heliostat of FIG. 9A features a reflective surface 30, support means comprising an inflated base balloon 33 for supporting the reflective surface above the ground surface 3 and further comprising additional support means comprising an inflated toroidal balloon 32 and a bottom sheet 31 for contributing to the support of the reflective surface 30 above the base balloon 33.

Figure 9B:
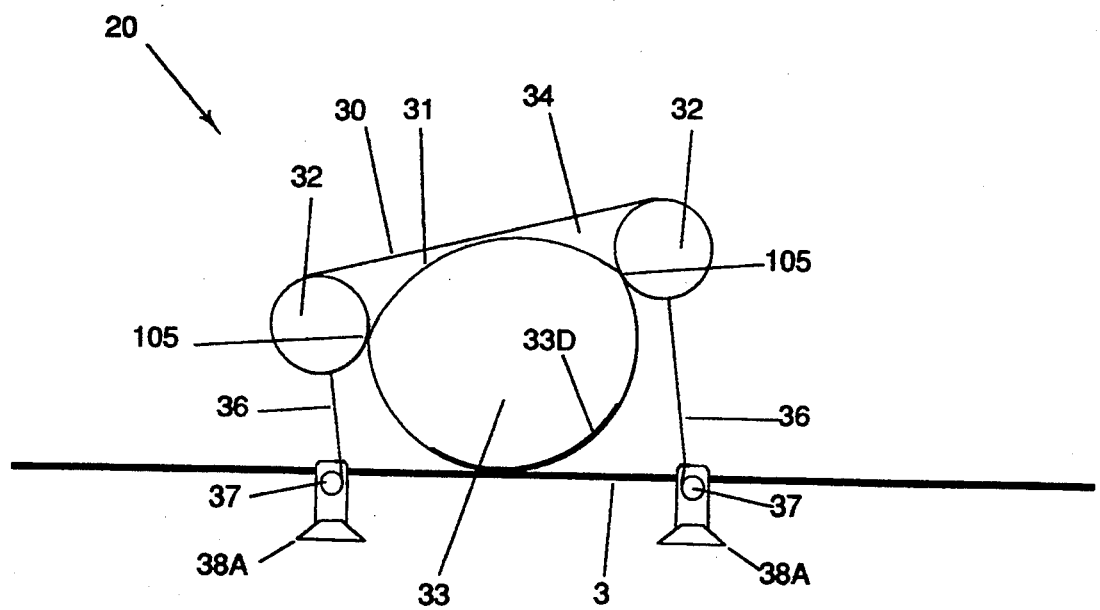

FIG. 9B shows an embodiment similar to FIG. 5B, with the following differences. The connecting attachment at the interface between the toroidal balloon 32, bottom surface 31, and base balloon 33 is now a seam 105. Two separate seams may optionally be used to attach the toroidal balloon 32 to the bottom surface 31 and the base balloon 33 respectively. Now the inflated base balloon 33 comprises an inflated volume enclosed by plural enclosing surface elements, with adjacent enclosing surface elements attached to each other along seam lines. Also illustrated at the bottom of the base balloon 33 is a base balloon bottom thickened/doubled surface area 33D, to reduce wear and tear on the base balloon as it rolls over the ground surface.

The control ring 35 is now shown to be eliminated, though a control ring 35 could be used at the control tether (36)—toroidal balloon (32) interface location shown. The upper ends of the control tethers 36 are shown directly secured to the toroidal balloon 32 rather than to such a control ring 35. The control tethers 36 in FIG. 9B are also shown to be substantially vertical rather than angled as shown in FIG. 6.

Figure 10A:
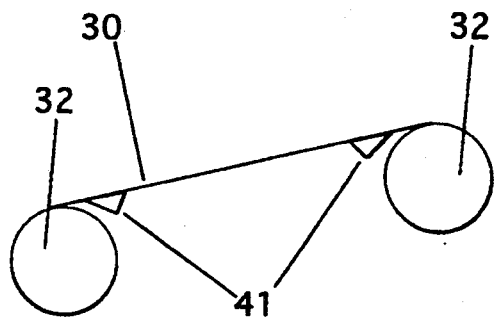
FIGS. 10A through 10E show the use of rigidifying and damping means for minimizing deflections of a reflective surface supported by a toroidal balloon.

FIG. 10A shows means for maintaining a reflective surface 30 (here a reflective membrane) in a desired shape configuration, which means comprises means 41 for minimizing reflective surface (e.g., membrane) deflections (e.g., wind or gust induced static or dynamic deflections). The means for minimizing reflective surface deflections 41 here comprises a rigidifying ring bonded to the underside of the reflective surface 30. Rigidifying rings of alternate cross-sections and multiple substantially concentric rigidifying rings could optionally be used. Rigidifying radial elements could be used in addition to or in place of rigidifying rings, and in the addition case could optionally be attached to the rigidifying rings to form a rigidifying framework bonded to the underside of the reflective surface 30 (e.g., a ring & spokes framework). Stiffeners and/or battens of various types could also be used to minimize undesirable reflective surface deflections. The rigidifying elements could be made of a variety of possible structural materials ranging, for example, from simple solid styrofoam structure to sophisticated "tailored" composite and/or honeycomb core structures. Additional means for minimizing reflective surface deflections could include active surface deflection reduction/suppression methods as taught in prior art methods proposed for space structures. In the partial embodiment shown, the reflective surface 30 is supported around its periphery by a toroidal balloon 32. The toroidal balloon can be supported and controlled in orientation in a variety of ways as shown in other Figures, and not shown here.

Figure 10B:
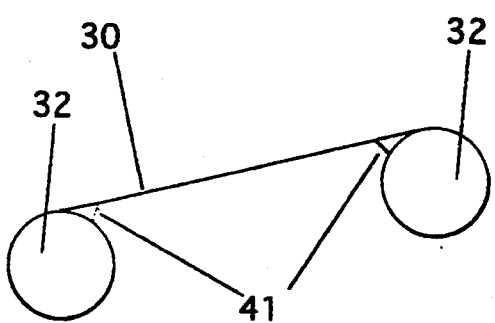

FIG. 10B shows a similar partial embodiment of the invention as FIG. 10A, with the means for minimizing reflective surface deflections 41 now also serving as the connecting interface between the toroidal balloon 32 and the reflective surface 30 which means 41 now supports peripherally. In other words, the means for maintaining the reflective surface 30 (e.g., reflective membrane) in its desired shape configuration is here provided by the support means for supporting the reflective surface (which here includes the means for minimizing reflective surface deflections 41 and the toroidal balloon 32). The support means serves as support structure means on the periphery of the reflective membrane for supporting the reflective membrane in tension). Thus the support means for supporting the reflective surface also incorporates the means for maintaining the reflective surface in a desired shape configuration. In this embodiment, the upper surface of that portion of means for minimizing reflective surface deflections 41 which lies outside the attachment line (ring) for the reflective surface 30, may also be reflectorized to maximize the total effective reflective area of the heliostat. Alternatively, the reflective surface may extend partially or fully over the top of the means for minimizing reflective surface deflections 41.

Figure 10C:
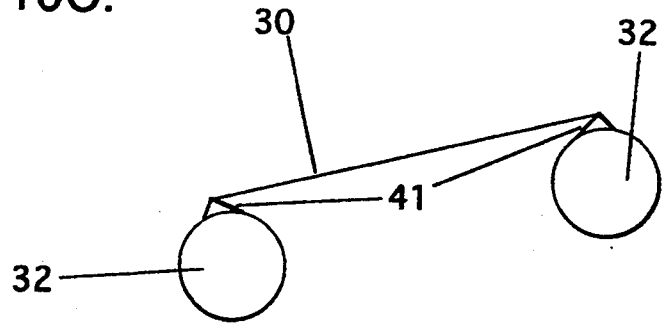

FIG. 10C shows a similar partial embodiment of the invention as in FIG. 10B, with the rigidifying ring serving as means for minimizing reflective surface deflections 41 now having a somewhat different shape and size and supporting the reflective surface 30 at a location more elevated relative to the upper tangent plane of the toroidal balloon 32. In this embodiment the rigidifying ring could also optionally serve as a control ring 35, or as an attach structure for a tarp or dust cover which could be fitted over the reflective surface 30 to protect it from dust, rain, sand, snow, hail, etc. when the heliostat is not in use.

Figure 10D:
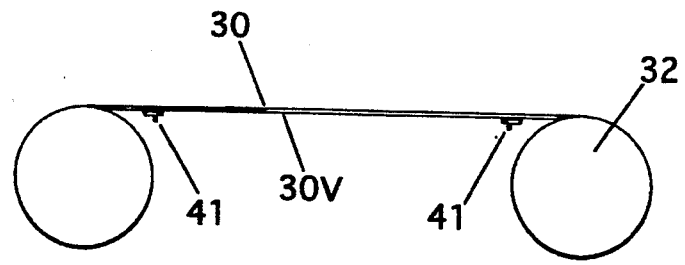

FIG. 10D shows a partial embodiment of a balloon heliostat with means for damping motions of the reflective surface 30, which means comprise the use of a second sheet 30V attached below the reflective surface 30 (e.g., reflective membrane or sheet), with a viscous or viscoelastic layer sandwiched between the reflective surface 30 and the second sheet 30V. The two membranes may optionally be connected with a connecting string tie, honeycomb sandwich or other connecting structure. Means for minimizing reflective surface deflections 41 such as a rigidifying ring (illustrated), stiffeners, or battens may be bonded to the underside of the second sheet 30V. As in the case of the other FIG. 10 embodiments, rigidifying structure of various geometric forms, with or without circular symmetry, may be used.

Figure 10E:
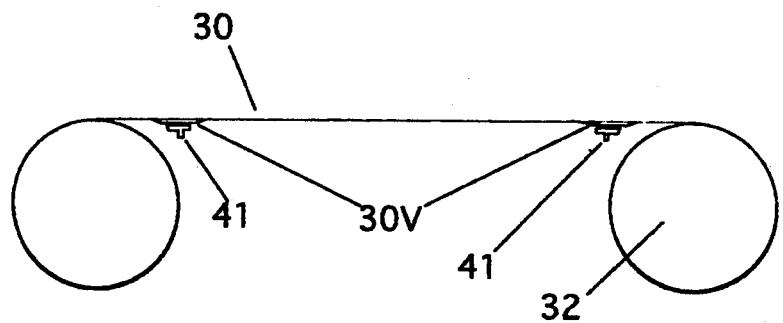

FIG. 10E shows a variant of FIG. 10D, wherein the second sheet 30V is used only in a ring shaped area in the vicinity of means 41, rather than in a fuller disk area under most or all of the reflective surface 30.

Figure 10F:
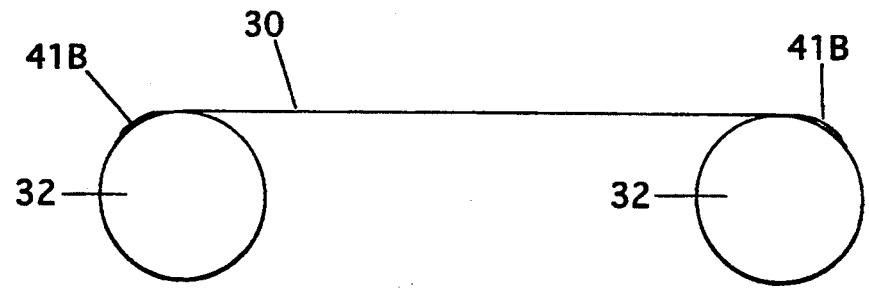
FIGS. 10F through 10H show means for adjusting the planarity of a reflective surface supported around its edge by a toroidal balloon.

FIG. 10F shows a partial embodiment of a balloon heliostat with adjustable (tension) straps 41B to adjust reflective surface periphery planarity. These straps are located at intervals around the azimuth of the reflective surface 30, are preferably radially oriented, and can be adjusted to fine-tune the planarity of the periphery of the reflective surface. These straps thus serve as contributory means for maintaining the reflective surface in a desired shape (e.g., planar periphery) configuration.

Figure 10G:
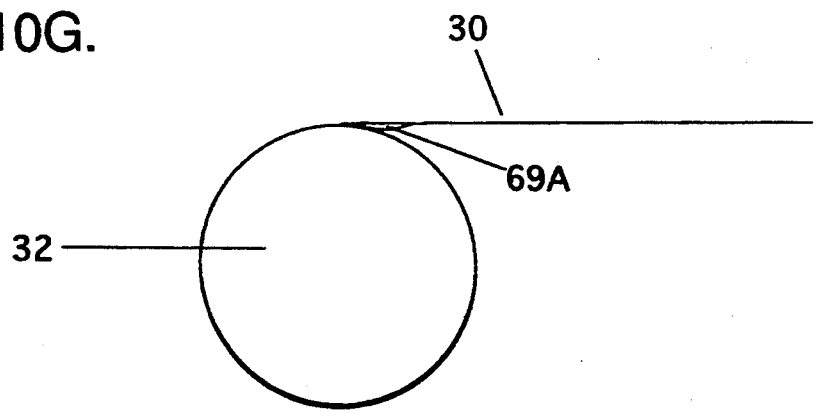

FIG. 10G shows an embodiment similar to FIG. 10F, which uses small "ballonet bubbles" 69A instead of the straps 41B, for the same purpose of enabling fine-tuning adjustments to enhance the planarity of the periphery of the reflective surface. These ballonet bubbles are inflatable pockets envisaged to be located at interval azimuth locations, wedged between the upper surface of the toroidal balloon 32 and the lower surface of the reflective surface (e.g., membrane) 30. Pressures in the ballonet bubbles will preferably be individually controllable to enable the reflective surface periphery to be finely adjusted to improve planarity.

Figure 10H:
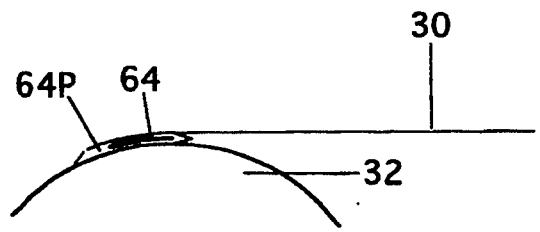

FIG. 10H shows an embodiment which uses shims 64 for the purpose of enabling fine-tuning adjustments to enhance the planarity of the periphery of the reflective surface. Shims of various desired thicknesses may be inserted into shim pockets 64P at various azimuthal locations around the toroidal balloon 32.

Figure 11A:
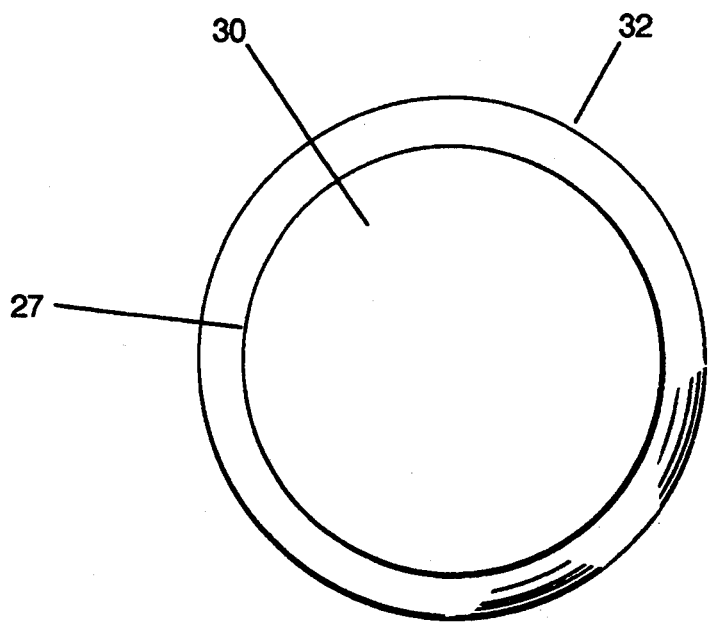
FIGS. 11A and 11B show seam geometry of an attachment seam connecting a heliostat reflective surface with a toroidal balloon.

FIG. 11A shows a top view from a location above a reflective surface 30 of the reflective surface 30 and the outer part of a toroidal balloon 32 of an embodiment of a heliostat such as shown in FIG. 3 which uses a toroidal balloon 32 to support the reflective surface 30 around its periphery. The reflective surface 30 is shown secured to and supported by the toroidal balloon 32 along a seam 27, which seam is substantially circular in shape and provides means for attaching the reflective surface to the toroidal balloon.

Figure 11B:
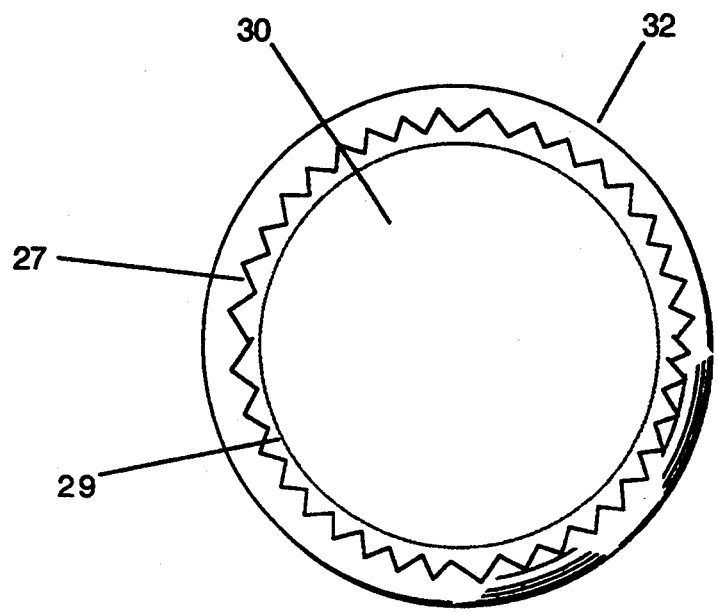

FIG. 11B shows a top view of a partial heliostat embodiment similar to FIG. 11A, with the seam 27 now having a shape with a jagged or serrated edge running around the reflective surface 30. The use of a jagged edge may ease the installation of a preinstallation-planar membrane reflective surface with the serrated edge seam extending along the downward curving non-planar surface portion of the toroidal balloon 32 which lies outboard of the top crest 29 of the toroidal balloon 32 (where top crest 29 is defined as the substantially circular ring on the surface of the toroidal balloon which lies in the upper tangent plane to the toroidal balloon, on the side closest to the viewer in this top view). By locating the seam 27 outboard of the top crest 29 of the toroidal balloon, local seam manufacturing discrepancies will have a reduced adverse effect on the shape of the reflective portion of the reflective membrane, as the periphery of the reflective portion will be effectively located at a location corresponding to the top crest 29 of the toroidal balloon 32.

Figure 12A:
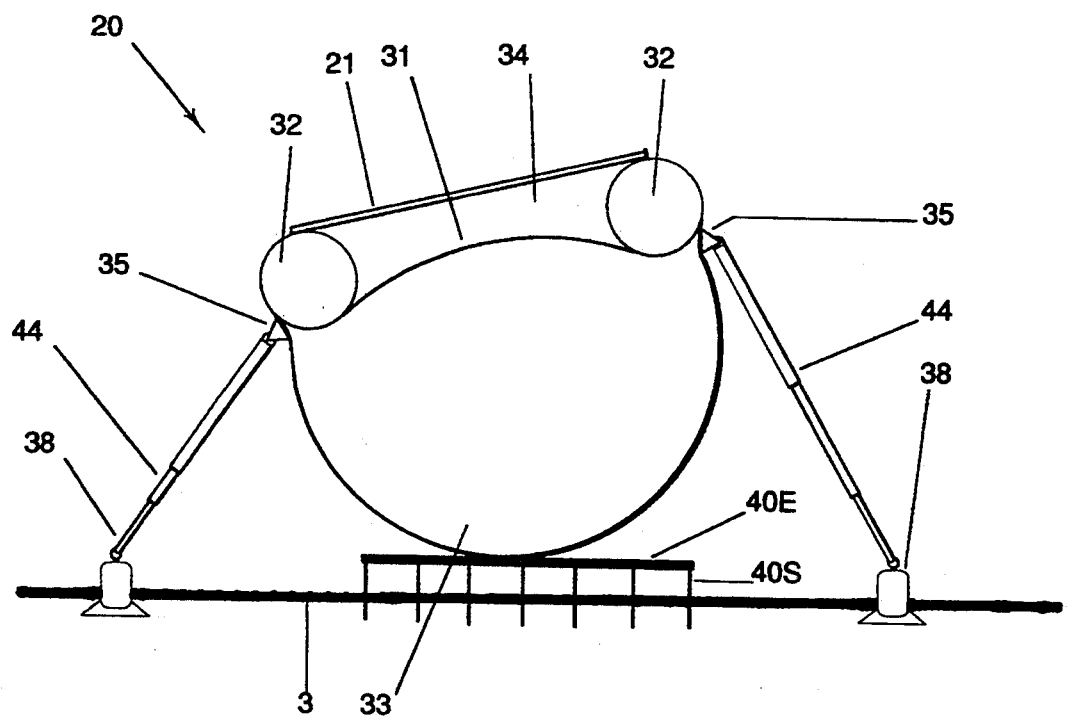
FIGS. 12A and 12B show the use of toroidal balloons for supporting rigid or partially rigid reflective surfaces, and also show means for elevated siting of base balloons.

FIG. 12A shows a sectional view of an embodiment of a balloon heliostat similar to that shown in FIG. 3, wherein the reflective surface is a mirror 21 (e.g., a conventional glass mirror). A conventional glass mirror including conventional structural backing means is illustrated in place of the preferably membrane type reflective surface 30 shown in FIG. 3. The mirror 21 can be secured to the toroidal balloon 32 which can secure and support it by a variety of means including adhesive bonding, mechanical fastening, and pressure differential means. While a planar mirror is illustrated, a preshaped concave up focusing mirror may alternatively be used. Differential pressure across the mirror or gravitational force may optionally be used to help shape the mirror in a concave up configuration. FIG. 12A also illustrates the use of an elevated base plate 40E which supports the base balloon 33 (and which could also support other balloon heliostats as well). Elevated base plate support means 40S such as the illustrated stilts in turn support the elevated base plate in its location above the ground surface 3.

Figure 12B:
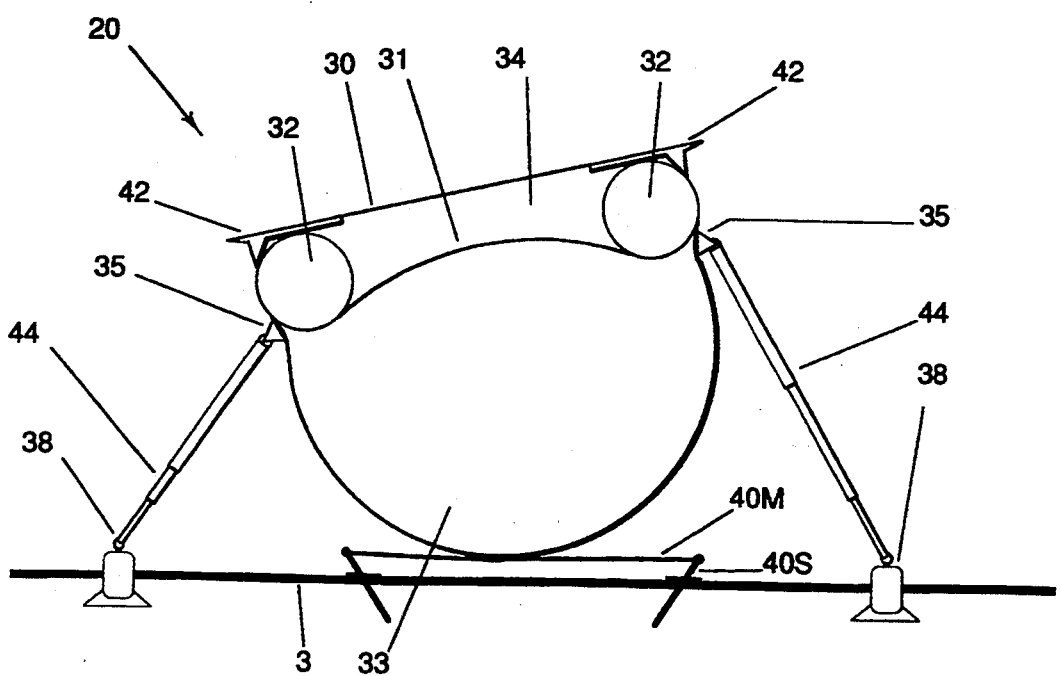

FIG. 12B shows an embodiment similar to the embodiment of FIG. 12A, with the conventional glass mirror 21 replaced by a membranous central reflective surface 30 supported around its periphery by a reflective surface support ring 42, which will also preferably have a reflective upper surface. Thus this embodiment features a combination of conventional mirror and stretched membrane reflector reflective surfaces. The reflective surface support ring 42 serves as support structure means on the periphery of the reflective membrane 30 for supporting the reflective membrane in tension, as means for maintaining the reflective surface (membrane) in a desired shape (e.g., planar periphery)

configuration, and as means for minimizing reflective membrane deflections.

The reflective upper surface of the reflective surface support ring 42 may be a planar, conical, or piecewise planar approximating a continuous upward-concave mirror. The reflective surface support ring may have a variety of cross-sectional configurations, including open and closed cross-sections. The use of a hybrid rigid plus membranous reflector could provide the combined advantages of the rigidity of a rigid mirror with the reduced weight and cost of a membranous reflector.

FIG. 12B also illustrates the use of an elevated tension membrane base plate 40M, supported by elevated base plate support means 40S. The elevated tension membrane base plate 40M serves to support the base balloon 33 above the ground surface 3, and could support alternate balloon heliostat configurations as well.

In an alternate embodiment relative to FIG. 12B, the control rods 44 (or alternatively control tethers) could connect directly to the underside/outside of the reflective surface support ring 42, and the illustrated dedicated control ring 35 could be eliminated.

Figure 12C:
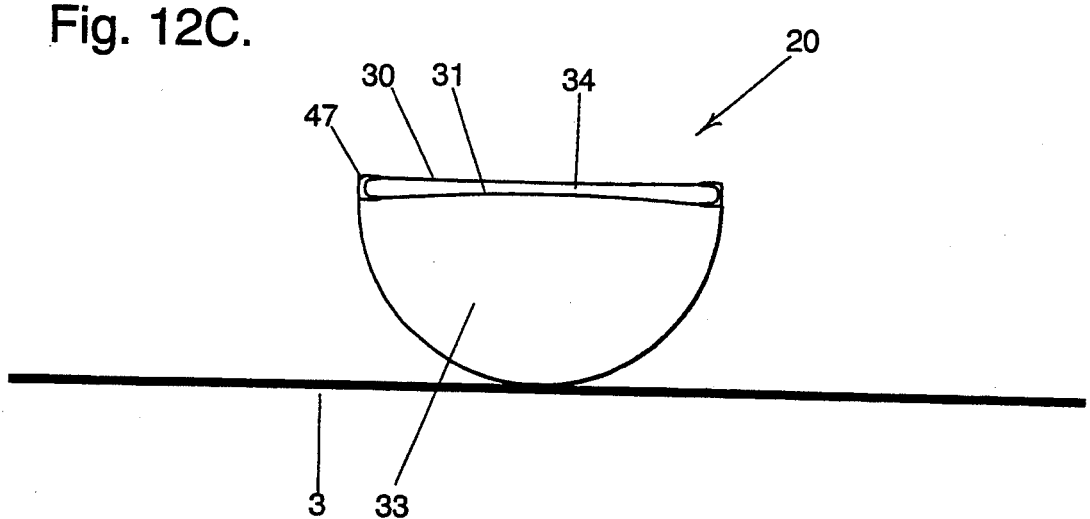
FIGS. 12C through 12F show balloon heliostat embodiments using a toroidal hoop, or a rigid bottom shell base balloon, or a paneled base balloon.

FIG. 12C illustrates an embodiment of a balloon heliostat with an approximately semispherical or semiellipsoidal base balloon 33 supporting a toroidal hoop 47, which in turn supports and maintains in tension a reflective (membranous) surface 30 and a bottom surface 31. As in prior embodiments, subambient pressure may be maintained in the enclosed volume 34 to impart a concave sunward, focusing shape to the reflective surface 30, The toroidal hoop is shown to have a C shaped section, and will be sufficiently rigid as to be able to react tension forces from surfaces 30 and 31 with azimuthal compression forces and without buckling. Alternate open or closed cross-sections are also possible for the toroidal hoop, within the spirit and scope of this invention.

Figure 12D:
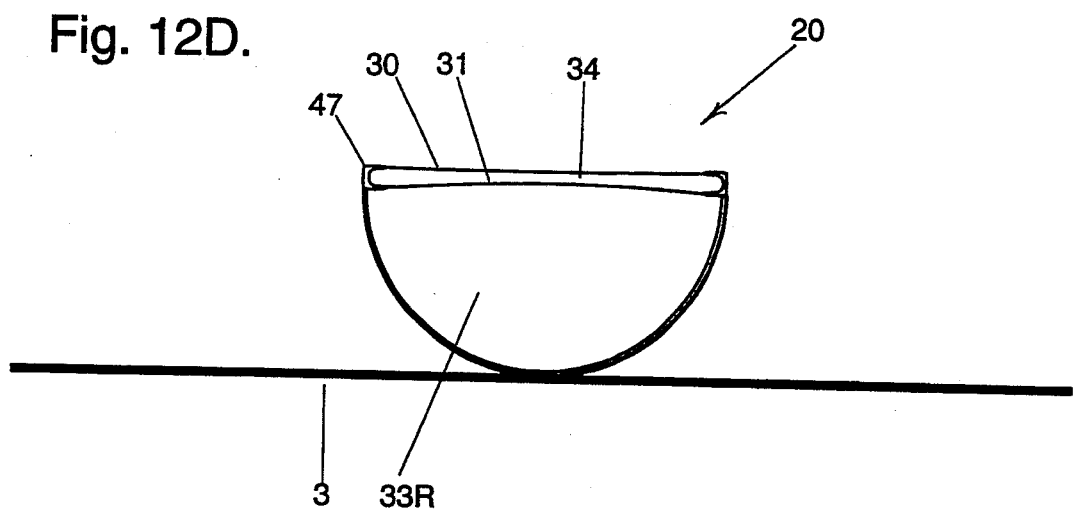

FIG. 12D shows an embodiment similar to FIG. 12C, but with a rigid bottom shell base balloon 33R. The base balloon is now semirigid, with the bottom part being rigid and the top (which is provided by the bottom surface 31 of the enclosed volume 34) being flexible. The rigid bottom shell of the base balloon 33R may be constructed of various typed of rigid structure ranging, for example, from unitary solid metal or plastic structure to multiple honeycomb sandwich panels assembled together.

Figure 12E:
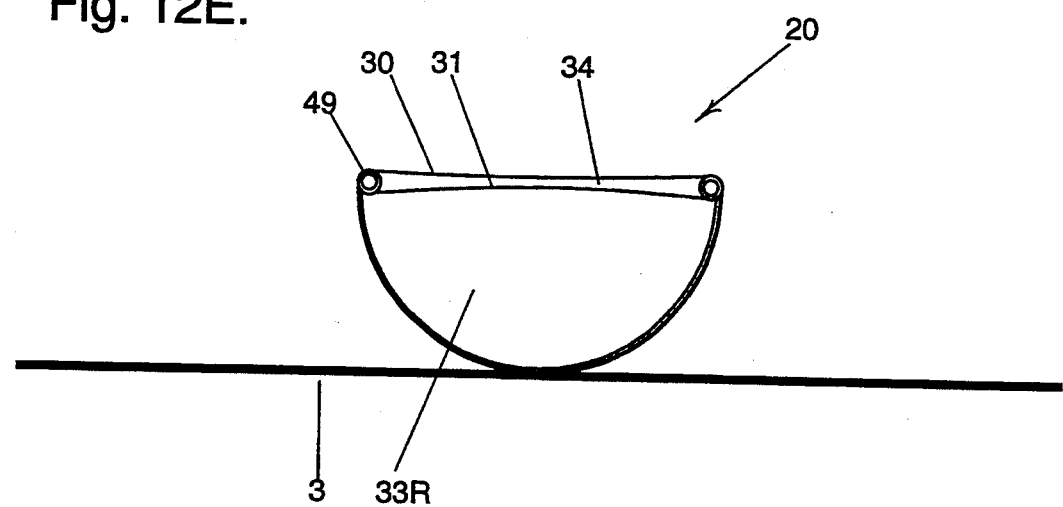

FIG. 12E shows an embodiment similar to FIG. 12D, with the toroidal hoop 47 with the open cross-section being replaced with a closed cross-section toroidal balloon/toroidal hoop structure 49. The toridal balloon/toroidal hoop structure 49 should be considered a rigid balloon if its enclosing surface is at least partially flexible and if it is inflatable or pressurizable. An exemplary rigid balloon could use a lightweight frame and stringer design supporting a covering flexible skin, sheet, or membrane. An example of such a rigid toroidal balloon will be seend in FIG. 17D. If the toroidal balloon/toroidal hoop structure 49 is pressurized to superambient pressure, the increased pressure can create a pressure induced outward force on structure 49 and can thereby contribute to reacting the tension forces in the surfaces 30 and 31 and to improving safety margin to azimuthal compression buckling of the structure 49.

Figure 12F:
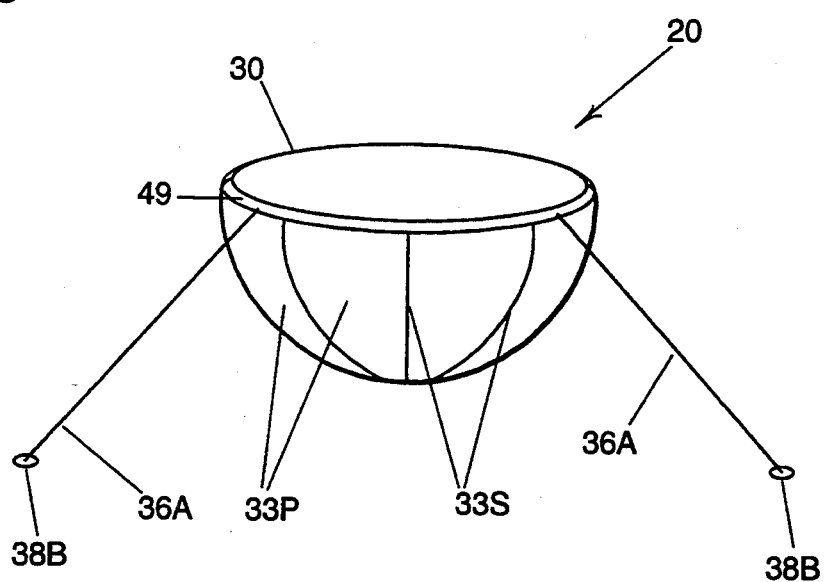

FIG. 12F shows a three-dimensional view of the FIG. 12E embodiment, with an exemplary construction of the rigid bottom shell of the base balloon 33R being shown as fabricated of multiple base balloon side panels 33P attached to each other along base balloon side panel seams 33S. Thus the inflated (base) balloon here comprises an inflated (i.e., superambient pressure) volume enclosed by plural enclosing surface elements, with adjacent enclosing surface elements attached to each other along seam lines. Attachment along seam lines may utilize mechanical, stitching, adhesive, pressure, or heat bonding means or combinations of these with each other and possibly with still other seam attachment means.

The side panels 33P may be fully rigid panels of solid or honeycomb sandwich construction, or may be semirigid panels featuring peripheral rigid frame plus interior stretched membrane construction. Exemplary variable effective length control tethers/rods 36A connecting the toroidal balloon/toroidal hoop structure 49 with control tether/rod base elements 38B, are also illustrated in this Figure.

FIG. 13 illustrates cross-sections of portions of several variant heliostats with reflective surfaces 30 supported around their periphery by toroidal balloons 32. The toroidal balloons may use a single contiguous toroidal inflated volume, or may have multiple separately inflated segments (e.g., circumferentially or/and radially or/and vertically segmented). The combined assembly of reflective surface and toroidal balloon may be supported on either a base balloon 33 (e.g., as in FIG. 3) or on a pedestal support via a bottom surface/membrane or connecting structure.

Figure 13A:
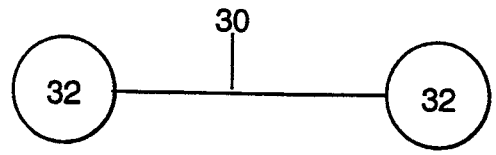
FIGS. 13A through 13G and 14A through 14D show embodiments with toroidal balloons having alternate shapes and arrangements.
Figure 13B:
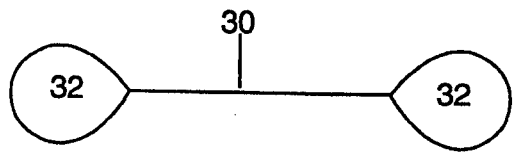
Figure 13C:
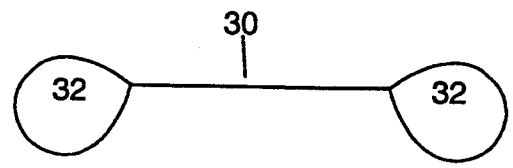
Figure 13D:
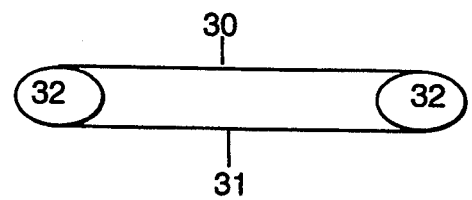
Figure 13E:
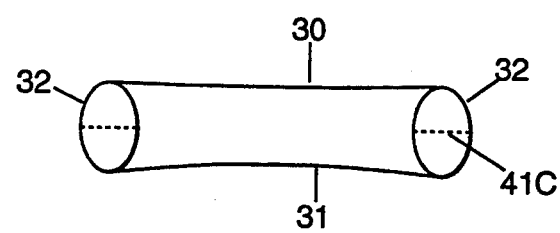
Figure 13F:
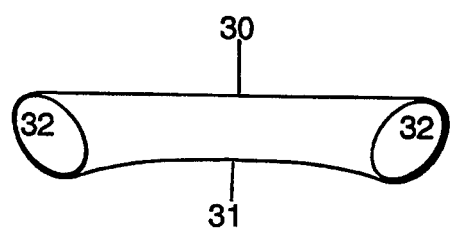
Figure 13G:
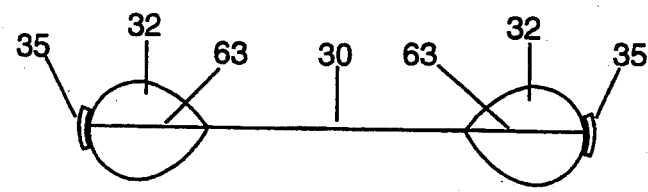

Use of a substantially circular section toroidal balloon with a substantially equatorially attached reflective surface 30 is shown in FIG. 13A. Use of a teardrop shape cross section toroidal balloon is shown in FIG. 13B, and a rotated teardrop shape is shown in FIG. 13C. Elliptical or oval toroidal balloon cross-sections are illustrated in FIGS. 13D, 13E and 13F, with the major axis of the ellipse/oval being substantially horizontal, vertical, or inclined respectively. These embodiments also show both a reflective surface 30 and a bottom surface 31, and FIG. 13E additionally illustrates the use of toroidal balloon shaping strings/wires/tethers 41C, installed inside the toroidal balloon 32. These tethers may be individually adjustable in tension at different azimuthal locations, to serve as reflective surface periphery planarity fine-tuning means through shape fine-tuning of the toroidal balloon 32 and in a manner somewhat analogous to the means shown and described with reference to FIGS. 10F and 10G. FIG. 13F shows the reflective surface looping around the toroidal balloon 32 to continue on to become the bottom surface 31, and thence back up to be the reflective surface 30 and thus form a sheath around the toroidal balloon 32. The parts of the sheath on the outer sides of the toroidal balloon may optionally be noncontinuous—e.g. these parts may be a sheet with holes or even a series of vertical or partly vertically oriented strings. A toroidal balloon with an internal tension sheet/tethers 63 is shown in FIG. 13G. The tension sheet/tethers may carry tension loads from the reflective surface 30 to control ring 35 which may optionally attach to the outer side of the toroidal balloon 32. The tension sheet/tethers may serve as means for minimizing reflective surface (e.g., reflective membrane) deflections.

FIG. 14 illustrates some embodiments using multiple toroidal balloons to support and stabilize the reflective surface 30. FIG. 14A shows an embodiment with a reflective surface 30, support means comprising an inflated toroidal balloon 83B for supporting the reflective surface, and further comprising an additional inflated toroidal balloon 83A also for supporting the reflective surface. The two toroidal balloons are preferably substantially concentric, as illustrated. The reflective surface may be attached on a seam to both toroidal balloons or only to balloon 83B. The bottom surface 31 may similarly be attached on a seam to both toroidal balloons or only to balloon 83B. Low pressures may be maintained in the enclosed volumes located below the reflective surface and not contained within the toroidal balloons, to shape the reflective surface concave up (for focusing) and to keep it contacting the inner toroidal balloon 83A for the case where it is not attached to the inner toroidal balloon 83A on a seam. The toroidal balloons may optionally be azimuthally segmented balloons.

Figure 14A:
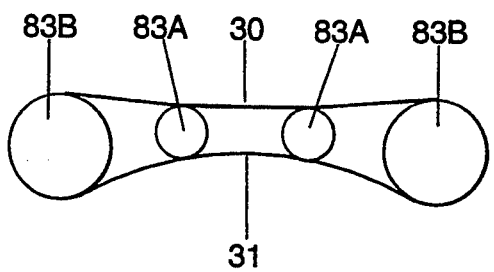
Figure 14B:
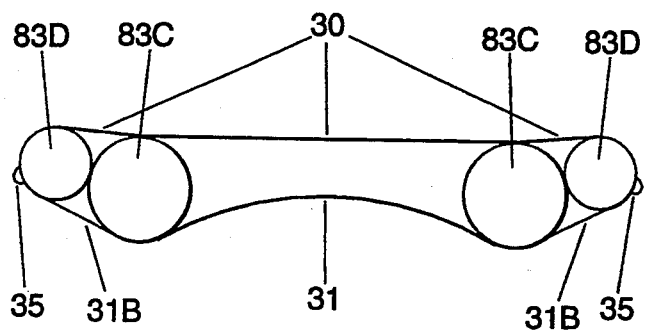

FIG. 14B shows a reflective surface 30 supported on two substantially concentric "stacked" toroidal balloons 83C and 83D. Control tethers/rods (not shown) may attach to the heliostat through a control ring 35 or directly to the outer bottom surface 31B or to the outer surfaces of either/both of the stacked toroidal balloons. The outer bottom surface 31B may be either a separate entity or a continuation of the bottom surface 31 and/or the reflective surface 30. Note in both FIG. 14A and FIG. 14B that the outer portion of the reflective surface 30 (i.e., that portion radially outboard of the contact ring with the inner toroidal balloons 83A or 83C) are shown nonplanar relative to the central portion of the reflective surface in a concave upwards (Sunward) sense so as to aid in focusing light reflected by the heliostat.

Figure 14C:
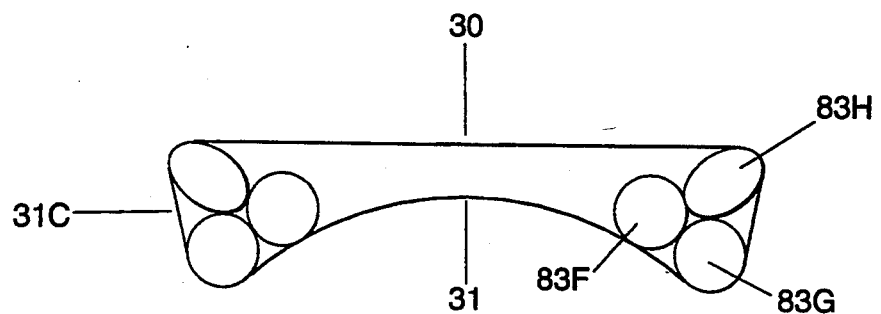

FIG. 14C shows and embodiment with the reflective surface 30 supported by 3 toroidal balloons—directly by 83H and indirectly by 83F and 83G. FIG. 14C also shows the use of an outer side surface 31C in a ring geometry connecting the outer sides of toroidal balloons 83G and 83H. The outer side surface 31C may be either a separate entity or a continuation of the bottom surface 31 and/or the reflective surface 30.

Figure 14D:
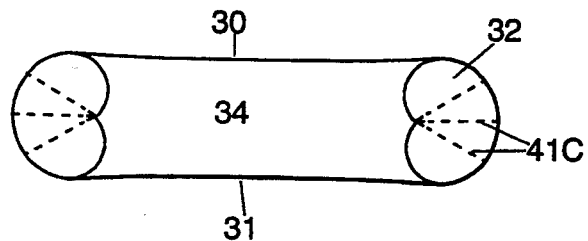

FIG. 14D shows a toroidal balloon 32 with internal toroidal balloon shaping strings/wires/tethers 41C, as illustrated.

Figure 14E:
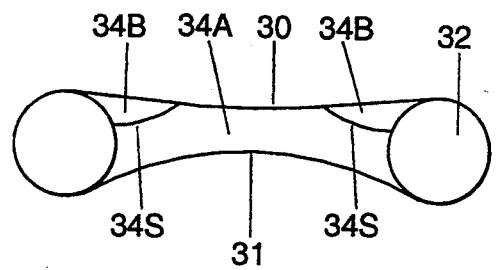
FIGS. 14E and 14F show multiple low pressure enclosed volumes under a reflective surface, which can be used to tailor the upward curvature of the reflective surface at different radial locations.
Figure 14F:
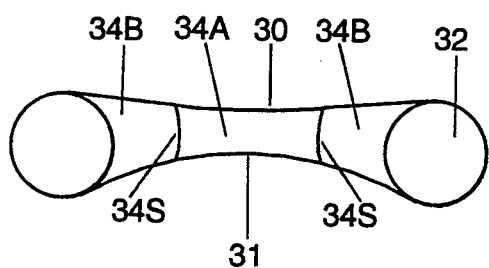

FIGS. 14E and 14F show embodiments in which the enclosed volume under the reflective surface 30 is segmented into at least two distinct and separate enclosed volume segments 34A and 34B, separated by a separating sheet 34S. Different (sub-ambient) pressures can optionally be maintained in the different enclosed volume segments—e.g., a lower pressure can be maintained in the inner segments 34A of FIGS. 14E and 14F to impart greater curvature to the reflective surface in its central part and to thus impart a closer-to-paraboloidal focusing shape to the reflective surface than would be possible without a segmented enclosed volume.

For all of the FIG. 14 cases, the toroidal balloons may each use a single contiguous toroidal inflated volume, or may have multiple separately inflated segments around the azimuth (circumference) of the torus.

FIG. 15 shows embodiments of balloon heliostats 20 with the toroidal balloon 32 replaced with a toroidal hoop 47. The toroidal hoop 47 is a substantially rigid structure with no flexible membrane surface elements, which reacts tension in the reflective and base membrane(s) with hoop compression (i.e., azimuthal compression). The toroidal hoop 47 provides additional support means for contributing to the support of the reflective surface 30 above the base balloon 33, and serves as a substantially rigid structure of substantially toroidal topology for supporting the reflective surface around its periphery.

Figure 15A:
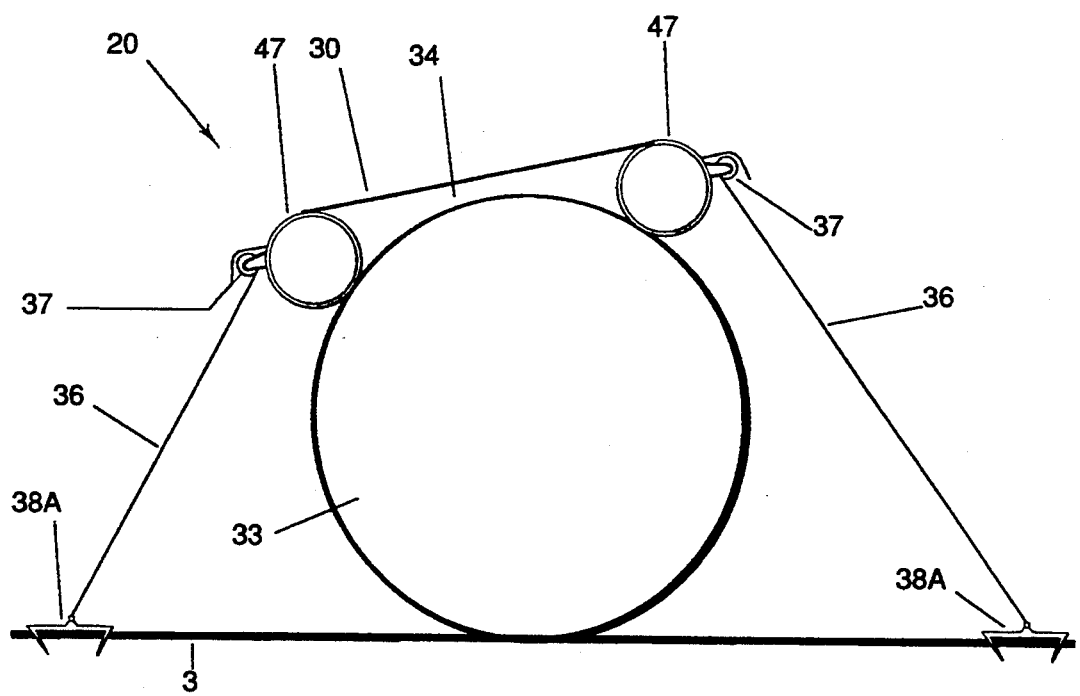
FIGS. 15A–C and 16 show embodiments incorporating a base balloon plus a toroidal structure (e.g., hoop) to support a reflective surface.
Figure 15B:
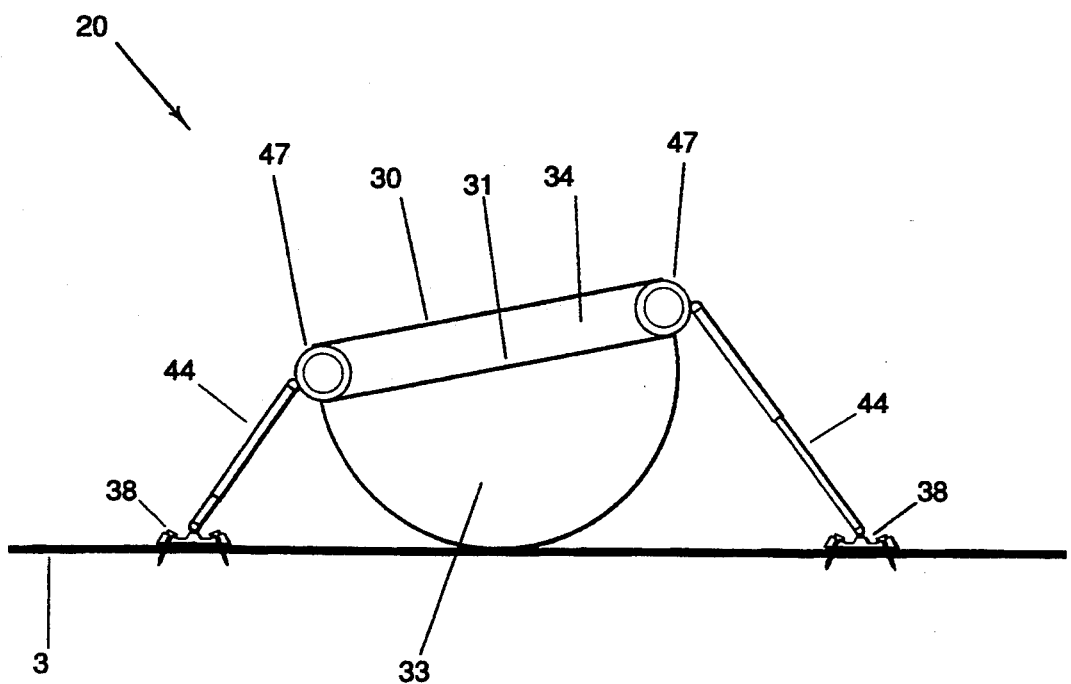
Figure 15C:
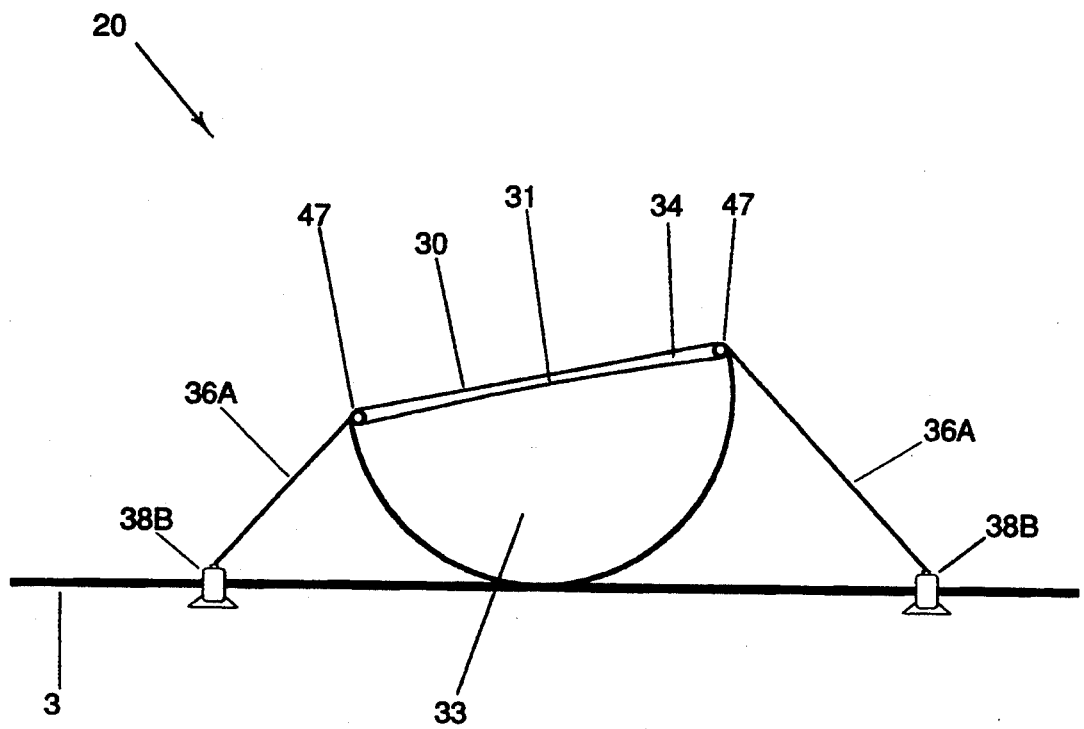

FIG. 15A shows an embodiment with a substantially spherical base balloon 33 while FIGS. 15B and 15C show embodiments with a substantially semispherical base balloon 33. The substantially spherical base balloon 33 in FIG. 15A may optionally be constructed of multiple segments attached along seams, in the manner known in the prior art for inflatable beach ball construction (e.g., orange slice shaped segments with top and bottom cap segments). The embodiments of FIGS. 15B and 15C are somewhat similar to the embodiment of FIG. 12E, but use a conventional base balloon 33 instead of a rigid bottom shell base balloon 33R. In the FIGS. 15B and 15C embodiments the reflective surface 30 is secured around its periphery to the toroidal hoop 47. The enclosed volume 34 (below the reflective surface 30 and above the bottom surface 31) can be maintained at a sub-ambient pressure in order to shape the reflective surface in a concave upwards focusing manner. Control tethers 36 or control rods 44 (designated control tethers/rods 36A in FIG. 15C) can also be secured directly to the toroidal hoop 47 (i.e., a control ring is not necessarily needed). In the embodiment of FIG. 15A tether positioning motorized reels 37 are shown at the top ends of the tethers, though they could also be located at the bottom ends of the tethers, in or on the control tether base elements 38A.

The embodiment shown in FIG. 15A shows an alternate configuration for control tether base elements 38A using preferably angled anchor stakes which penetrate the ground surface. The embodiment shown in FIG. 15B shows an alternate configuration for control rod base elements 38 using preferably angled ancho screws which penetrate the ground surface. Other control tether/rod configurations using anchor stakes or screws are possible within the scope of the invention.

Figure 16:
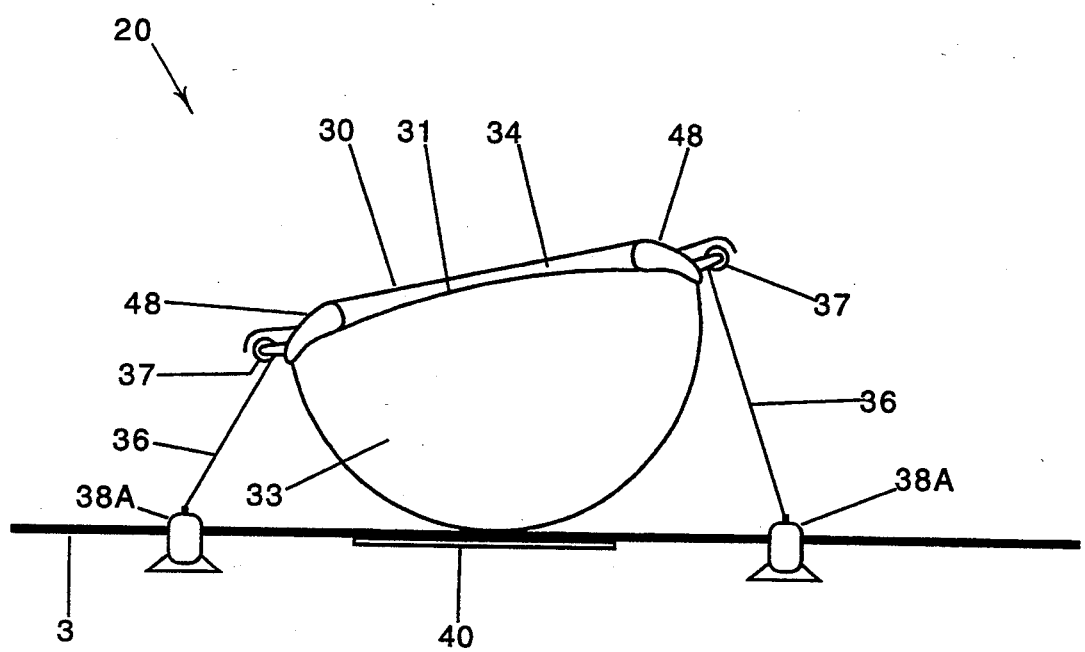

FIG. 16 shows an embodiment similar to the embodiments of FIG. 15, but with the toroidal hoop 47 replaced with a more general toroidal structure 48 which can feature a variety of possible cross-sections. The general toroidal structure 48 may be a toroidal balloon (which may or may not be fully rigid) or a rigid pressurized or unpressurized toroidal structure. The toroidal structure 48 will react membrane tension loads from surfaces 30 and 31 using circumferential (i.e., azimuthal) compression and/or outward pressurization induced force. A base plate 40 is also shown in this embodiment. The base plate 40 can aid in the smooth rolling of the base balloon 33 over the ground surface 3 as the heliostat is rolled to point in different directions as a function of time. The base plate 40 can also aid in distributing downward loads from the base balloon into the surface and subsurface layers of the ground surface 3.

FIG. 17 shows partial sectional views of balloon heliostat embodiments in which a part of a toroidal balloon 32 (which toroidal balloon supports a reflective surface 30) is rigid. FIG. 17A shows an embodiment with a rigid portion 32R of the toroidal balloon 32, which rigid portion is on the outer top part of the toroidal balloon and interfaces with the reflective surface 30 and the control tethers/rods 36A. As the control tethers/rods 36A interlace directly with this rigid portion, a separate control ring will probably not be necessary for this embodiment. If the control tether/rod attach point is located higher up on the outer side of the toroidal balloon 32, a smaller rigid section 32R could suffice. FIG. 17B shows an embodiment with the rigid portion 32R on the inner bottom part of the toroidal balloon and interfacing with the reflective surface 30, bottom surface 31, and control tethers/rods 36A. FIG. 17C shows an embodiment with the rigid portion 32R on the inner part of the toroidal balloon and interfacing with the reflective surface 30, bottom surface 31, and the top edge of an approximately semispherical or semiellipsoidal base balloon 33. FIG. 17D shows an embodiment in which the rigid portion 32R encompasses essentially the whole toroidal balloon, as the whole toroidal balloon is rigidified by a rigid structural framework immediately underlying the toroidal surface skin, in a manner analogous to that used in the construction of dirigible (rigid airship) or airplane fuselage structures. In this case the toroidal balloon is a rigid balloon, and the rigid portion 32R interfaces with the reflective surface 30, bottom surface 31, base balloon 33, and control tether/rods 36A. FIG. 17E illustrates an embodiment with the rigid portion 32R on the outer top part of the toroidal balloon as in FIG. 17A, but with the rigid portion now also interfacing with the top edge of an approximately semispherical or semiellipsoidal base balloon 33. In this embodiment the bottom surface 31 attaches to the nonrigid portion of the toroidal balloon.

FIG. 18 illustrates several variant embodiments of base balloon design, in vertical sectional views. FIG. 18A illustrates a typical nominally spherical base balloon 60 being supported on a base plate 40 by the ground surface 3. FIG. 18A also illustrates the use of at least one ballonet 69 whose pressure can be controlled via an externally accessible pressure control valve 26. Ballonets have been used in past airship applications to control the airship internal pressure, and the ballonet 69 serves a similar purpose in that it can be used to indirectly control the pressure in base ballon 60. In cases when the top of the base balloon serves also as the bottom surface of the enclosed volume under a reflective surface/membrane, the ballonet can also be used to indirectly change the internal pressure in this enclosed volume and thereby change the curvature and focal length of the reflective surface/membrane (e.g., to improve focusing or to deliberately defocus the reflector in an emergency).

Figure 18A:
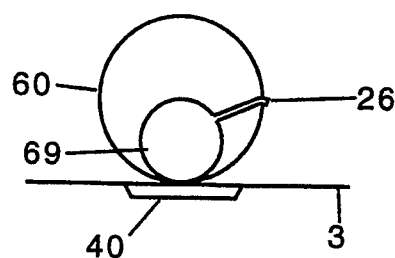
FIGS. 18A through 18G show embodiments of several different base balloon configurations.
Figure 18B:
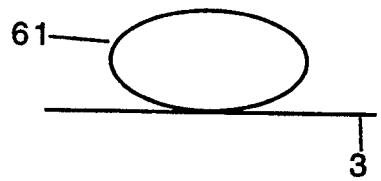

FIG. 18B shows a flattened or approximately ellipsoidal base balloon 61.

Figure 18C:
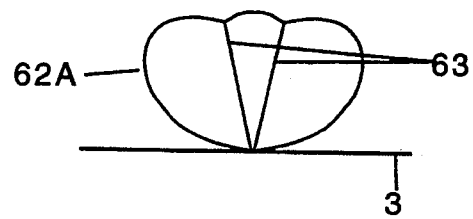
Figure 18D:
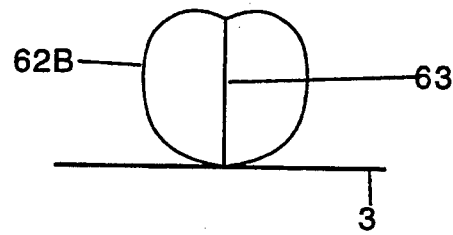
Figure 18E:
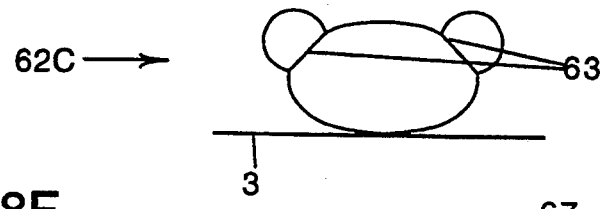

FIGS. 18C, 18D, and 18E illustrate variant base balloon embodiments 62A, 62B, and 62C which use internal tether means (i.e., tension sheets/tethers 63) within the inflated base balloon for affecting the shape of the inflated base balloon—specifically to reduce the size of the upward projection of the convex upper surface of the base balloon. If continuous nonperforated tension sheets are used, the inflated base balloon can be considered to include multiple related inflated chambers.

Figure 18F:
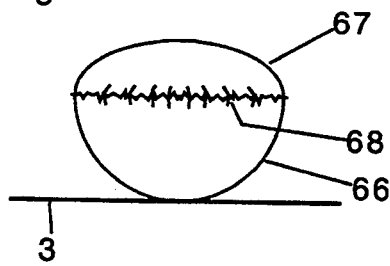
Figure 18G:
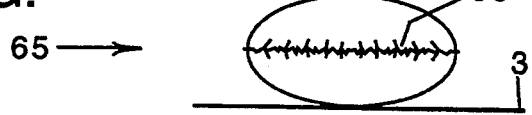

FIGS. 18F and 18G illustrate variant base balloons 65 with upper and lower portions secured along a seam 68. FIG. 18F more particularly shows a nominally semispherical bottom half 66 secured by a seam 68 to a flattened (substantially ellipsoidal) top half 67. FIG. 18G shows a substantially ellipsoidal base balloon with an equatorial crinkled seam 68. The crinkled seam attachment method for using two flat sheets attached along a seam around their periphery and then inflating to make substantially ellipsoidal/"flattened sphere" balloon halves is known in the prior art, for example in the popular mylar toy balloons used for birthday and other greetings.

This crinkle seam attachment method is illustrated in FIGS. 18F and 18G. The crinkle seam attachment method for two or more portions of a balloon can also be applied to other balloon configurations such as base balloon configurations 60 or 61 shown in FIGS. 18A and 18B, or to toroidal balloon configurations as for example shown in FIG. 13. With crinkle or smooth seam attachments, inflated balloons can be made to comprise inflated volumes enclosed by plural enclosing surface elements, with adjacent enclosing surface elements attached to each other along seam lines.

FIG. 19 illustrates further variant embodiments of balloon heliostats. Cross-sectional views are shown, with control tethers/rods not shown. FIG. 19A shows an embodiment similar to that shown in FIG. 7B, but with the top of the base balloon 33 replaced with a substantially rigid ring 51 supporting a bottom surface 31 for the enclosed volume 34. As the substantially rigid ring "steps down" from the upper contour of the base balloon, this embodiment permits the toroidal balloon 32 and the reflective surface 30 to be lowered relative to the base balloon 33, as compared with the embodiment of FIG. 7B.

Figure 19A:
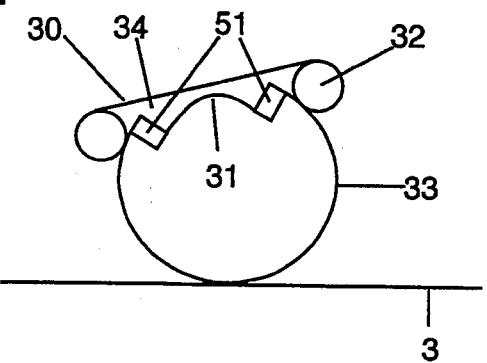
FIGS. 19A, 19B, 19C, and 19D show heliostat embodiments with base balloons.
Figure 19B:
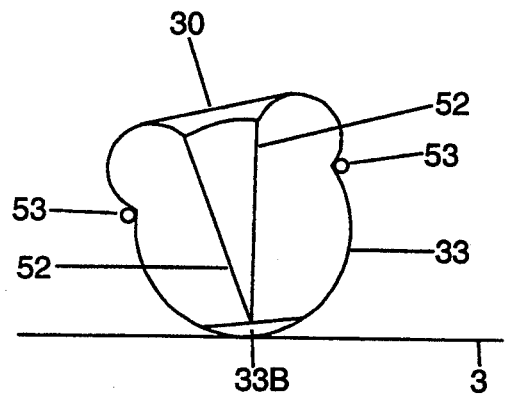

FIG. 19B shows an embodiment in which the base balloon 33 passes through a tension hoop 53 which makes a "waist" in the base balloon, in which the top part of the base balloon is pulled down by tension sheet/strings 52 running down to the base balloon bottom 33B, and in which the upper outer part of the base balloon (between the tension hoop and the tension sheet/strings 52) effectively serves in the role of a "toroidal balloon" for supporting the reflective surface 30 around its periphery. The tension sheet/strings 52 serve as internal tether means within the inflated base balloon 33 (the only balloon in this embodiment) for affecting the shape of the inflated base balloon. The tension hoop 53 can also serve as a control ring to which control tethers/rods can be attached.

Figure 19C:
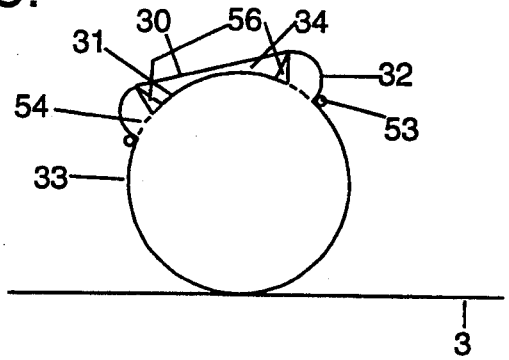

FIG. 19C shows an embodiment which also has a base balloon "waist" at a tension hoop 53, in which the base balloon surface splits (e.g., at a seam) into the surface of a toroidal balloon 32 and into a permeable/intermittent membrane 54 continuing on to become a (nonpermeable) lower surface 31 for the enclosed volume 34, in the region above the tension hoop 53. Thus in this embodiment a common pressurized gas volume is shared between the base balloon 33 and the toroidal balloon 32. The surface of the toroidal balloon 32 continues on top to become the reflective surface 30, when it passes past a typically conical compression structure 56 for supporting the reflective surface. The compression structure 56 carries vertical compressive loads arising from the tension in the reflective surface 30 and bottom surface 31 coupled with the typically sub-ambient pressure in the enclosed volume 34 (where subambient pressures are used to help make the reflective surface concave up and aid in heliostat focusing).

Figure 19D:
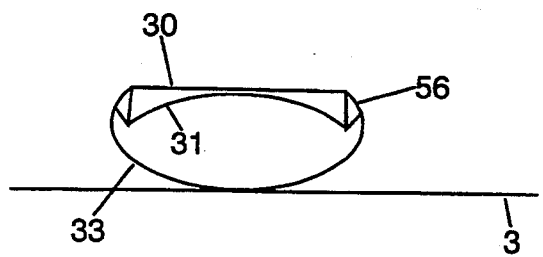

FIG. 19D shows an embodiment with an open-on-top base balloon 33 which supports a compression structure 56 around its upper periphery, which compression structure in turn supports both the reflective surface 30 and the bottom surface 31. The radial tension loads on the reflective surface and bottom surface 31 are reacted by circumferential compression loads on the compression structure 56.

FIG. 20 illustrates four embodiments showing additional methods of attaching control tethers/rods 36A to a balloon heliostat for enabling the reflective surface 30 to be oriented as required to track the Sun (i.e., to reflect incident solar radiation to a solar receiver even as the Sun executes its apparent motion through the sky). FIG. 20A shows an embodiment similar to FIG. 7B, but with a control ring 35 installed around the base balloon 33 rather than around the outer circumference of the toroidal balloon 32. In this embodiment control tether/rod attach point local loads are less likely to distort the reflective surface perimeter planarity because the control tethers/rods attach to the base balloon rather than to the toroidal balloon. On the other hand, pointing precision may be lowered somewhat as there is a longer load path from the control tether/rod attach points to the reflective surface 30, especially if pressure in the base balloon is lower than in the toroidal balloon (as it typically may be).

Figure 20A:
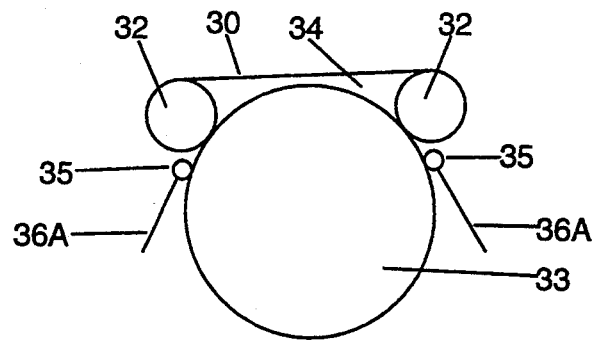
FIGS. 20A through 20D, 21, 22A, 22B, 23, 24A through 24H, 25A through 25D, 26A and 26B show embodiments illustrating ballon heliostats, orientation control for balloon heliostats, and other features.
Figure 20B:
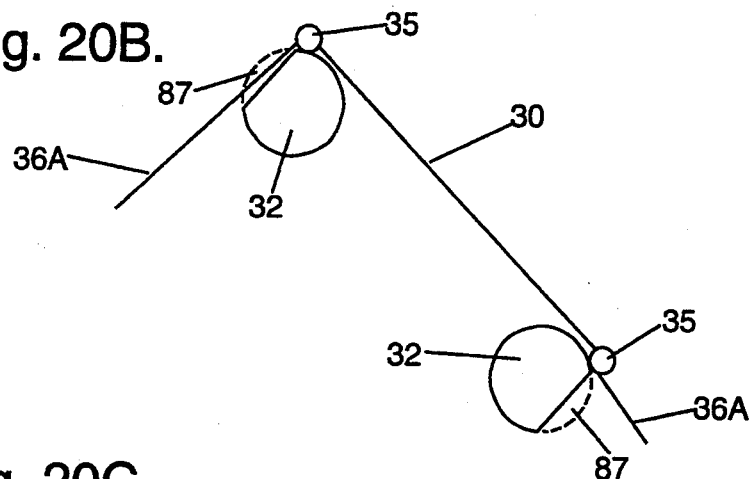

FIG. 20B illustrates a sectional view of a portion of a balloon heliostst embodiment with the control ring on the outer top of the toroidal balloon 32, at which location the control ring can also serve as the support for the reflective surface 30 around its perimeter. The control tethers/rods 36A may now sometimes need to penetrate through the toroidal balloon 32, as illustrated. This penetration can be accomplished by adding notches or holes 87 in the toroidal balloon at those azimuthal locations where control tethers/rods are to be located.

Figure 20C:
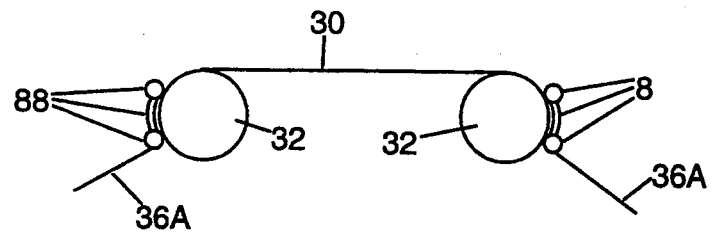

FIG. 20C shows a sectional view illustrating use of a cage-like structure 88 which holds the toroidal balloon 32 tightly in place within the cage-like structure. The control tethers/rods 36A are then secured to the cage-like structure to thereby control the azimuth and elevation of the reflective surface 30.

Figure 20D:
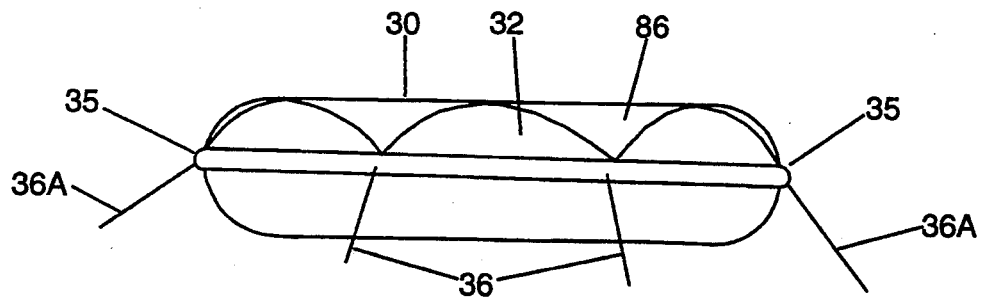

FIG. 20D shows a side view of an embodiment in which a control ring 35 is installed around the outer periphery of a toroidal balloon 32. Extended parts 86 of the reflective surface 30 extend beyond the top crest of the toroidal balloon (as was the case in FIG. 11B) and attach to the control ring 35, as illustrated. The attachment of the ends of the extended parts 86 may include adjustment means for adjusting local tension on the extended parts and thereby providing means for adjusting the shape of the periphery of the reflective surface 30 to improve the planarity of said periphery. Alternatively, the reflective surface 30 may be attached along a seam around the top of the toroidal balloon (and connect to the control ring through the toroidal balloon). The control tethers/rods attach to the control ring 35 at a plurality of peripheral/azimuthal locations.

Figure 21:
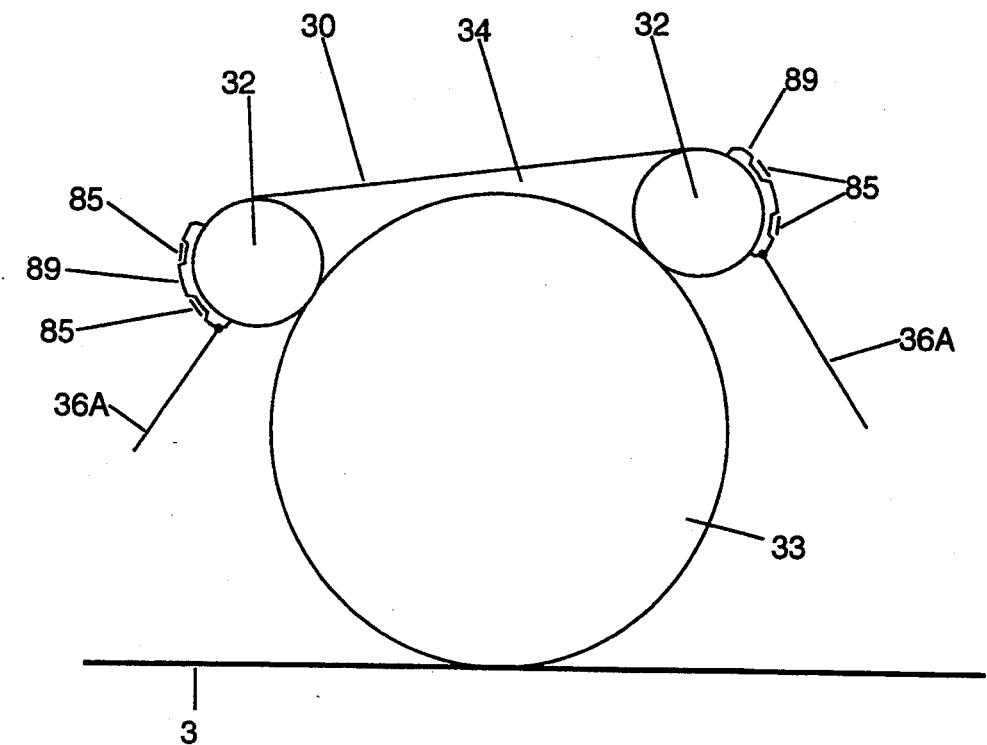

FIG. 21 illustrates an embodiment of a balloon heliostat similar to that shown in FIG. 7B, but with an alternate method of attaching the upper ends of the elongated control elements (e.g., control tethers/rods 36A) to the heliostat. In this embodiment a plurality (e.g., typically 6 or more) of balloon holding frames 89 are located in a spaced manner around the outer periphery of the toroidal balloon 32. Circumferential tension band(s) 85 hold these frames tightly against the outer surface of the toroidal balloon 32. The balloon holding frames 89 and tension band(s) 85 together provide means for holding the toroidal balloon 32 tightly in place in a manner analogous to the similar means provided by the cage-like structure 88 of FIG. 20C. Now, in FIG. 21, the upper ends of control tethers/rods 36A are attached to the balloon holding frames 89 (or possibly to the tension band(s) 85) to provide pointing control for the heliostat. Control tethers/rods 36A may optionally be bifurcated/multifurcated at their upper ends to enable attachment to two or more balloon holding frames.

In summary, the embodiment illustrated in FIG. 21 uses elongated control elements (control tethers/rods 36A) which provide tension links between substantially rigid structure to which reflective surface 30 is connected, on the one hand, and base elements (not shown) affixed to ground surface 3, on the other hand. The substantially rigid structure comprises inflated toroidal balloon 32 in combination with a plurality of balloon holding frames 89 distributed around the outer periphery of the inflated toroidal balloon and pressed against the inflated toroidal balloon by means of circumferential tension bands 85.

The balloon holding frames 89 may incorporate fine shaping adjustment means, acting through the toroidal balloon to improve the planarity of the periphery of the reflective surface 30. Such means can be used to improve the precision of planarity of the reflective surface periphery. For example, provision may be made for shims to be inserted between the upper ends of the balloon holding frames 89 and the surface of the toroidal balloon 32, or for adjustable height contact elements (e.g., contact pads) to be provided at the interface betweeen the balloon holding frames 89 and the toroidal balloon 32.

Figure 22A:
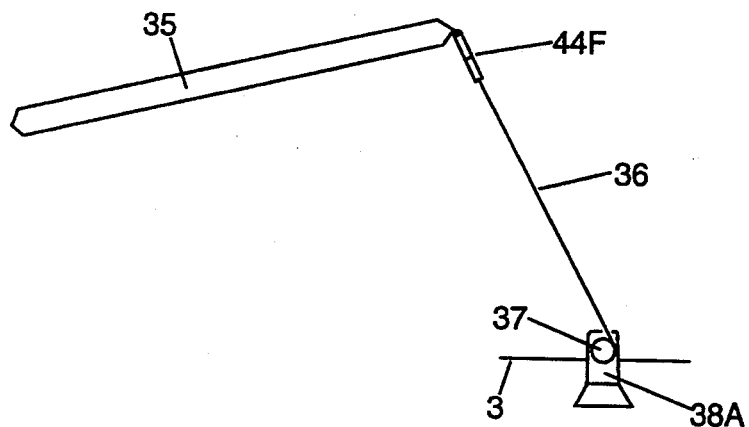
Figure 22B:
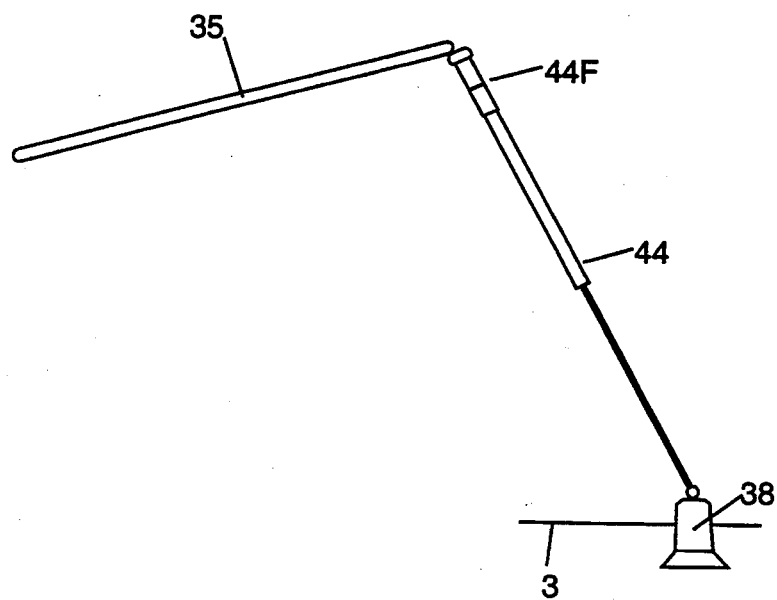

FIGS. 22A and 22B illustrate use of a fine control control rod 44F in series with a control tether 36 or a control rod 44. The fine control control rod is preferably connected at its upper end to a control ring 35, which in turn controls heliostat reflective surface pointing (heliostat reflective surfacenot shown). The fine control control rod 44F will typically provide precise fine control of its length, and may also provide high bandwidth control for controlling and diminishing wind/gust induced motions of the control ring 35 (or other control tether/rod attachment points such as attachment to balloon holding frames) and of the reflective surface 30 of the heliostat (not shown). While the fine control control rods 44F are shown at the upper ends of total control tether/rod installation, they could alternatively be located at the lower ends or middle parts of the total installation of elongated control elements providing tension links between substantially rigid structure to which a heliostat reflective surface is connected, on the one hand, and base elements such as control rod base element 38 or control tether base element 38A affixed to ground surface 3, on the other hand. Also, fine control control tethers could be provided in lieu of fine control control rods. Various combinations of relatively finer and coarser control tethers and/or rods, optionally bifurcated/multifurcated at their ends, could be used within the spirit and scope of the present invention.

Figure 23:
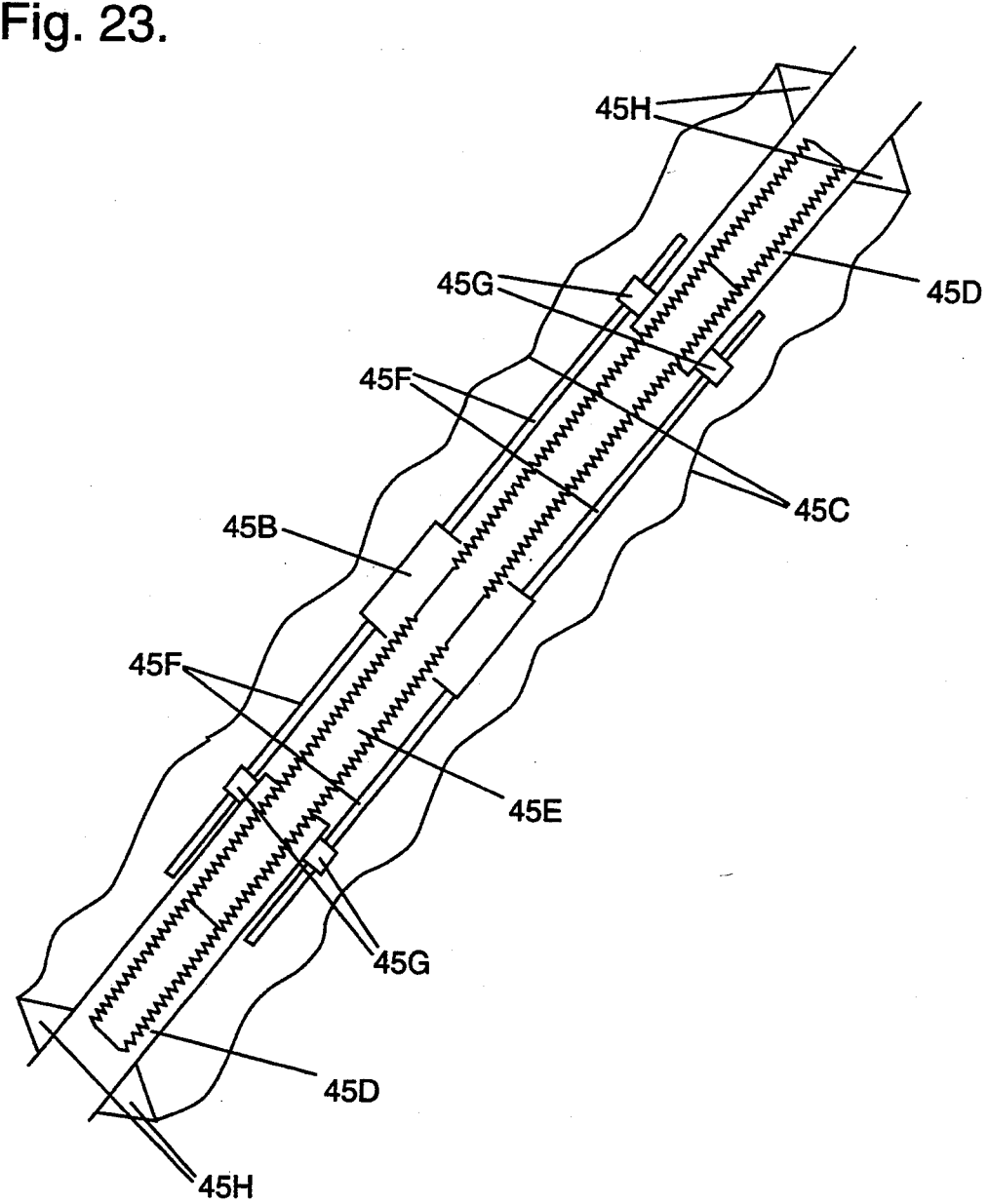

FIG. 23 illustrates a representative embodiment of a control rod screw actuator 45A. This control rod screw actuator serves as contributory means for controlling effective length of an elongated control element (here a control rod), which elongated control element in turn is included as part of the control means for orienting a heliostat reflective surface. The control rod screw actuator mechanism may be used to vary the length of a control rod or a fine control control rod. In the illustrated embodiment, the upper and lower ends of the control rod comprise control rod nonrotating elements 45D. A control rod rotating element 45E connects the two control rod nonrotating elements 45D and interfaces with them via a screw thread interface. The screw threads are defined such that rotation of the rotating element 45E one way will cause the upper and lower nonrotating elements 45D to be drawn together (i.e., cause the control rod to effectively shrink) while rotating the rotating element 45E the other way will cause the nonrotating elements 45D to move apart (i.e., cause the control rod to effectively lengthen). A rod control motor 45B is provided to drive the control rod rotating element 45E so as to cause the control rod to shrink or lengthen. The torque generated by the motor 45B when it is driving the rotating element 45E is reacted by motor torque reacting rods 45F, which attach to the motor substantially rigidly and which attach to the control rod nonrotating elements 45D through sliding contactors 45G. Power to the motor 45B may optionally pass through the sliding contact interface at 45G or through flexible wires (not shown). The entire rod length control assembly is enclosed in a weather protective screen 45C, which is supported from the upper and lower control rod nonrotating elements 45D through optional weather protection screen supports 45H. The weather protection screen comprises a flexible foldable/crumpleable variable length impermeable surface.

While FIG. 23 shows the rotating element 45E fitting inside both the upper and lower nonrotating elements 45D, in alternate embodiments (e.g., such as FIG. 5A), the center (rotating) element may fit inside one of the nonrotating elements and outside the other, or possibly also outside both the nonrotating elements. If the center (rotating) element fits inside one of the nonrotating elements and outside the other, different screw thread pitches may optionally be used for the two interfaces, and the inner and outer threads may both be present for some part of the rotating element's length to enable increased total effective length variation of the elongated control element. Still further alternate means for varying the effective length of the elongated control element may use substantially parallel but noncolinear upper and lower control rod segments with a connecting sleeve incorporating screw actuators. In alternate embodiments piston or reel type actuators may also be used instead of or in addition to screw type actuators for varying effective length of control rod or control tether types of elongated control elements.

Alternate embodiments are possible with the motor mounted on either the lower or upper control rod element, and with a rotating lower or upper rod fitting into a rotation-allowing connector at the control rod base element or at the control ring connection. In the latter case the control rod will comprise one each of a control rod rotating element and a control rod nonrotating element, rather than the one control rod rotating element and two control rod nonrotating elements shown.

FIG. 24 shows top views of several balloon heliostat embodiments, which feature control means for orienting the reflective surfaces 30 which control means includes at least three elongated control elements providing (preferably tension) links between substantially rigid structure (e.g., a substantially rigid control ring 35 as shown earlier in FIG. 3 and other Figures or toroidal balloon/toroidal hoop structure 49 in FIG. 12F) to which the reflective surface is connected, on the one hand, and control tether/rod base elements 38B affixed to the ground surface, on the other hand.

Several different arrangements of elongated control elements (control tethers/rods 36A) relative to the reflective surface 30 of a balloon heliostat are shown. The lower ends of the control tethers/rods 36A are secured to control tether/rod base elements 38B secured in the ground surface. The upper ends of the control tethers/rods may attach to substantially rigid structure in the body of the balloon heliostat such as attachment to a control ring, direct attachment to a toroidal balloon, or by other means. Differentially changing the effective lengths of the control tethers/rods is the preferred means used for controlling the orientation (i.e., azimuth and elevation) of the reflective surface 30.

Figure 24A:
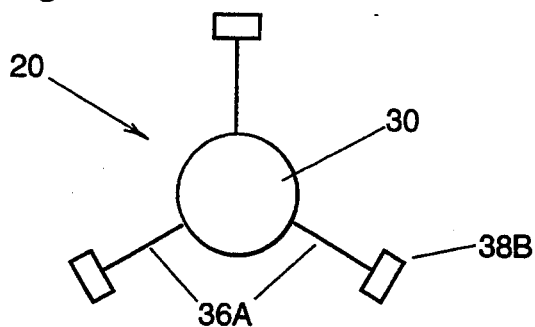

FIG. 24A shows a triangular arrangement, with the upper ends of three control tethers/rods 36A attaching to points arranged approximately 120 deg. apart azimuthally around the heliostat. Means for individually varying the lengths of the different control tethers/rods (not shown) provide the means for controlling the orientation (i.e., azimuth and elevation) of an average perpendicular line to the reflective surface.

Figure 24B:
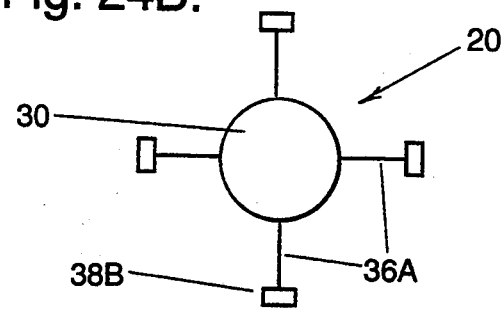

FIG. 24B shows a square/rectangular/diamond shaped control tether/rod configuration with control tethers/rods being separated by approximately 90 deg. azimuthally. Base elements are shown at locations approximately equidistant from the central ground contact point of an upward facing heliostat. However, in variant embodiments wherein the required range of elevation control is nonuniform over the range of azimuths needed, it may be preferable to locate base elements at nonequidistant locations.

Figure 24C:
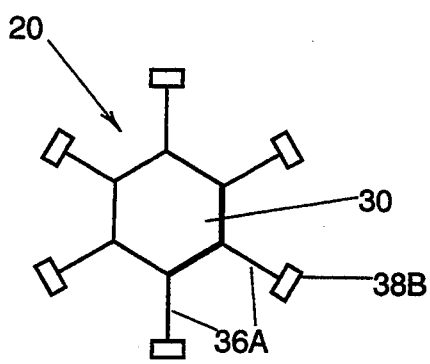

FIG. 24C shows an embodiment with 6 control tethers/rods arranged approximately 60 deg. apart azimuthally, in conjunction with a hexagonal planform reflective surface for the balloon heliostat. It should be understood that various embodiments of balloon heliostats may employ noncircular planform reflective surface configurations such as hexagonal, triangular, square, polygonal, elliptical/oval, and union of multiple intersecting circles, ellipses, or polygons.

Figure 24D:
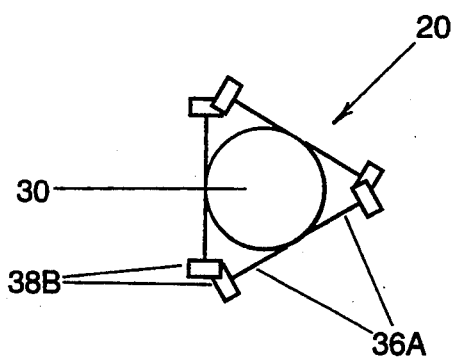

FIG. 24D shows a configuration with 3 pairs of control tether/rod base elements mutually separated azimuthally by about 120 degrees. Six control tether/rod elements connect these 3 pairs of base element with control tether/rod element attachment means on the body of the balloon heliostat which are azimuthally shifted by approximately 60 degrees relative to the base element pairs. In plan view the 2 control tether/rod elements attaching to each attachment means are approximately linearly disposed. In the case of control tethers being used, the 2 control tether elements attaching to each attachment means may actually be portions of a single tether which passes through an eyehook type of attachment means fitted to the body of the balloon heliostat. In this case one end of each tether may be fixedly attached to a base element, while the other end is reelably attached using a tether positioning motorized reel similar to those shown in FIG. 5B (not shown here for simplicity).

Figure 24E:
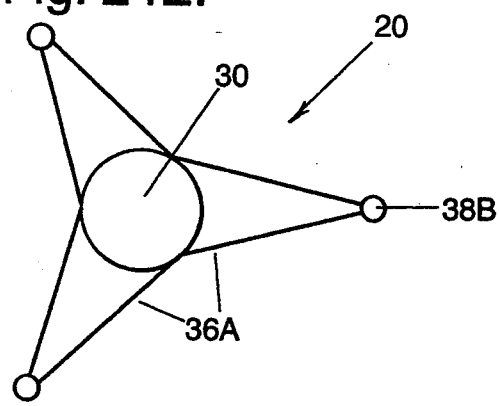
Figure 24F:
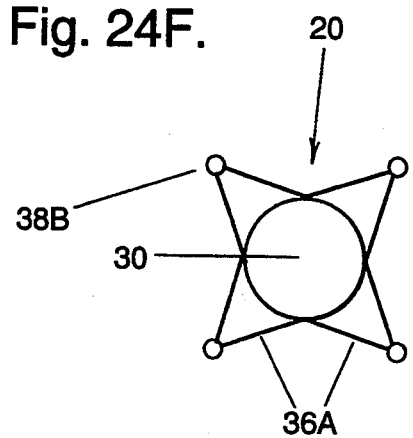

FIG. 24E shows a configuration similar to FIG. 24D, but with the 3 pairs of base elements shown in FIG. 24D combined into the 3 illustrated base elements 38B in FIG. 24E, which are also moved radially outwards relative to the body of the heliostat. This configuration therefore has 3 base elements and 6 control tether/rod elements. FIG. 24F shows an embodiment similar to FIG. 24E, but with 4 base elements and 8 control tether/rod elements.

Figure 24G:
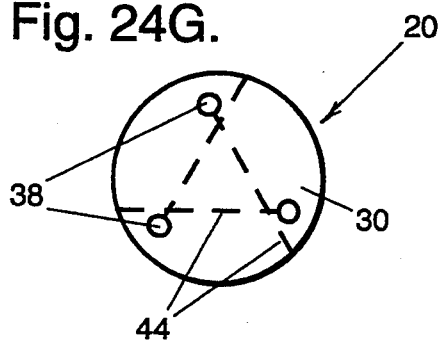

FIG. 24G shows an embodiment of a balloon heliostat with a skewed tripod type of support, with 3 control rods 44 connecting control rod base elements 38 (situated below the body of the heliostat) with attachment points on the periphery of the body of the heliostat (e.g., on a control ring or on the underside of a toroidal balloon). Note that use of the under-heliostat tripod support using controllable length control rods will preclude use of a base balloon in this particular embodiment of a balloon heliostat. Note also that the control rods will preferably be azimuthally substantially fixed (i.e., not free to rotate azimuthally) relative to the base elements in this embodiment. This embodiment is one of the few where the control rods need to carry compressive forces, and therefore cannot be replaced by control tethers in an alternative embodiment. Note that in most embodiments using a control tether, the control tether can be optionally replaced by a control rod, unless the tether sometimes needs to take on a non-linear geometry (e.g., curving along the outside of a toroidal balloon down from a top-of-toroidal balloon control ring).

Figure 24H:
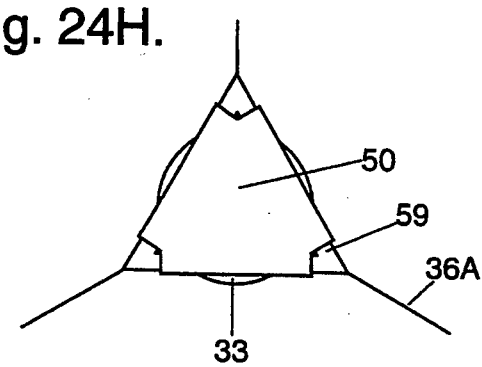

FIG. 24H shows a top view of an embodiment of a balloon heliostat with a base balloon 33 (e.g., could be like base balloons shown in FIGS. 18F or 18G) which supports a reflective membrane 50 through three substantially cylindrical structural elements 59 arranged in a triangle and sitting on top of the base balloon 33. The triangular structure made from the three substantially cylindrical structural elements will rest on three contact zones on the upper surface of the base balloon. The substantially cylindrical structural elements 59 may be rigid or inflated structural elements, and if rigid may be solid or hollow. If inflated, the three elements 59 may have three separate inflated chambers or a single connected inflated chamber. Control tethers/rods 36A will preferably attach at their upper ends to the outer intersection lines between adjacent elements 59. The reflective membrane 50 attaches to the elements 59 by having extensions of the reflective surface wrapping around part or all of the elements 59 and being attached thereto along seam lines or zones in a conventional manner (e.g., by adhesive or mechanical or heat bond means).

FIG. 25 shows some further variant control tether/rod configurations. FIG. 25A shows an embodiment wherein three control tethers/rods 36A attach to three control tether/rod base elements 38B spaced approximately 120 deg. apart azimuthally around the reflective surface 30 of the heliostat, as in FIG. 24A. The difference here is that each control tether/rod bifurcates or splits into a multiline (i.e., multitether/multirod) extension 92, the ends of which attach to the reflective surface 30 directly or indirectly (e.g., through a toroidal balloon support structure, a control ring, or backing structure for the reflective surface—not shown). In the case of bifurcated control tethers being used, the 2 control tether elements attaching to each attachment means 91 may actually be portions of a single tether which passes through an eyehook type of attachment means.

Figure 25A:
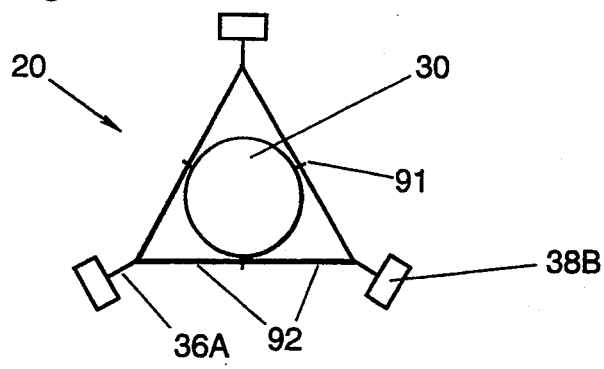
Figure 25B:
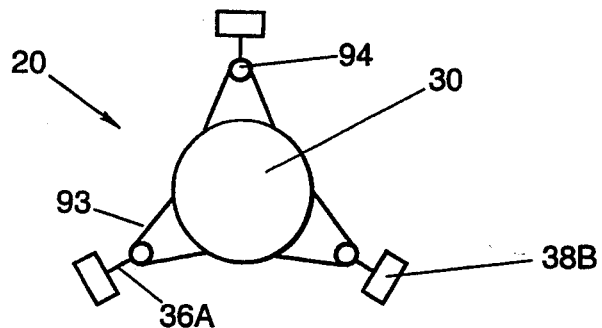

FIG. 25B shows an embodiment similar to that of FIG. 25A, with the bifurcated/multiline extensions 92 replaced by looped tether elements 93 looped around pulleys 94 at the upper ends of (the nonbifurcated parts of) the control tethers/rods 36A. The use of the looped tether elements 93 (or alternatively of bifurcated/multiline extensions 92) to the control tethers/rods 36B can result in 6 or more attach points around the periphery of the reflective surface 30 even with the use of only three control tethers/rods and three control tether/rod base elements, as illustrated in this embodiment. The increased number of attach points can distribute loads and reduce the weight of the reflective surface support structure/control ring, or can eliminate the need for a control ring by allowing direct attachment of the upper ends of the looped tether elements 93 or the bifurcated/multiline extensions 92 to the outer sides of a toroidal balloon supporting the reflective surface 30, In summary, the use of the looped tether elements 93 provides load distribution means for distributing tensile loads from each of the elongated control elements 36A to at least two locations on substantially rigid structure (e.g., control ring and/or toroidal balloon) to which the reflective surface is connected.

Figure 25C:
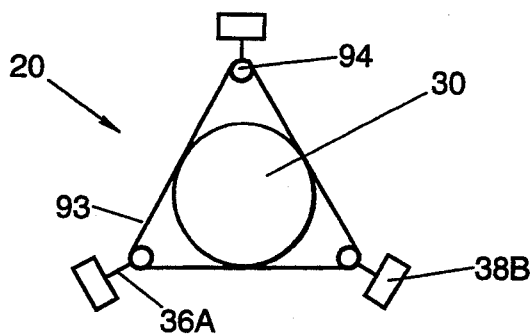

FIG. 25C shows an embodiment similar to that shown in FIG. 25B, with the looped tether elements attaching to the body of the balloon heliostat at 3 attachment points rather than 6. Unlike the case in FIG. 25A, the attachment means is fixed only and may not be of the eyehook type.

Figure 25D:
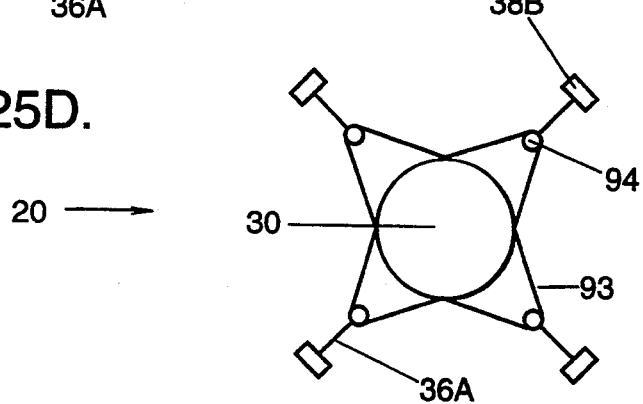

FIG. 25D shows an embodiment similar to FIG. 25C, but with four looped tether elements 93 rather than three. Clearly other variations and combinations of the embodiments shown in FIGS. 25A through 25D are possible within the spirit and scope of the invention (e.g., the use of 5 or more looped tether elements or sets of bifurcated/multiline extensions).

Figure 26A:
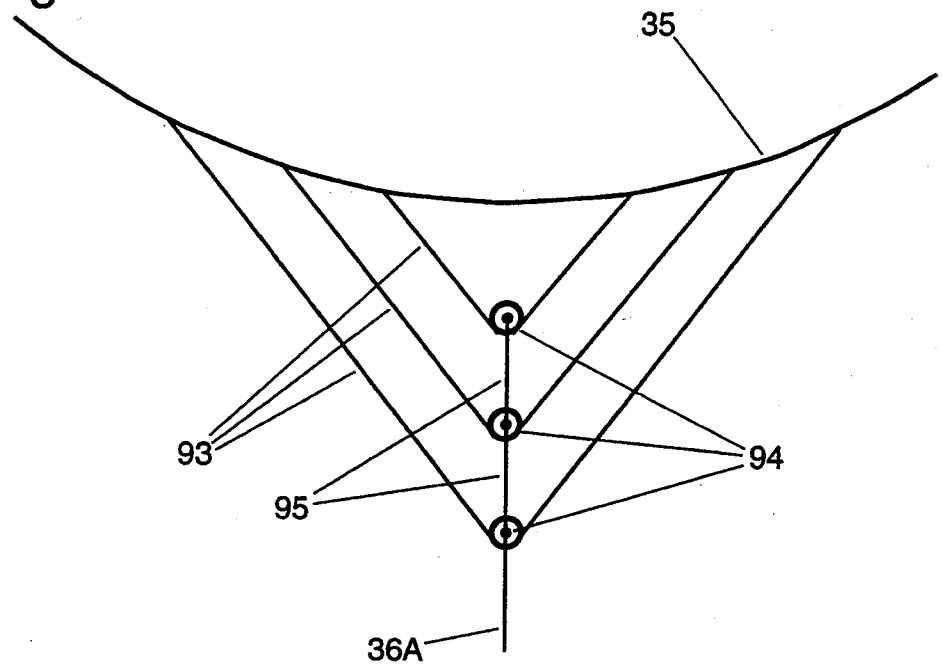
Figure 26B:
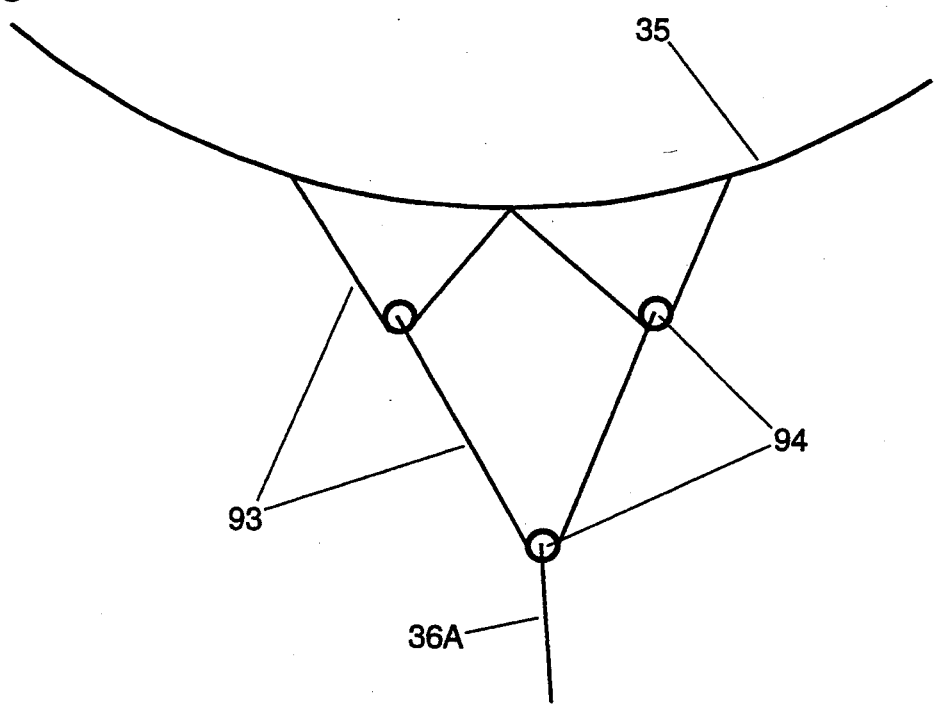

FIGS. 26A and 26B also show load distribution means for distributing tensile loads from an elongated control element 36A to at least two locations on substantially rigid structure (e.g., control ring 35) on the periphery of the heliostat. These Figures show partial views of embodiments using multiple looped tether elements 93 attached to the upper end of each control tether/rod 36A. The use of multiple looped tether elements attached to each control tether/rod can further enhance distribution of control tether/rod loads around the periphery of the control ring 35. FIG. 26A shows the use of multiple looped tether elements 93 in a one-loop-within-another configuration. Multiple pulleys 94 support the multiple looped tether elements 93, and in turn are connected to the control tether/rod 36A via elastic (e.g., approximately constant tensile force) inter-pulley elements 95. FIG. 26B shows the use of heirarchical or "staged" looped tether elements, with the upper ends of the looped thether elements 93 of a lower stage attaching to the pulleys 94 at the lower ends of the next higher stage of looped tether elements. For the embodiments of FIGS. 26A and 26B clearly different numbers of loop elements can be used within the spirit and scope of the invention.

Figure 27A:
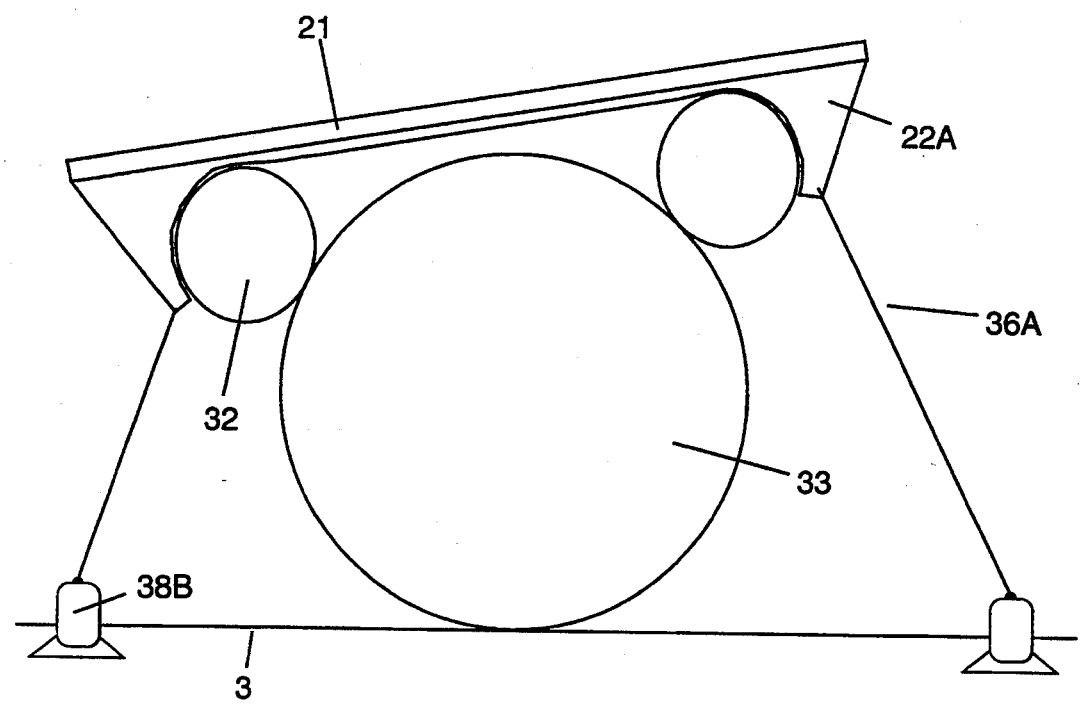
FIGS. 27A through 27C, 28A and 28B show further embodiments of balloon heliostats with full or partial base balloons.

FIG. 27A shows an embodiment of a balloon heliostat with a reflective surface comprising a conventional (e,g., glass) mirror 21 (which may also be an assemblage of multiple mirror segments arranged planarly or concave up) supported above a base balloon 33 and toroidal balloon 32 by mirror support structure 22A. A stretched reflective membrane on a rigid hoop in circumferential compression could be optionally used in place of the conventional mirror 21. Note that a substantially semisperical base balloon could be used as an alternative to the substantially spherical base balloon illustrated. The mirror support structure 22A provides additional support means (over and above the support means furnished by the base balloon 33) for supporting the reflective surface above the base balloon and toroidal balloon. A variety of alternative conventional structural concepts could be employed to provide the mirror support structure (e.g., lightweight truss structure, shaped polystyrene or other lightweight material structure). Variable effective length control tethers/rods 36A for heliostat orientation control preferably attach to the heliostat through attach points on the mirror support structure, as shown.

Figure 27B:
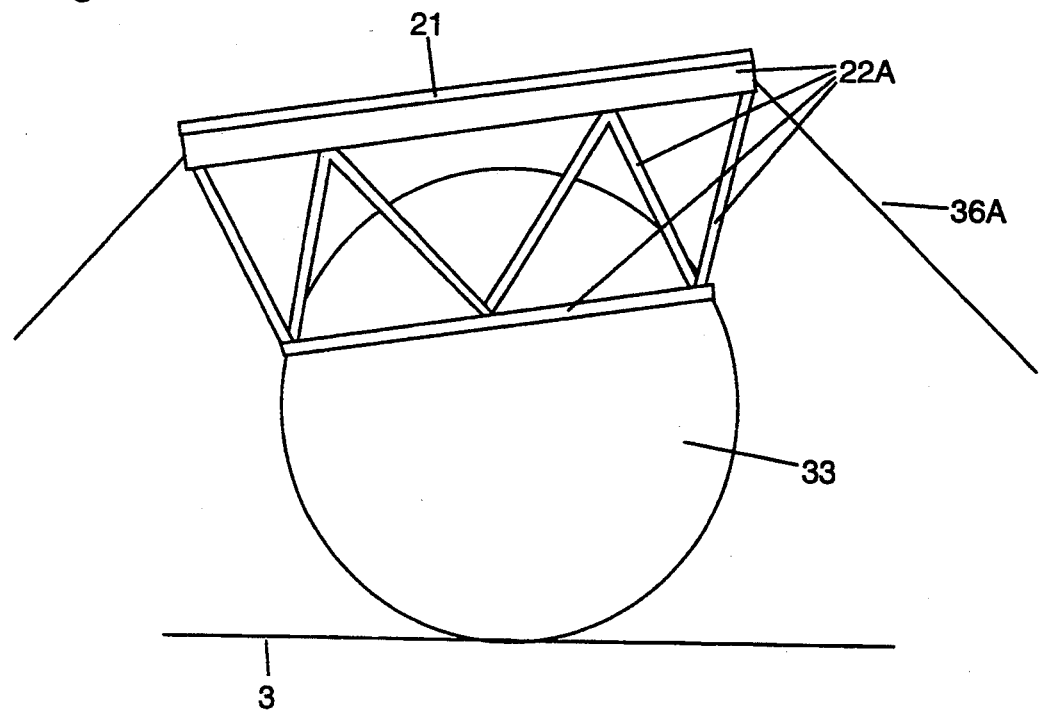

FIG. 27B shows an embodiment similar to that shown in FIG. 27A, with a reflective surface comprising a conventional (e.g., glass) mirror 21 (which may again be an assemblage of multiple mirror segments arranged planarly or concave up) supported above a base balloon 33 by mirror support structure 22A. A stretched reflective membrane on a rigid hoop in circumferential compression could be optionally used in place of the conventional mirror 21. The toroidal balloon is absent in this embodiment. The mirror support structure 22A provides additional support means (over and above the support means furnished by the base balloon 33) for supporting the reflective surface above the base balloon. While a variety of conventional structural concepts could be used for the mirror support structure, this embodiment illustrates use of a truss structure for this purpose. Control tethers/rods 36A for heliostat orientation control preferably attach to the heliostat through attach points on the mirror support structure.

Figure 27C:
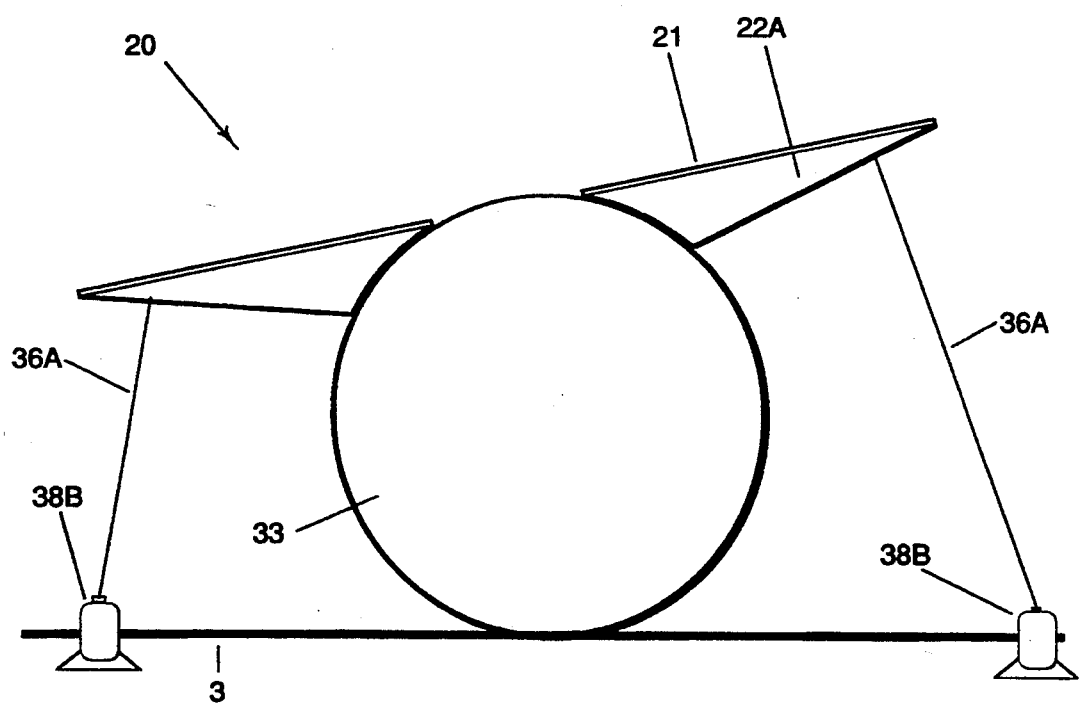

FIG. 27C illustrates a variant embodiment with a base balloon 33 supporting a conventional mirror 21 through mirror support structure 22A. In this case however, the mirror and its support structure have a substantially toroidal topology, and the top central portion of the base balloon will be visible from above the heliostat through the central hole in the toroidal topology mirror and mirror support structure. Control tethers/rods 36A will preferably attach to the mirror support structure, as illustrated. Maintaining tension in the control tethers/rods will keep the mirror and mirror support structure securely seated on top of the base balloon, even while the mirror is being reoriented to track the apparent motions of the Sun through the sky.

Figure 28A:
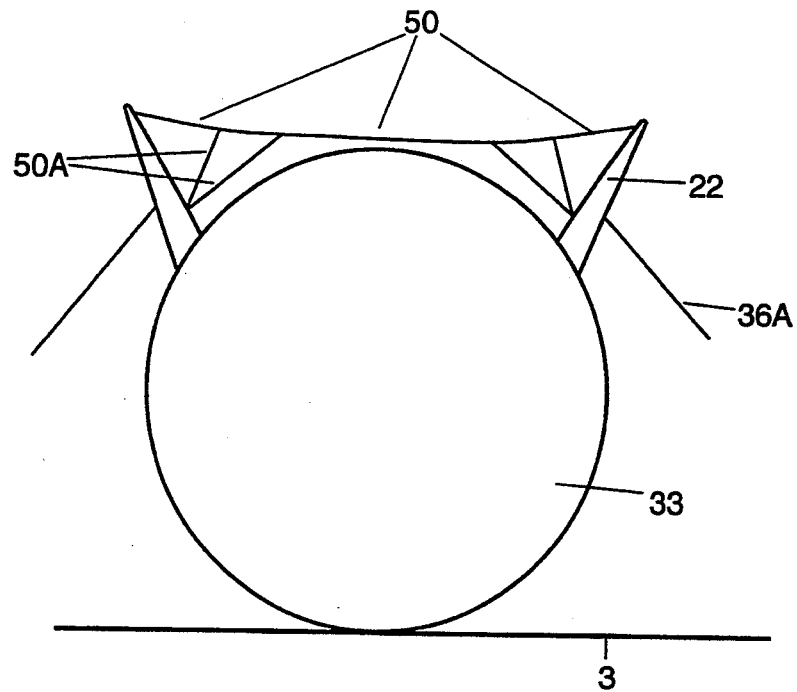

FIG. 28A shows an embodiment of a heliostat wherein the reflective surface is a reflective membrane 50, wherein the reflective surface is maintained in a desired shape configuration which is concave on its sunward side, and wherein means are provided for maintaining the reflective surface in said desired shape configuration which means comprises membrane shaping tether elements. The reflective membrane may be constructed, for example, of a flexible membrane with a reflectorized upper surface. The membrane is reflective on its upper surface, and is maintained in its focusing concave-sunward shape by means of membrane shaping tethers 50A. The membrane shaping tethers may comprise multiple string-like elements or conical continuous or circumferentially-segmented-section sheet(s) in tension. Both the outer periphery of the reflective membrane 50 and the outer ends of the membrane shaping tethers 50A are secured to a substantially circular-symmetric reflective membrane support structure 22 in the illustrated embodiment. The reflective membrane support structure 22 provides additional support means (over and above the support means furnished by the base balloon 33) for supporting the reflective surface above the base balloon. The base balloon 33 is shown supported directly on the ground surface, though optionally a base plate or sheet could be used. Control tethers/rods 36A connect control tether/rod base elements (not shown) with the reflective membrane support structure 22, and provide orientation control for the heliostat through changes in their effective lengths.

Figure 28B:
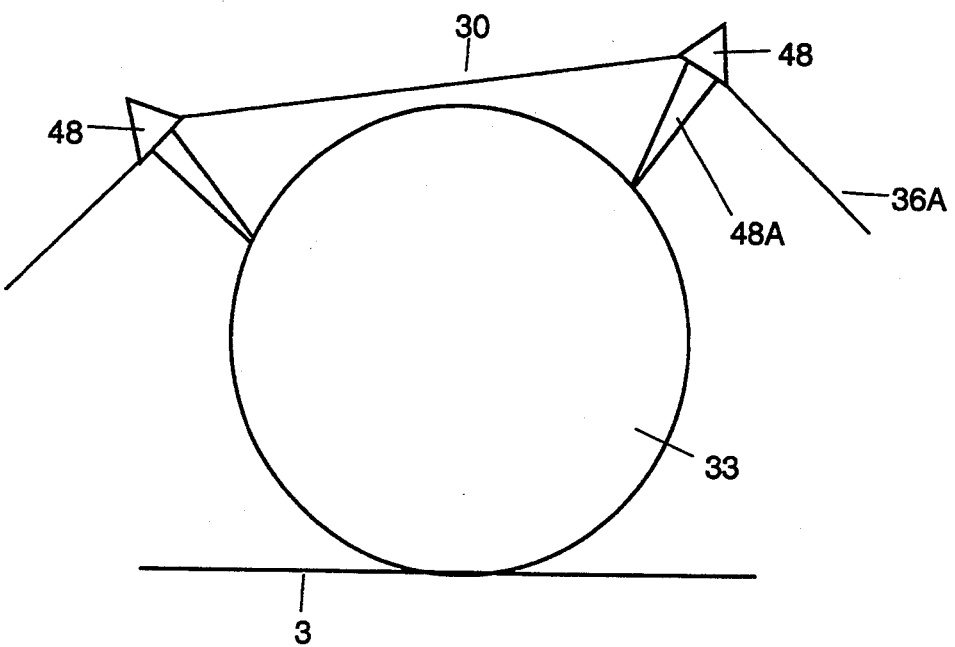

FIG. 28B illustrates an embodiment of a balloon heliostat wherein a reflective surface 30 (which may be a reflective membrane as in FIG. 28A) is supported around its periphery by a toroidal structure 48 (e.g., a substantially rigid torus in circumferential compression). The toroidal structure 48 is a substantially rigid structure of substantially toroidal topology for supporting the reflective surface 30 around its periphery, and is included in additional support means for contributing to the support of the reflective surface 30 above the base balloon 33. The additional support means also includes a support cone 48A for supporting the toroidal structure 48 above the base balloon 33 in the illustrated embodiment. While a substantially triangular cross-section is illustrated for the toroidal structure 48, circular, elliptical, other polygonal or other shape cross-sections may alternatively be used. The space enclosed by the bottom of the reflective surface 30, the top of the base balloon 33, and the toroidal structure 48 and its support cone 48A, can optionally be maintained at a sub-ambient pressure in order to impart a concave-up curvature to the reflective surface 30 and thereby aid focusing of light refelcted by the reflective surface. The toroidal structure support cone 48A may alternatively be cylindrical or of other substantially circular-symmetric form rather than conical, and may also optionally utilize a truss-like structure similar to that shown in FIG. 27B rather than a continuous structure. Control tethers/rods 36A will preferably attach to either the toroidal structure 48 (as illustrated) or to the toroidal structure support cone 48A.

Figure 28C:
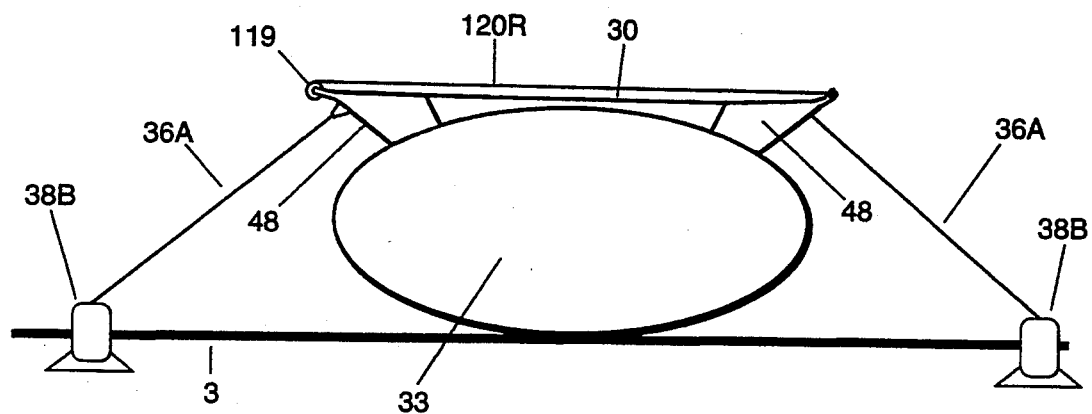
FIGS. 28C and 28D show a heliostat embodiment with a roll-out reflective surface protective cover.
Figure 28D:
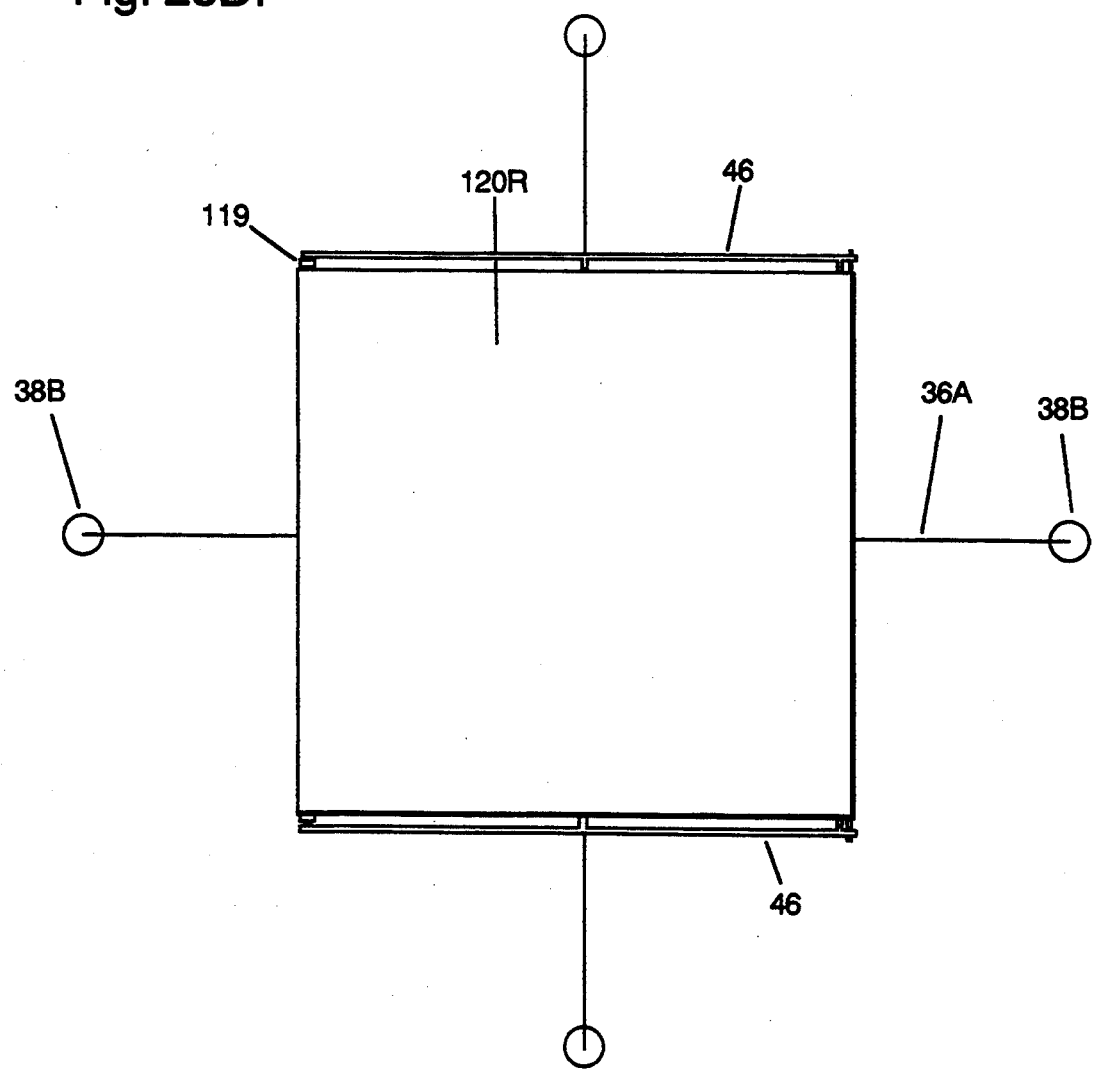

FIGS. 28C and 28D show a side sectional view and a plan view from above, respectively, of a balloon heliostat embodiment with a base balloon 33 supporting a reflective surface 30 (e.g., a reflective membrane) through a toroidal structure 48 resting on top of the base balloon. In this embodiment the upper surface of the toroidal structure may also be reflectorized to serve as a mirror and increase the effective reflective area of the heliostat. The toroidal structure 48 may optionally be pressurized to provide a pressure induced outward reaction force on the reflective surface 30 to supplement the reaction force obtaining from circumferential compression of the toroidal structure 48. FIG. 28C shows how a roll-out reflective-surface-protective-cover 120R can cover and protect the reflective surface 30 (and the optionally reflectorized tops of the toroidal structure 48) in its rolled-out or deployed configuration. The roller on which the reflective-surface-protective-cover 120R can be retracted is designated 119. FIG. 28D shows a plan view from above of the same embodiment, also illustrating a substantially-rectangular-planform (preferably substantially square planform) extension structure 46 connecting to the outside of the toroidal structure 48 and serving as a supporting frame for the roll-out reflective-surface-protective-cover 120R. When the heliostat is in use the cover 120R will preferably be fully retracted and rolled up around the roller 119 for the roll-out reflective-surface-protective-cover 120R. When the heliostat is not in use and when it is desirable to cover the reflective surface 30, the roll-out reflective-surface-protective-cover 120R will preferably be rolled out over the extension structure 46 to substantially cover all the reflective surface area (both on the reflective surface 30 and on the possibly reflectorized upper surface of the toroidal structure 48). For illustrative purposes the roll-out reflective-surface-protective-cover 120R is shown in its rolled-out or deployed configuration in FIG. 28D.

Figure 29A:
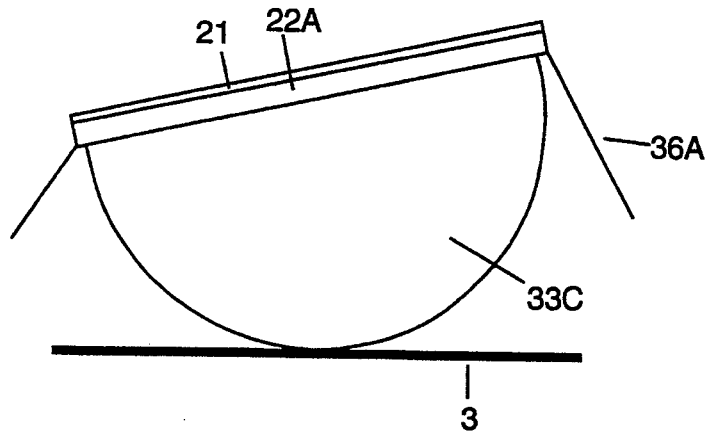
FIGS. 29A, 29B, and 29C show still further embodiments of balloon heliostats with full or partial base balloons.

FIG. 29A shows an embodiment of a balloon heliostat wherein a partial (e.g., substantially semispherical or semiellipsoidal) base balloon 33C is used in place of a full (e.g., substantially spherical or ellipsoidal) base balloon. The partial base balloon 33C supports a conventional (e.g., glass) mirror 21 through mirror support structure 22A. The mirror support structure 22A also provides the closure for the upper end of the partial base balloon, and must be designed to withstand the upward pressure forces and bending moments exerted on it by the pressurized gas (e.g., air) within the partial base balloon 33C. Control tethers/rods 36A are preferably secured to the body of the balloon heliostat through the mirror support structure 22A, as illustrated.

Figure 29B:
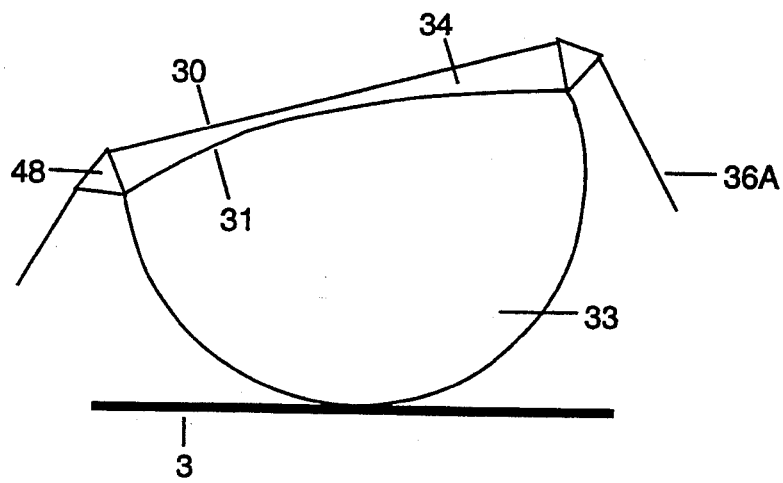

FIG. 29B shows an embodiment wherein a reflective surface 30 (e.g., a reflective membrane) is supported around its periphery by a toroidal structure 48. The toroidal structure 48 will preferably be a substantially rigid torus with circumferential compression loads reacting the radial (inward) tension loads exerted on the toroidal structure by the bottom surface 31 and the reflective surface 30. The toroidal structure 48 may be unpressurized or pressurized. While a particular triangular cross-section is illustrated for the toroidal structure cross-section in this embodiment, triangular cross-sections with alternate orientations or other nontriangular (e.g., circular, elliptical, or polygonal) cross-sections could be utilized within the spirit and scope of this invention. In the illustrated embodiment the toroidal structure 48 also serves as the upper end attachment for a substantially semispherical/semiellipsoidal base balloon 33 and control tethers/rods 36A. Note that the bottom surface 31 below the enclosed volume 34 also serves as the top surface of the base balloon 33 in this embodiment. The pressure in the enclosed volume 34 may be reduced to sub-ambient values to help shape the reflective surface 30 into a concave up, reflected sunlight focusing configuration.

Figure 29C:
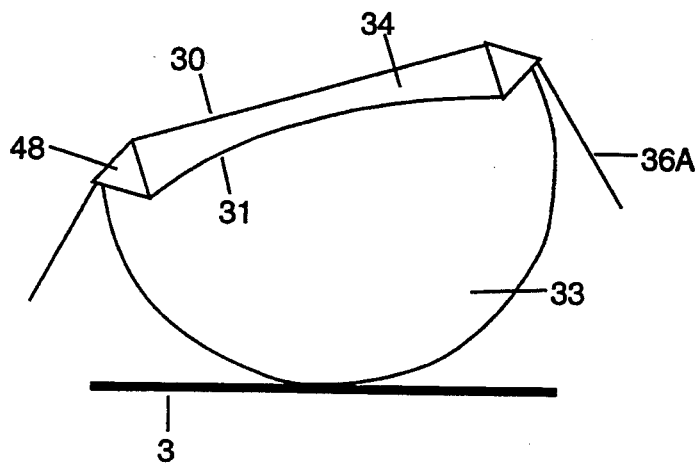

FIG. 29C shows an embodiment very similar to that shown in FIG. 29B, with the upper end of the base balloon now attaching to the outer part of the toroidal structure 48 rather than to the bottom part of said toroidal structure. Also, unlike the case in FIG. 29B, the base balloon surface has no direct contact with the bottom surface 31 in FIG. 29C. Different elements of the reflective surface, toroidal structure, base balloon, and bottom surface (if present) geometry shown in FIGS. 28 and 29 can optionally be combined in different combinations.

Figure 30A:
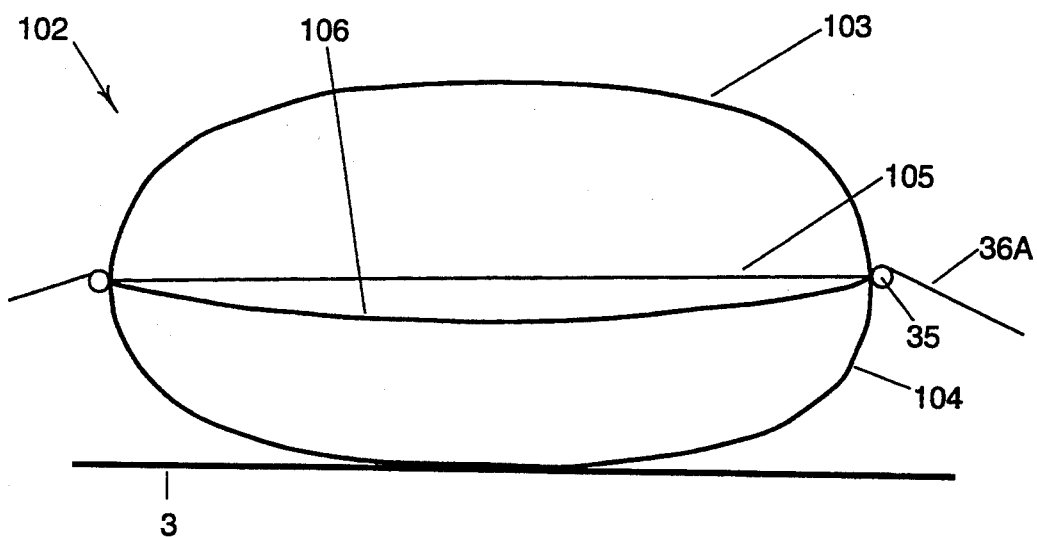
FIGS. 30A and 30B show embodiments of transparent Sun-side surface balloons with internal reflective surfaces.

FIG. 30A illustrates a transparent upper surface balloon heliostat 102. This balloon heliostat features a transparent upper surface 103 and a lower surface 104 which are connected together by a seam 105. A middle surface 106 with its sunward (upper) side reflectorized is provided within the balloon heliostat, supported on its periphery by said seam 105. Control tethers/rods 36A attach to the balloon heliostat through an optional control ring 35 and have their base elements (not shown) anchored in the ground surface 3. Some differential pressure may be maintained between the upper and lower comapartments (enclosed volumes) of the balloon heliostat to help impart a concave-upwards shape to the reflective surface 106 and to thereby provide reflected sunlight focusing along with controllable focal length.

The embodiment illustrated in FIG. 30A therefore provides a heliostat wherein the reflective surface is (preferably) a reflective membrane, wherein the desired shape configuration of the reflective surface is concave on its sunward side, and wherein means are provided for maintaining the reflective surface in this desired shape configuration which means comprises means for providing differential pressure across the reflective surface, with pressure acting on the reflective surface nonsunward (lower) side being lower than pressure acting on the reflective surface sunward (upper) side.

Figure 30B:
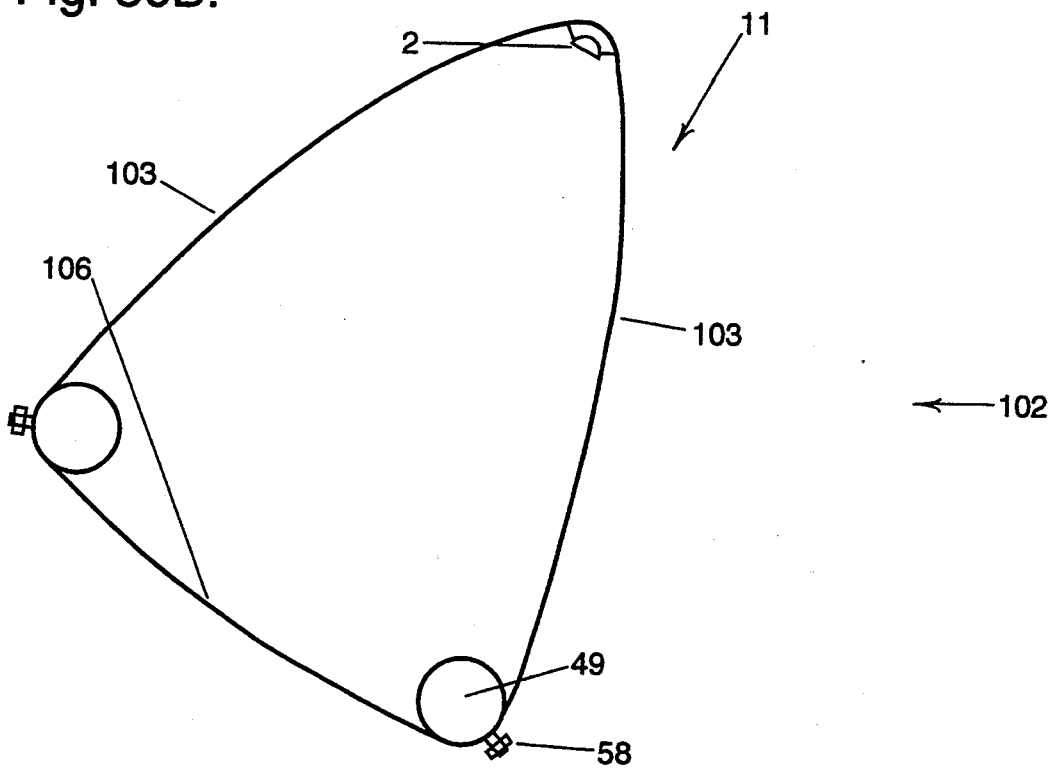

FIG. 30B illustrates another embodiment of a transparent upper surface balloon heliostat 102 which can be used for either terrestrial or space applications. A surface 106 which is reflective/reflectorized on its sunward side (i.e., the side facing the incident sunlight from the Sun 11) is attached around its periphery to a toroidal member 49 which may be a toroidal balloon or a toridal rigid structure (e.g., hoop structure). The continuation of the surface 106 around the outside of the toroidal member 49 becomes a transparent upper surface 103 (where "upper" refers to "sunward side" in space), as illustrated. The surface 106 and the transparent upper surface 103 together enclose an enclosed volume, which will preferably be pressurized to above-ambient pressure so as to impart a sunward-concave, focusing shape to the surface 106 reflectorized on its sunward side. Internal tethers/sheets may optionally also be used to contribute to desired shaping of the reflective surface on the upper side of surface 106. The focal point/focal area of the surface 106 will preferably fall on a solar receiver 2 mounted to the transparent surface 103 near the point of greatest distance away from the surface 106. Thus, unlike the case of FIG. 30A, the transparent upper surface balloon heliostat 102 here reflects sunlight to a heliostat mounted or "internal" focus point receiver rather than to a tower mounted or "external" focus point receiver. A heat to electricity thermodynamic conversion powerplant (not shown) may optionally be provided near the receiver 2, or at some distance from receiver 2 and connected to it by relatively hot and relatively cold fluid transfer piping.

The embodiment illustrated in FIG. 30B thus provides a heliostat, comprising a reflective surface (106), support means comprising an inflated balloon (102) for supporting said reflective surface, and control means (58, which will be discussed in the following paragraph) for orienting said reflective surface so as to reflect incident light from the Sun to a target region. In this heliostat, the reflective surface is maintained in a concave sunward configuration so as to reflect incident sunlight from the Sun to a target region, wherein the area of the target region is substantially smaller than the reflective area of the reflective surface, and wherein a solar receiver is located substantially at this target region and is attached to the heliostat.

When used for space/orbital applications, this type of heliostat can be implemented with very low internal pressure levels, which are still substantially higher than the vacuum of space. The surfaces 106 and 103 may need to be strengthened or self-sealing to protect against penetration by micrometeorites or space particles. For space application, heliostat orientation and position control means 58 (e.g., the optional control thrusters illustrated) may be provided to point the heliostat towards the Sun. These heliostat orientation and position control means 58 therefore provide control means for orienting the reflective surface (on the sunward side of surface 106) in two degrees of freedom.

Alternatively, pointing control motors may be used to orient the heliostat relative to a pedastal base (for terrestrial application) or a mother spacecraft (for space application) if the heliostat is mounted on a pedestal base or a mother spacecraft.

The following paragraphs will discuss some embodiments of balloon heliostats which have no base balloon but do have a toroidal balloon. Note that an example of a base balloonless balloon heliostat has already been presented in FIG. 24G.

Figure 31A:
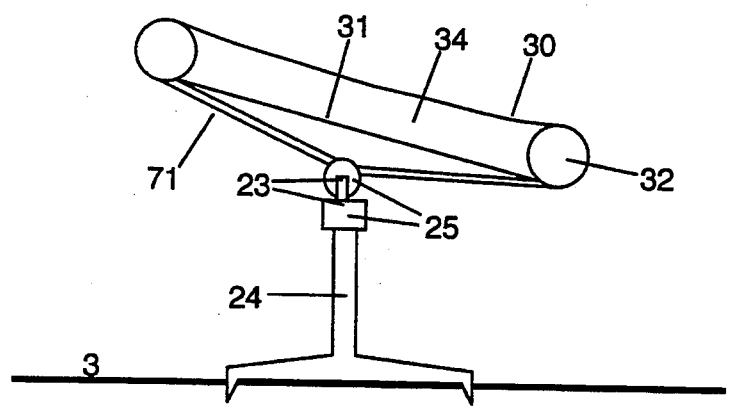
FIGS. 31A through 31E and 31G show balloon heliostat embodiments with a toroidal balloon but no base balloon.

FIG. 31A illustrates an embodiment of a heliostat wherein a reflective surface 30 and an optional bottom surface 31 are supported around their periphery by a toroidal balloon 32. The toroidal balloon is inflated and may be of nonrigid, semirigid, or rigid construction (as known in the prior art in aerostat construction). The enclosed volume 34 enclosed by the surfaces 30 and 31 and the toroidal balloon 32 may be maintained at sub-ambient pressure to impart an upward (sunward) concave, focusing shape to the reflective surface 30. This may be used to advantage to focus the Sun's rays, and thus enable a larger heliostat to be used for a given size solar receiver. No base balloon is used in this embodiment. The toroidal balloon 32 is supported by toroidal balloon support structure 71, which in turn is mounted on a pedestal 24 using hinged attachment means 23. Pointing control motor(s) 25 orient the toroidal balloon assembly in two degrees of freedom relative to the pedestal (i.e., azimuth and elevation).

To summarize, the embodiment illustrated in FIG. 31A provides a heliostat, comprising a reflective surface 30, support means comprising an inflated (toroidal) balloon for supporting said reflective surface, and control means for orienting said reflective surface so as to reflect incident light from the Sun to a target region (target region not shown). The support means comprises not only the toroidal balloon 32 but further comprises the toroidal balloon support structure 71, hinged attachment means 23 and the pedestal 24 (which pedestal 24 comprises support structure anchored in the ground surface 3) in this embodiment. The control means for orienting the reflective surface comprises the hinged attachment means 23 and the pointing control motors 25, and provides means for orienting the reflective surface 30 in two degrees of freedom.

Figure 31B:
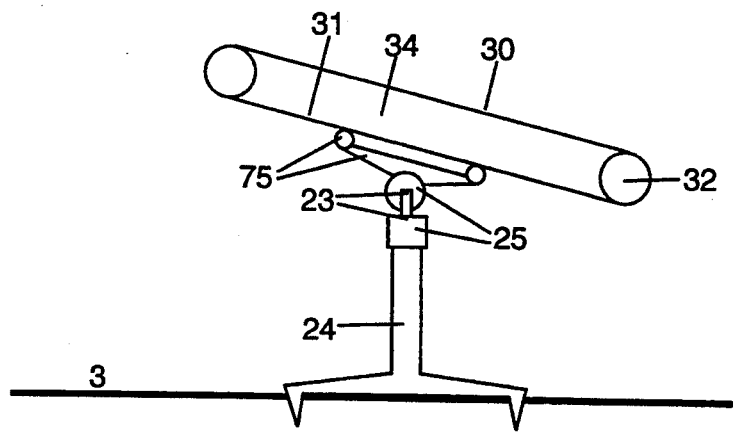

FIG. 31B shows an embodiment similar to FIG. 31A, wherein a bottom surface support structure 75 is used in lieu of the toroidal balloon support structure 71 as (contributory) support means for supporting (the toroidal balloon and) the reflective surface. The illustrated bottom surface support structure 75 features a ring shaped structure attached to the bottom of the bottom surface 31, which ring shaped structure is supported by a frame structure above the hinged attachment means 23 and pedestal 24.

Figure 31C:
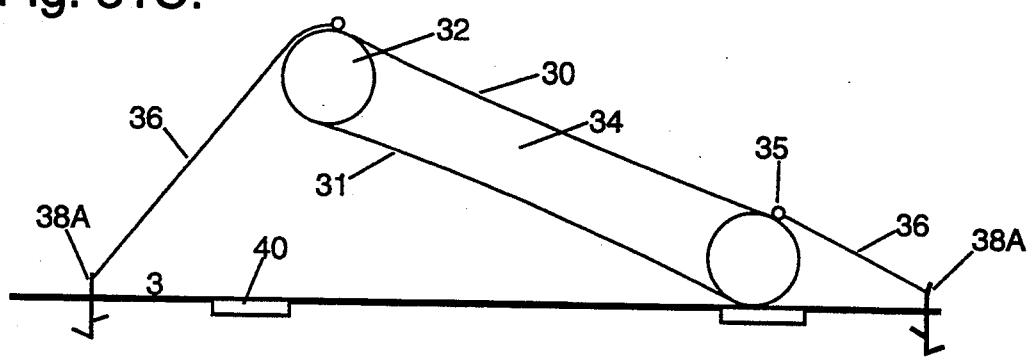

FIG. 31C shows an embodiment of a heliostat wherein a reflective surface 30 and an optional bottom surface 31 are supported around their periphery by a toroidal balloon 32. The toroidal balloon is inflated and may be of nonrigid, semirigid, or rigid construction (as known in the prior art in aerostat construction). The enclosed volume 34 enclosed by the surfaces 30 and 31 and the toroidal balloon 32 may be maintained at sub-ambient pressure to impart an upward concave, focusing shape to the reflective surface 30. No base balloon is used in this embodiment. The bottom part of the toroidal balloon 32 is supported by the ground surface 3, preferably on a ground surface mounted base plate 40 (which will preferably be of annular configuration, as illustrated). A control ring is mounted on the toroidal balloon, at a location towards the top of the toroidal balloon in the illustrated embodiment (other locations may be used in alternate embodiments). Control tethers 36 connect the control ring to control tether base elements 38A secured in the ground surface 3. Note that control tether base elements of various materials (e.g., metal, plastic, composite, concrete, etc.), various shapes, various sizes, various configurations, and various installation orientations can be used within the spirit and scope of the present invention.

Note that means to control the effective length of the control tethers (e.g., control tether positioning motorized reels) are provided but not shown for simplicity. The balloon heliostat can be pointed in two degrees of freedom (elevation and azimuth) by differentially controlling the effective lengths of the different control tethers located at multiple azimuthal locations around the periphery of the balloon heliostat. The control ring 35 may also serve as the outer edge terminator for the reflective surface 30 in the embodiment shown.

Thus the embodiment illustrated in FIG. 31C provides a heliostat, comprising a reflective surface, support means comprising an inflated toroidal balloon for supporting said reflective surface, and control means for orienting said reflective surface so as to reflect incident light from the Sun to a target region (not shown). The support means further comprises means for securing said reflective surface around its periphery to said toroidal balloon, and still further comprises the base plate 40 in the illustrated embodiment. The inflated toroidal balloon exerts outward inflation-induced forces tending to maintain said reflective surface in tension. Preferably the reflective surface 30 is a reflective membrane, the bottom surface 31 serves as a second membrane in tension also secured around its periphery to said toroidal balloon 32, and means (comprising the ability to maintain a sub-ambient pressure in the enclosed volume 34) are provided between said reflective membrane and said second membrane for causing said reflective membrane to deflect to a shape which is concave on the reflective side of said reflective membrane.

Figure 31D:
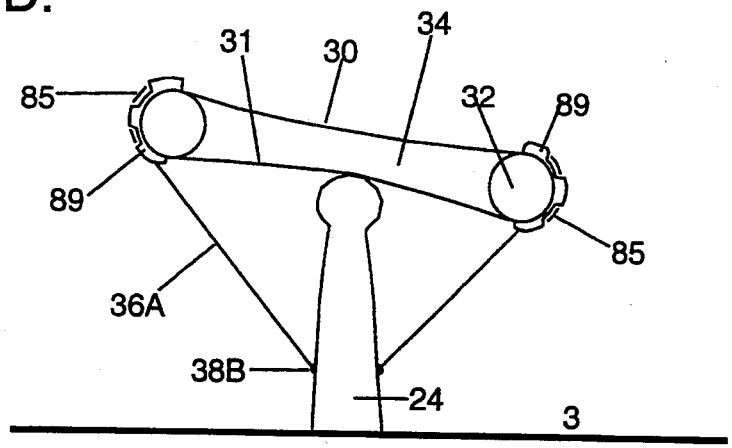

FIG. 31D shows an embodiment of a balloon heliostat with a reflective surface 30 and a bottom surface 31 supported on their outer perimeters by a toroidal balloon 32. As shown in previous embodiments, the enclosed volume 34 can be maintained at sub-ambient pressure to impart a concave-up, focusing shape to the reflective surface 30. In this embodiment the bottom surface 31 is directly supported by the rounded top of a pedestal 24, and the bottom surface 31 in turn supports the toroidal balloon 32 and through the toroidal balloon it supports the reflective surface 30. Variant embodiments could use elements of the illustrated configuration in FIG. 31D combined with the use of toroidal balloon support structure 71 and hinged attachment means 23 in a manner similar to that shown in FIG. 31A.

The embodiment shown in FIG. 31D also features balloon holding frames 89 around the outer periphery of the toroidal balloon 32, held in place by circumferential tension bands 85 as in the case of the embodiment of FIG. 21. Control tethers/rods 36A connect the balloon holding frames 89 with control tether/rod base elements (attach points) 38B on the pedestal 24 (or alternatively could attach to control tether/rod base elements secured in the ground surface 3). By differentially varying the effective lengths of the control tethers/rods at different azimuthal locations around the pedestal, balloon heliostat orientation control in two degrees of freedom can be achieved.

Thus the embodiment illustrated in FIG. 31D uses elongated control elements (control tethers/rods 36A) which provide tension links between substantially rigid structure to which reflective surface 30 is connected, on the one hand, and base elements 38B, on the other hand. The substantially rigid structure comprises inflated toroidal balloon 32 in combination with a plurality of balloon holding frames 89 distributed around the outer periphery of the inflated toroidal balloon and pressed against said inflated toroidal balloon by means of circumferential tension bands 85.

Figure 31E:
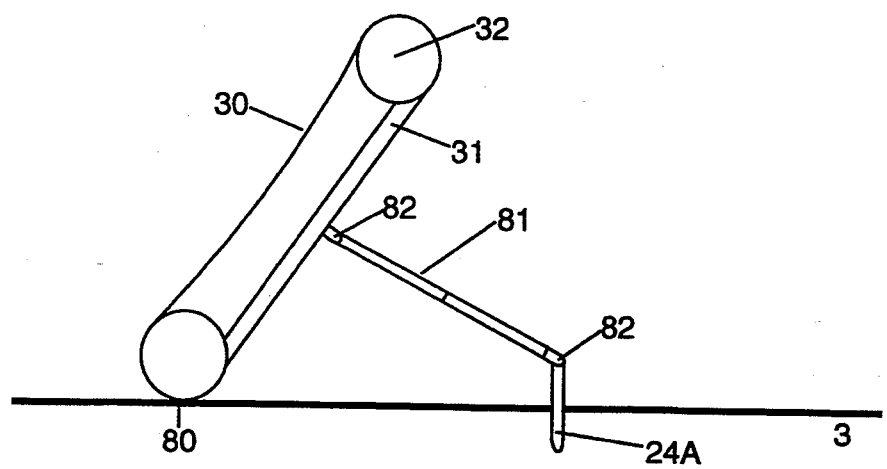

FIG. 31E shows a balloon heliostat embodiment with a toroidal balloon 32 supporting a reflective surface 30. The toroidal balloon is supported both by the ground surface 3 through a toroidal balloon rolling contact point 80 and by a substantially rigid bottom surface 31. A base rod 81 connects at its top end to the bottom center of the bottom surface 31 at a base rod pivottable attachment point 82. The base rod 81 connects at its bottom end to ground anchoring means 24A though another base rod pivottable attachment point 82. The two pivottable attachment points may use a variety of conventional joint components and mechanisms within the scope of the present invention. Control means (not shown) preferably using a motor are provided for extension/contraction of the base rod 81 (e.g., through telescoping or screwing action) to enable achievement of elevation control of the balloon heliostat's reflective surface 30. Second control means (not shown) also preferably using a motor will preferably be provided for driving the combination of the base rod 81 and the toroidal balloon 32 azimuthally around a substantially vertical rotation axis running through the ground anchoring means 24A. This results in the toroidal balloon rolling around the ground anchor point so as to provide azimuthal orientation control for the balloon heliostat's reflective surface 30. The control means and second control means could use a variety of conventional control and drive components within the scope of the present invention.

Base plates/pavement may optionally be provided under the possible ground contact areas over which the toroidal balloon may roll. The outer skin of the toroidal balloon 32 may also be reinforced with additional skin thickness, additional skin layers, and/or strengthened material(s) in the potential ground contact zones.

Figure 31F:
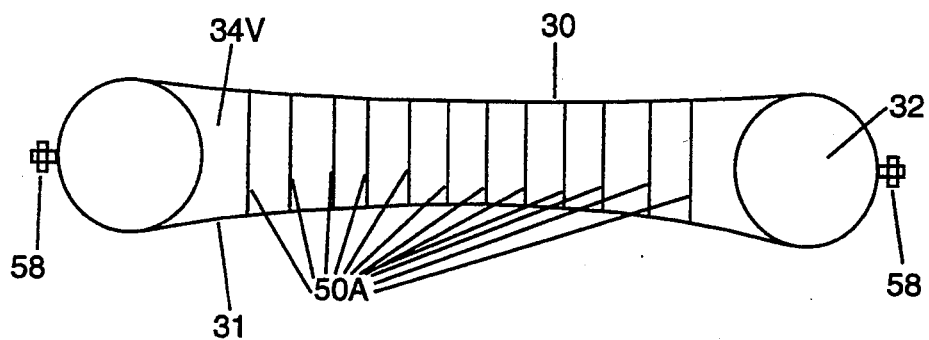
FIG. 31F shows an embodiment of a solar reflector using a toroidal balloon, which can be used for space applications.

FIG. 31F shows an embodiment of a balloon heliostat suitable for space applications. This comprises a reflective surface 30 and a bottom surface 31, both being membranous in structure and both being supported around their perimeter by a toroidal balloon 32. No base balloon is needed or provided. Gas pressure in the toroidal balloon can be quite low in absolute terms and still be high relative to the "vacuum" of space. Reflective membrane shaping tethers 50A may optionally be used to provide a sunward concave, focusing shape to the reflective surface 30. Thus means comprising membrane shaping tether elements can be provided for maintaining the reflective surface in a desired shape configuration which is concave on its sunward side.

The embodiment illustrated in FIG. 31F provides a heliostat, comprising a reflective surface, support means comprising an inflated toroidal balloon for supporting said reflective surface, and control means (to be described subsequently) for orienting said reflective surface so as to reflect incident light from the Sun to a target region (not shown). The support means further comprises means for securing said reflective surface around its periphery to said toroidal balloon. The inflated toroidal balloon exerts outward inflation-induced forces tending to maintain said reflective surface in tension. Preferably the reflective surface 30 is a reflective membrane, the bottom surface 31 serves as a second membrane in tension also secured around its periphery to said toroidal balloon 32, and means (comprising the use of reflective membrane shaping tethers 50A) are provided between said reflective membrane and said second membrane for causing said reflective membrane to deflect to a shape which is concave on the reflective side of said reflective membrane. The membrane shaping tether elements therefore serve as means for maintaining the reflective surface in a desired shape configuration which is concave on its sunward side.

An optional solar receiver (not shown) will preferably be located at the focal point or approximate focal point of the reflective surface. The solar receiver may either be dedicated to the single illustrated focusing heliostat or may be central to plural focusing or non-focusing (e.g., planar reflective surface) heliostats. The tethers 50A may incorporate damping to damp out any vibrations/oscillations of the reflective surface. The toroidal balloon 32 may need to be strengthened or self-sealing to protect against penetration by micrometeorites or space particles. The reflective surface 30 and bottom surface 31 (which may also optionally be reflective) may also be likewise strengthened or self-sealing. For space application, heliostat orientation and position control means 58 (e.g., control thrusters using rockets or other gas or particle discharge principles) may provide means for orienting the reflective surface in two degrees of freedom (i.e., for orienting the heliostat properly relative to the Sun and a solar receiver). Control thrusters may also be used for propulsion and/or stabilization (e.g., spin stabilization) purposes.

Alternatively to the use of control thrusters, pointing control motors may be used to orient the heliostat relative to a pedastal base (for terrestrial application) or a mother spacecraft (for space application) if the heliostat is mounted on a pedestal base or a mother spacecraft.

The type of heliostat illustrated in FIG. 31F can optionally be used orbitally with a solar receiver/target on the Earth's surface—i.e. a "soletta" type application for night or auxiliary day lighting or power generation. It could also be used in conjunction with with a solar receiver mounted on a spacecraft or on the surface of the Moon or a planet.

Figure 31G:
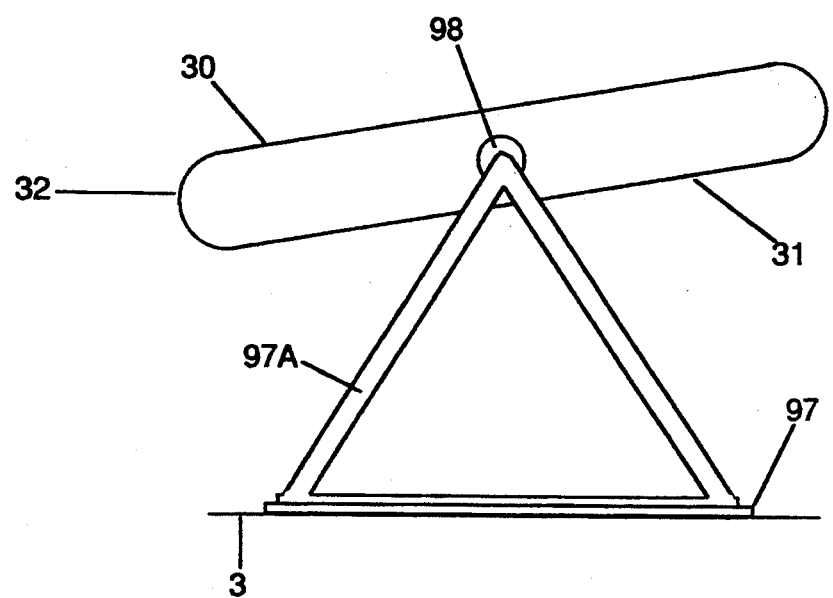

FIG. 31G illustrates an additional heliostat embodiment supported by a ground surface 3. A turntable 97 supported on the ground surface enables azimuthal rotation of the support structure 97A and the heliostat supported by this support structure 97A. The heliostat comprises a toroidal balloon 32, a reflective surface 30, and an optional bottom surface 31. The heliostat is attached to and supported by the support structure 97A through pivottable attachment means 98. A variety of conventional motor control means may be used for providing azimuth pointing control of the heliostat through rotation of the turntable and for providing elevation pointing control of the heliostat through elevational rotation of the heliostat relative to the support structure 97A at the pivottable attachment means 98.

FIGS. 32A, 32B, 32C, and 32D illustrate exemplary embodiments of linear heliostats for use with a linear focus, linear receiver solar thermal powerplant.

Figure 32A:
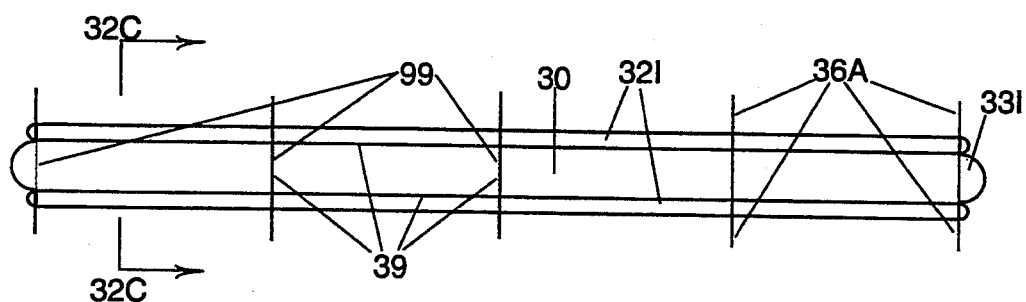
FIGS. 32A through 32D show linear reflector configuration embodiments of balloon heliostats.
Figure 32B:
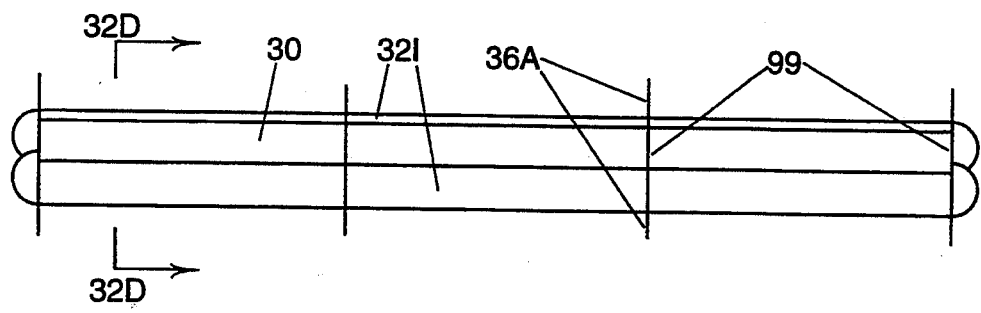
Figure 32C:
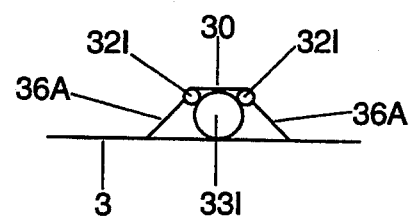
Figure 32D:
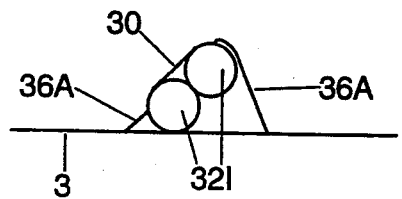

FIGS. 32A and 32C show top and cross-sectional views of one embodiment of a linear heliostat. FIGS. 32B and 32D show top and cross-sectional views of another embodiment of a linear heliostat. As known in the prior art, linear heliostats can be used in conjunction with linear elongated solar receivers to function as the concentration subsystem of a solar thermal powerplant. A primary advantage of linear focusing is that heliostats only need to be controlled (i.e., pointed) in one degree of freedom, vs. two degrees of freedom for more conventional heliostats used in conjunction with more conventional point focus solar thermal powerplants. A primary disadvantage of linear focusing vs. point focusing is the typically reduced solar concentration ratio it yields.

The embodiment of FIGS. 32A and 32C is to some extent like a linear version of the embodiment of FIG. 7B. The heliostat now comprises a reflective surface 30 supported by reflective surface support balloons 32I, which in turn are supported by a linear base balloon 33I. Control tethers/rods 36A control the elevation the reflective surface is pointed at, and also help maintain the reflective surface in tension. A low pressure region may optionally be provided in the enclosed volume under the reflective surface, to produce an upward concavity to the reflective surface and thereby provide a (sunward side) focusing effect. Control tether/rod base elements (not shown) are secured to the ground surface 3 at the base of each tether/rod. The balloons in the heliostat may optionally be segmented. Optional segmentation is designated 99 in this Figure. The reflective surface 30 may also be segmented at the segmentation breaks 99. Preferably frame members 39 will be provided around each reflective surface segment to enhance reflective surface peripheral planarity (not taking into account any intentional nonplanarity such as curving the reflective surface concave up for focusing). If the reflective surface is not segmented, frame members may be provided around the periphery of the entire reflective surface, again to improve planarity of the periphery of the reflective surface.

FIGS. 32B and 32D show an alternate embodiment of a linear focus balloon heliostat, which is similar to the embodiment of FIGS. 32A and 32D, except that it uses larger diameter linear reflective surface support balloons 32I and does not use any linear base balloon 33I. Also, this embodiment is shown in an inclined rather than a vertical elevation angle configuration.

In summary, the embodiment shown in FIGS. 32A and 32C (and also the embodiment shown in FIGS. 32B and 32D) illustrates a heliostat comprising a reflective surface, support means comprising an elongated, approximately linear (inflated) balloon for supporting said reflective surface, and control means for orienting said reflective surface so as to reflect solar radiation to a target region (e.g., an approximately linear region in which an approximately linear solar thermal receiver is located), which control means provides means for orienting said reflective surface in a single degree of freedom.

In addition to the above described linear focus embodiments, substantially linear focus versions of various other substantially point focus heliostat embodiments are also possible within the spirit and scope of the invention. Various features of substantially point focus heliostats can also be applied to linear focus embodiments within the spirit and scope of the invention. FOr example, control rings could be replaced by control bars, various cross section base balloons and toroidal balloons could be applied to linear base balloons and linear reflective surface support balloons, and water and air supported embodiments could be made in addition to land supported embodiments.

FIG. 33 presents sectional views of some embodiments of water/fluid supported balloon heliostats, which are of the two degree of freedom orientable type. FIG. 33A shows an embodiment of a water/fluid supported balloon heliostat with a reflective surface 30 supported around its periphery by a toroidal balloon 32, which in turn is supported by a base balloon 33 and controlled in azimuthal and elevational orientation by means of control tethers/rods 36A. The control tethers/rods 36A attach at their upper ends to a control ring 35 and at their lower ends to control tether/rod base elements 38B which in turn are secured in the ground surface 3. As in the case of previously described embodiments, the enclosed volume 34 below the reflective surface 30 may optionally be maintained at subambient pressure. A liquid layer 110 (e.g., layer of water or other liquid) is used to support the base balloon 33 above the ground surface 3. The base balloon floats on the water or other fluid—i.e. it is supported by the force of buouyancy. The water or other liquid layer 110 is kept contained in the region surrounding the base of the base balloon by means of liquid tray/pool walls 111, as illustrated. Note that the floating balloon heliostat will not translate laterally when it is rotated in elevation and azimuth to track the Sun. This is because the hydrostatic support will not provide any lateral resistance force on the floating base balloon. By contrast, a land mounted balloon heliostat will "roll" over the ground surface and translate when it is rotated in orientation by differential lengthening/shortening of control tethers/rods.

Figure 33A:
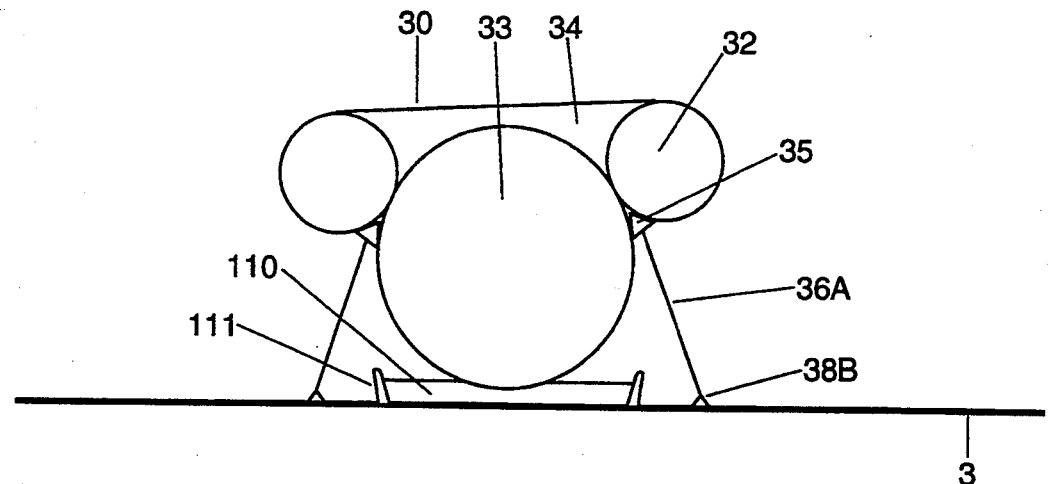
FIGS. 33A through 33F show embodiments of liquid surface (e.g., water) supported balloon heliostats.

Thus the embodiment illustrated in FIG. 33A provides a heliostat, support means comprising an inflated balloon for supporting said reflective surface, and control means for orienting said reflective surface so as to reflect incident light from the Sun to a target region, wherein said support means provides means for supporting said reflective surface above a ground surface (e.g., an underliquid ground surface), and further comprising hydrostatic support means for contributing to the support of said reflective surface above said ground surface.

Figure 33B:
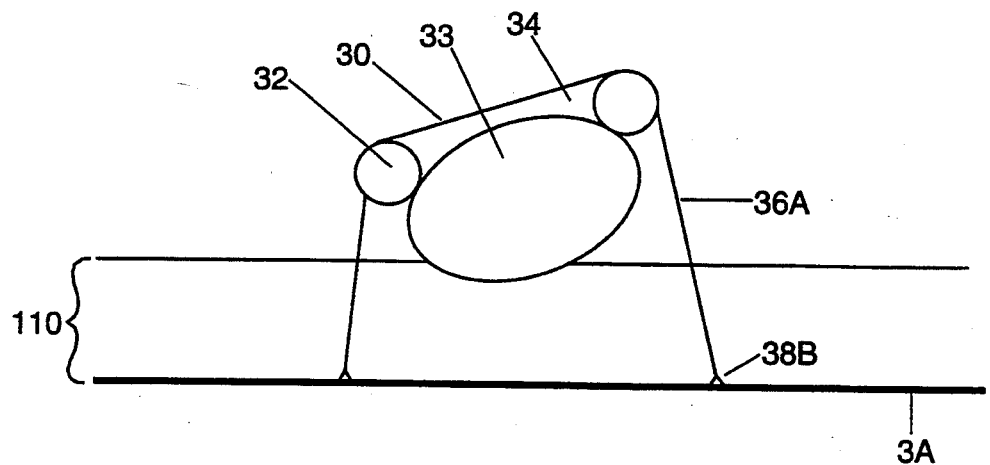

FIG. 33B shows a similar embodiment, which differs from the embodiment of FIG. 33A in that the liquid (e.g., water) layer 110 is not constrained laterally around the immediate vicinity of the base balloon. The control tether/rod base elements 38B are shown on the under-liquid ground surface 3A. However, in alternate embodiments the base elements may also be supported by other floating structure. While the balloon heliostat embodiment of FIG. 33B has a somewhat different geometric configuration than the embodiment of FIG. 33A (e.g., it uses a nonspherical base balloon 33), it should be understood that a variety of balloon heliostat configurations as described for land/ground supported balloon heliostats could also be applied to water/liquid supported balloon heliostats within the spirit and scope of the invention.

Figure 33C:
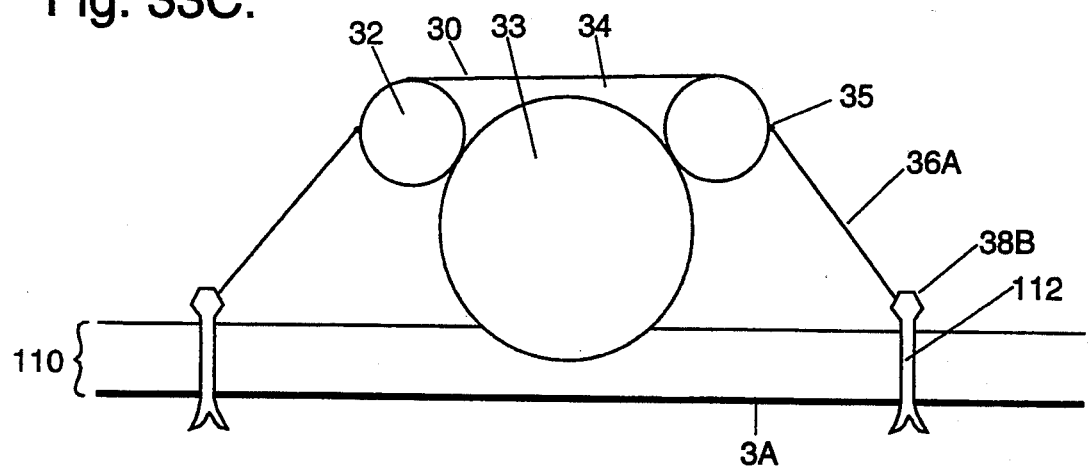

FIG. 33C shows a variant embodiment of a water/liquid supported balloon heliostat, with the control tether/rod base elements 38B mounted atop posts 112 which preferably penetrate up through the top of the liquid layer 110. The posts 112 are prefereably secured in the under-liquid ground surface 3A, and may optionally be restrained laterally with additional "guy wires" (not shown) to the under-liquid surface 3A.

Figure 33D:
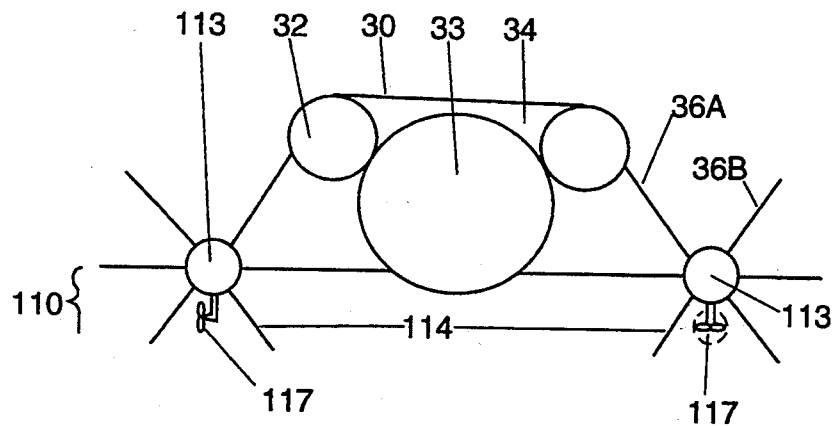

FIG. 33D shows a sectional view of an example of a water/liquid supported balloon heliostat wherein a floating support structure 113 (e.g., a lattice arrangement of floating structural members) serves as the lower end terminus for the control tethers/rods in place of the control tether/rod base elements. The floating support structure 113 may be secured to the under-liquid ground surface using optional tethers 114, or it may remain unsecured to the underliquid ground surface and use optional propulsive means 117 for liquid media (e.g., propellers/waterjets/other) to aid in stationkeeping (e.g., free floating embodiments for use in relatively deep water sites).

In FIG. 33D, the illustrated control tether 36A connects to the shown balloon heliostat while control tether 36B connects to an adjacent balloon heliostat (not shown).

Figure 33E:
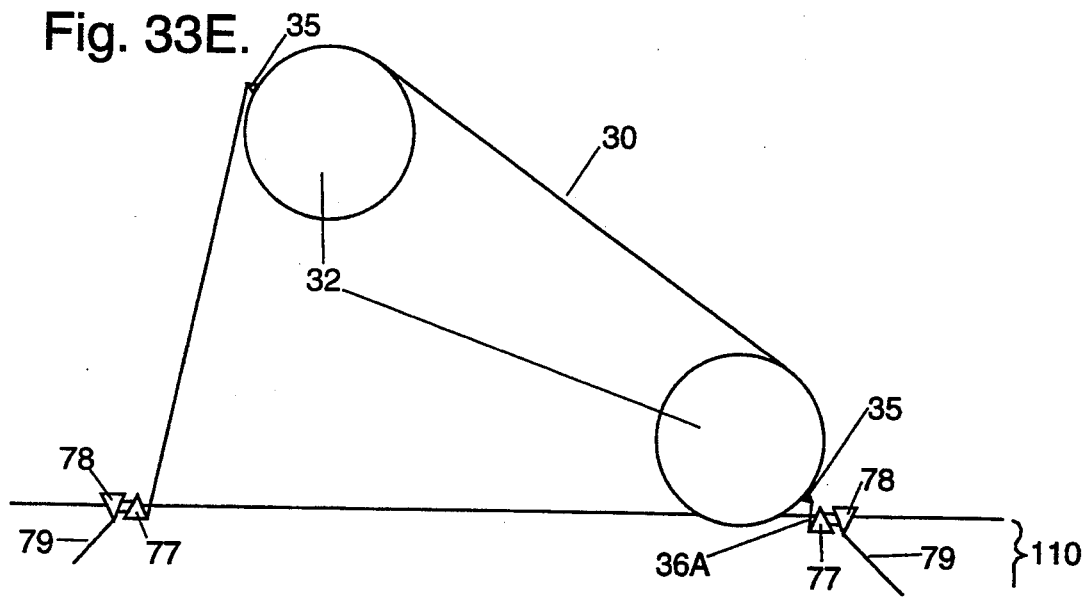

FIG. 33E illustrates an embodiment of a water/liquid-supported balloon heliostat with a toroidal balloon 32 but no base balloon 33, in a manner analogous to some extent to the ground surface supported embodiment shown in FIG. 31C. The toroidal balloon 32 floats directly on the liquid layer 110, and supports the reflective surface 30. The embodiment shown does not have a bottom surface or an enclosed volume under the reflective surface, but alternate embodiments could include these (in a manner similar to FIG. 31C). A control ring 35 around the toroidal balloon 32 serves as the upper end of a plurality of control tethers/rods 36A distributed around the periphery of the balloon heliostat. Optionally the control tethers/rods will be more closely spaced together azimuthally on that side of the toroidal balloon which is contacting the water/liquid (right hand side of the illustrated Figure). The bottom ends of the control tethers/rods are connected to a control tether/rod base ring 77, which in turn is optionally rotatable azimuthally (e.g., on bearings) relative to an azimuthally fixed base ring 78. The fixed base ring 78 is preferably connected and secured relative to underwater/underliquid ground surface anchor points via tethers 79. Note that in the illustrated embodiment elevation control of the balloon heliostat is accomplished using the control tethers/rods, while azimuthal control is accomplished by rotating base ring 77 relative to base ring 78. In an alternate embodiment the control tether/rod base ring may be azimuthally fixed, the base ring 78 may be incorporated into the base ring 77, and both elevation and azimuth control may be accomplished using differential lengthening/shortening of control tethers/rods 36A around the periphery of the balloon heliostat. Note that control tether positioning reels, control rod telescoping rods, or other control tether/rod length control means could be used.

Figure 33F:
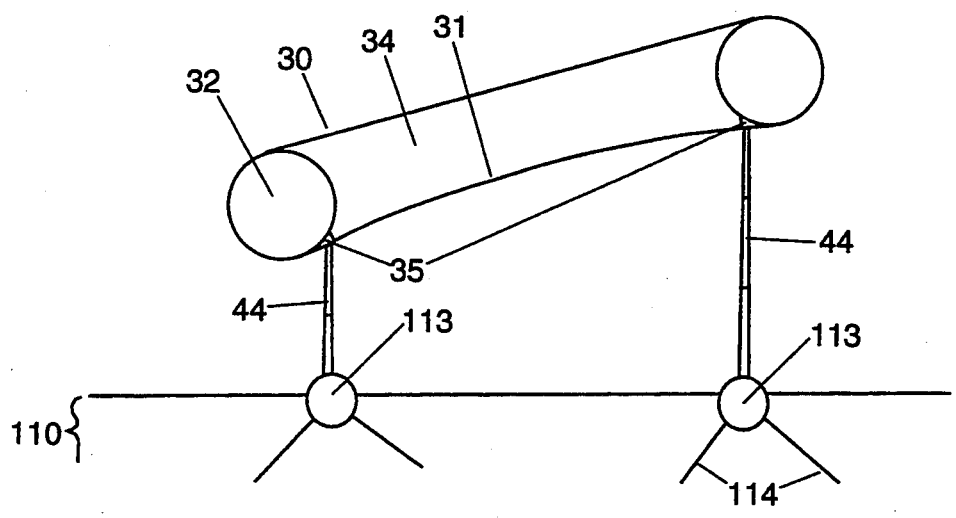

FIG. 33F illustrates an embodiment of a water/liquid-supported balloon heliostat combining some elements from the FIG. 33D and FIG. 33E embodiments as well as additional features. In this embodiment a reflective surface 30 and an optional bottom surface 31 are both supported around their periphery by a toroidal balloon 32. The enclosed volume 34 may optionally be maintained at sub-ambient pressure, as described for previous illustrated embodiments. A control ring 35 is installed at the bottom of the toroidal balloon 32 and serves as its interface both with the lower surface 31 and with a plurality of control rods 44. The control rods are variable in length, and have their bases secured to a floating support structure 113 floating in a liquid layer 110. Optional tethers 114 secure the floating support structure 113 in place relative to the underliquid ground surface in which the base elements to these tethers 114 are secured. The control rods may sustain compressive loads if they carry the weight of the toroidal balloon 32, the surfaces it supports, and the control ring. Alternatively, the toroidal balloon and optionally the enclosed volume could be filled with an aerostatically lifting gas (e.g., helium or hydrogen) to reduce or eliminate compressive loads on the control rods 44. A floating base balloon (not shown) may optionally be provided, with the top of this floating base balloon contacting the underside of the bottom surface 31 of the embodiment of FIG. 33E Clearly a variety of embodiments of balloon heliostats are possible which use hydrostatic support means for contributing to the support of the heliostat's reflective surface above a (underliquid) ground surface, and all such embodiments should be construed to fall within the scope of the present invention. Heliostat embodiments using "ground" support, when the "ground" surface is the deck of a floating platform (e.g., barge, ship, or other floating platform), should also be construed as falling into the category of heliostats utilizing hydrostatic support means. A plurality of such floating platform mounted heliostats could be combined with other elements (e.g., tower, solar receiver, and optional electricity generating powerplant) also supported by the floating platform(s), to make a floating platform supported embodiment of a solar thermal powerplant or solar powered desalination plant. A large area lightly loaded barge or network of connected barges (with wave-blocking barrier walls around the perimeter) could support heliostats over a large water area.

Figure 34A:
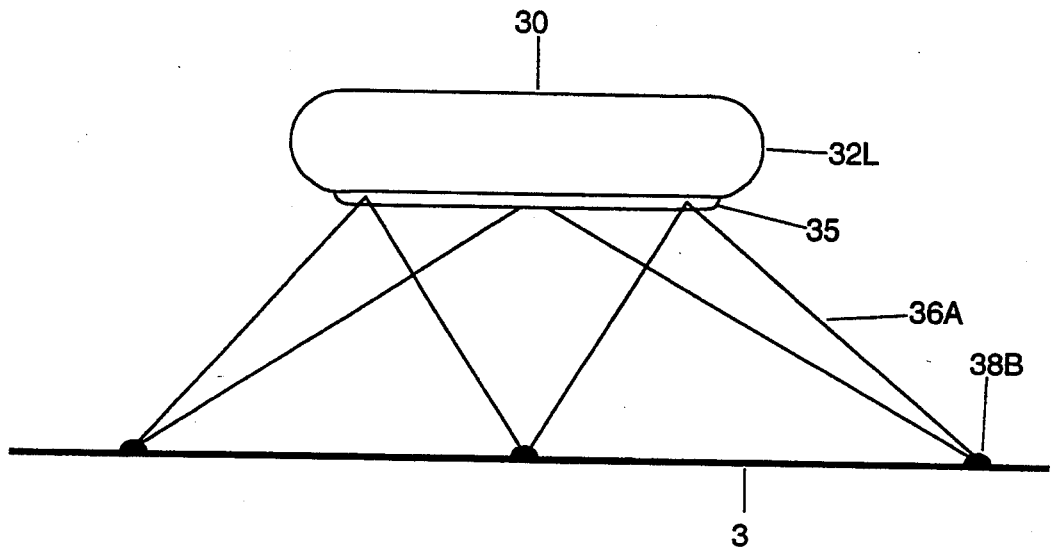
FIGS. 34A and 34B show embodiments of aerostatically supported balloon heliostats.

FIG. 34 shows side views illustrating representative examples of heliostats which are air supported. FIG. 34A shows an aerostatically supported balloon heliostat using a toroidal balloon with aerostatic lift 32L. A reflective surface 30 is installed on top of the toroidal ballon and is supported around its periphery by the toroidal balloon. A control ring is installed around the bottom of the toroidal balloon. A lower surface (not shown) may optionally be installed. In this case the enclosed volume surrounded by the reflective surface, toroidal balloon, and lower surface may also be optionally filled with lifting gas, optionally at sub-ambient pressure. The toroidal balloon 32L, being filled with a lifting gas (e.g., helium, hydrogen, or hot air), would tend to fly upwards due to aerostatic forces except for being restrained by control tethers/rods 36A in tension. In other words, the toroidal balloon is filled with lifting gas and generates aerostatic lift in excess of the heliostat weight which excess lift is reacted by tension forces in the control tethers/rods 36A. The control tethers/rods 36A connect at their upper ends to the control ring 35 and at their lower ends to control tether/rod base elements 38B. By diffenentially varying the lengths of the different control tethers/rods, it will be possible to point the balloon heliostat as desired in elevation and azimuth.

Thus the embodiment illustrated in FIG. 34A provides a heliostat, support means comprising an inflated balloon for supporting said reflective surface, and control means for orienting said reflective surface so as to reflect incident light from the Sun to a target region, wherein said support means provides means for supporting said reflective surface above a ground surface, and further comprising aerostatic support means for contributing to the support of said reflective surface above said ground surface.

Figure 34B:
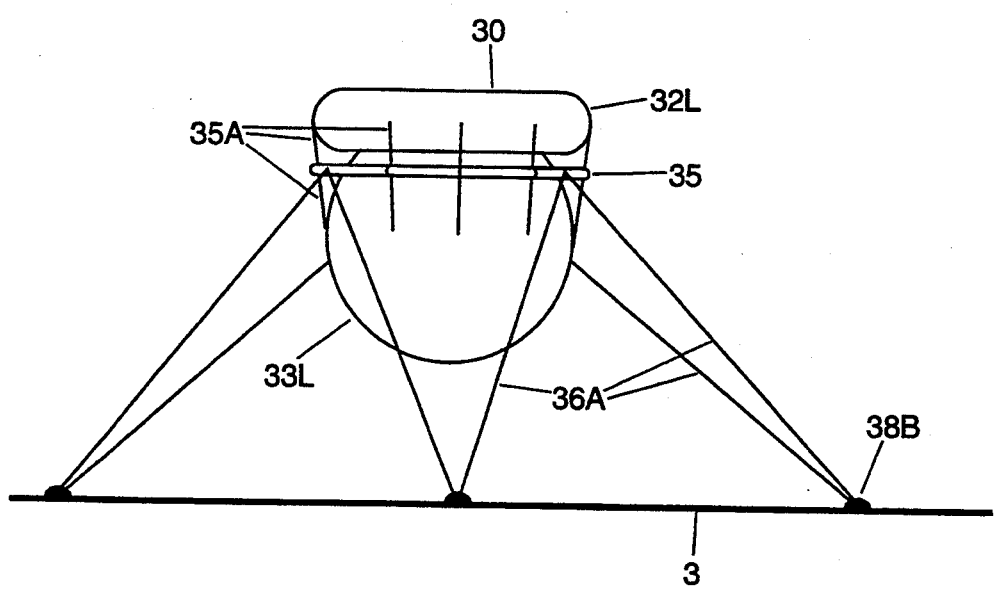

FIG. 34B presents another variant of an aerostatically supported balloon heliostat. This embodiment includes a base balloon with aerostatic lift 33L, which is also filled with a lifting gas such as helium or molecular hydrogen gas. The base balloon fits under the toridal balloon in a manner similar to that described with reference to FIG. 7B. The control ring 35 is connected to the toridal balloon 32L and the base balloon 33L by toroidal balloon to control ring to base balloon connecting elements 35A (e.g., tethers or rods), in a manner similar to that described with reference to FIG. 8. The plural control tethers/rods 36A connect the control ring 35 with control tether/rod base elements 38B anchored in the ground surface 3. By varying the relative lengths of the control tethers/rods 36A, the face of the heliostat (i.e., the reflective surface 30) can be reoriented in two degrees of freedom (elevation and azimuth) so as to perform its heliostatic function.

While aerostatically supported balloon heliostat embodiments have been shown with either a toroidal balloon only or with the combination of a base balloon and a toroidal balloon, still other embodiments of aerostatically supported balloon heliostats (not shown) may incorporate a base balloon only but no toroidal balloon (e.g., in a manner similar to the ground supported embodiment described with reference to FIG. 28A).

A design issue relevant to all aerostatically supported balloon heliostats is the issue of how to prevent heliostat movement and misalignment when it is subject to wind and gust induced loads. The use of angled control tethers/rods (as illustrated in FIGS. 34A and 34B) can help stabilize aerostatically supported balloon heliostats against wind and gust loads. Control rods may have advantages over control tethers in being better able to resist wind/gust induced loads on the balloon and reflective surface.

Active, dynamic control of the lengths and forces of the different control tethers/rods can be used to reduce gust-induced pointing errors. Aerodynamic means (e.g., heliostat mounted propellers or ducted fans, not shown) for responding to and countering gust-induced heliostat pointing errors may also be provided.

In certain embodiments of aerostatically supported balloon heliostats, the balloon heliostat may be partially rather than wholly supported by aerostatic forces, with other means for providing the balance of balloon heliostat support force (e.g., compression forces in control rods connecting the balloon heliostat with the ground surface below).

Finally, some aerostatically supported balloon heliostats may be situated over water rather than land surfaces, with their control tether/rod base elements installed at locations either on the water surface (e.g., on floats/floating structure) or on the underwater ground surface.

It should be understood that further variant embodiments of balloon heliostats are compatible with full or partial aerostatic support by filling their balloon element(s) with lifting gas. Aerostatically supported balloon heliostats may be configured and controlled either singly or in arrangements in two or three-dimensional arrays. Plural aerostatically supported balloon heliostats could reflect light from the Sun to a common central solar receiver, or in alternate embodiments a single aerostatically supported heliostat with a sunward concave focusing reflective surface could have attached to it its own individual solar receiver.

Figure 35A:
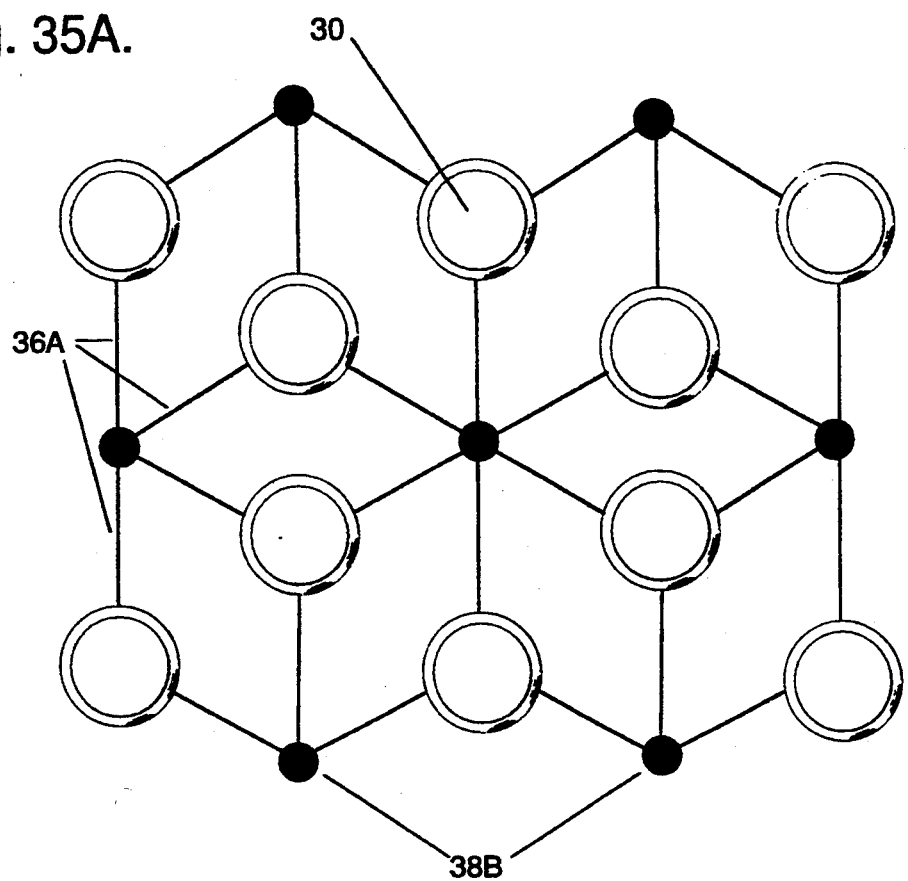
FIGS. 35A through 35C, 36A through 36C, 37A and 37B show embodiments of exemplary heliostat arrays.

FIG. 35 shows a top views of exemplary array arrangements of balloon heliostats. FIG. 35A shows a hexagonal array with each control tether/rod base element 38B serving as a base for six control tethers/rods 36A going to six different balloon heliostats (here represented by their reflective surfaces 30) around the base element. The control tethers/rods may attach to each of the reflective surfaces 30 directly or indirectly (e.g., through a toroidal balloon support structure, a control ring, or backing structure for the reflective surface- not shown). If control tethers are used, their lengths may be varied by tether positioning motorized reels (not shown, but similar to those shown in FIG. 5B) located either at the bottom of the control tethers (e.g., at the control tether base elements) or the top of the control tethers (e.g., at a control ring). If control rods are used, telescopic, screwing, or other means for rod length variation may be provided. Each balloon heliostat is controlled in orientation (i.e., elevation and azimuth) by three control tethers/rods 36A. A centralized control system controlling all the different control tethers/rods and thereby controlling all the different balloon heliostats is preferably provided.

Figure 35B:
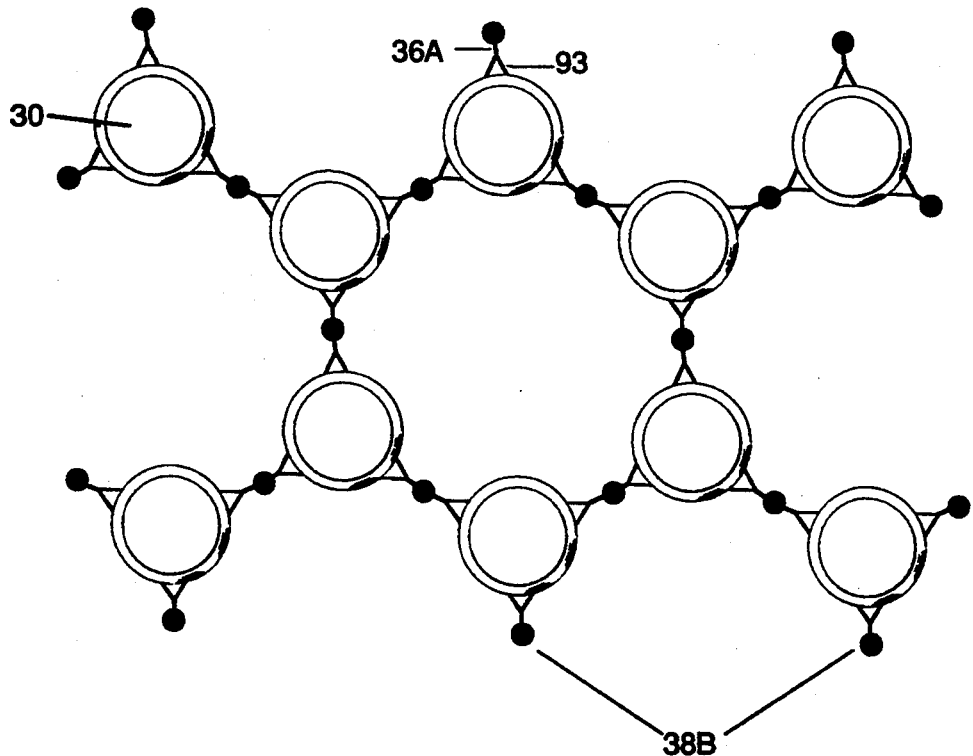

FIG. 35B shows an array embodiment wherein each control tether/rod base element 38B controls two control tethers/rods 36A and wherein looped tether elements 93 are used on the upper ends of each control tether/rod.

Figure 35C:
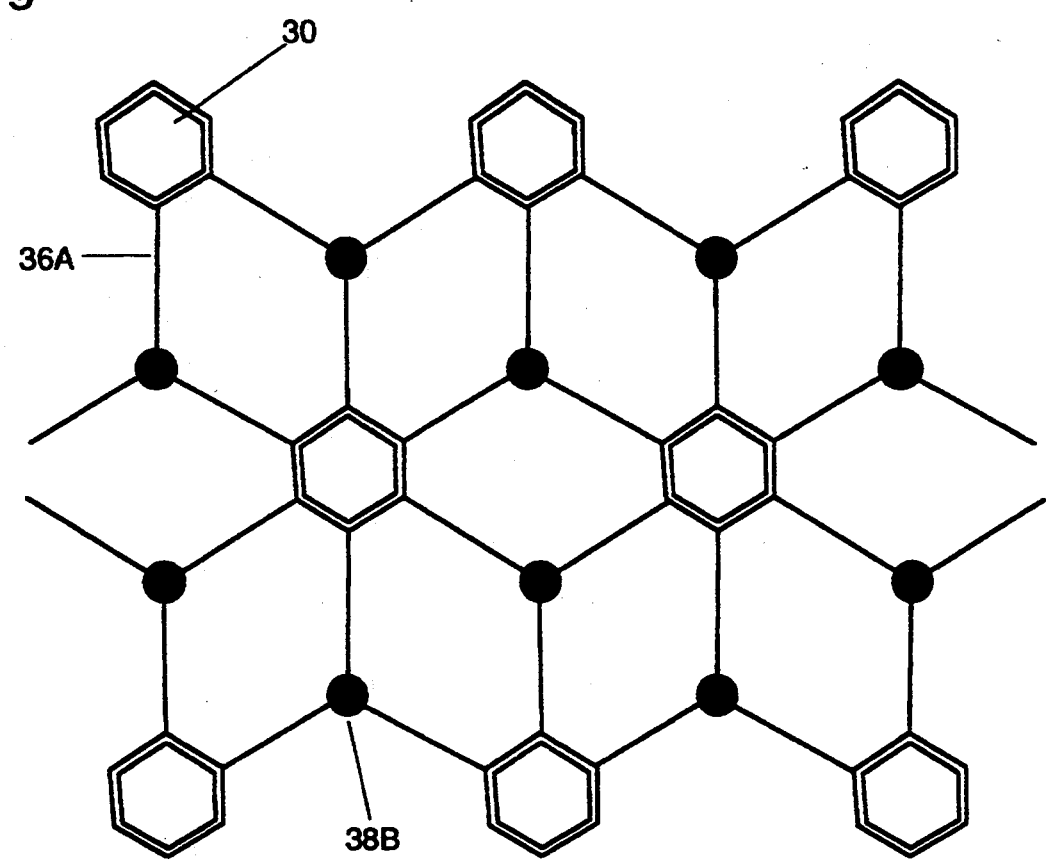

FIG. 35C shows another hexagonal array embodiment, wherein each control tether/rod base element serves as a ground attachment point for three control tethers/rods going to three different heliostats. Now six control tethers/rods are used to control the orientation (i.e., azimuth and elevation) of each of the reflective surfaces 30. The embodiment shown features substantially hexagonal rather than substantially circular reflective surfaces 30. For such hexagonal planform reflective surfaces, hexagonal planform perimeter support balloons may be used in lieu of the circular planform toroidal balloons. Elliptical planform reflective surfaces and perimeter support balloons may also optionally be provided.

In summary, FIGS. 35A through 35C (and FIGS. 36A, 36B, 36C, 37A, and 37B to be described in more detail subsequently) show exemplary embodiments of a solar power collection apparatus comprising a solar receiver (not shown) and a plurality of heliostats, wherein at least some of the plurality of heliostats are balloon supported heliostats, which balloon supported heliostats each comprise a reflective surface, support means for supporting said reflective surface above a ground surface which support means includes at least one inflated balloon, and control means for orienting said reflective surface so as to reflect incident sunlight from the Sun to said solar receiver. The illustrated embodiments show that the balloon supported heliostats are arranged in an orderly pattern above the ground surface, wherein elements of the control means associated with neighboring heliostats are secured to the ground surface at common points in the interstices of the orderly pattern.

Figure 36A:
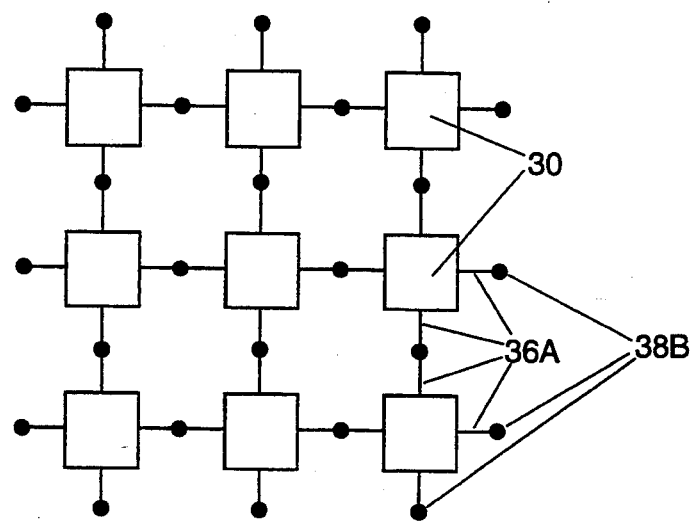

FIG. 36A shows a top view of another array of heliostats. A substantially square/rectangular array is shown. In this embodiment the reflective surfaces 30 of the balloon heliostats are also shown to be square, as for example would be possible using the balloon heliostat embodiment of FIG. 27B. In this array embodiment each control tether/rod base element serves as a ground attachment point for two control tethers/rods going to two different heliostats. Four control tethers/rods are used to control the orientation (i.e., azimuth and elevation) of each of the reflective surfaces 30, and may attach to each of the reflective surfaces 30 directly or indirectly.

Figure 36B:
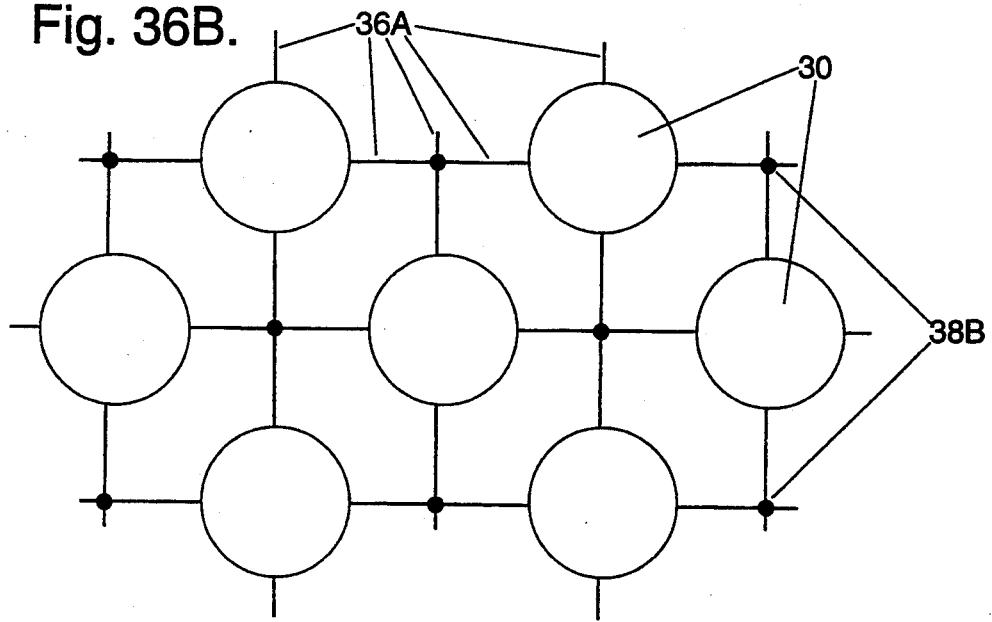
Figure 36C:
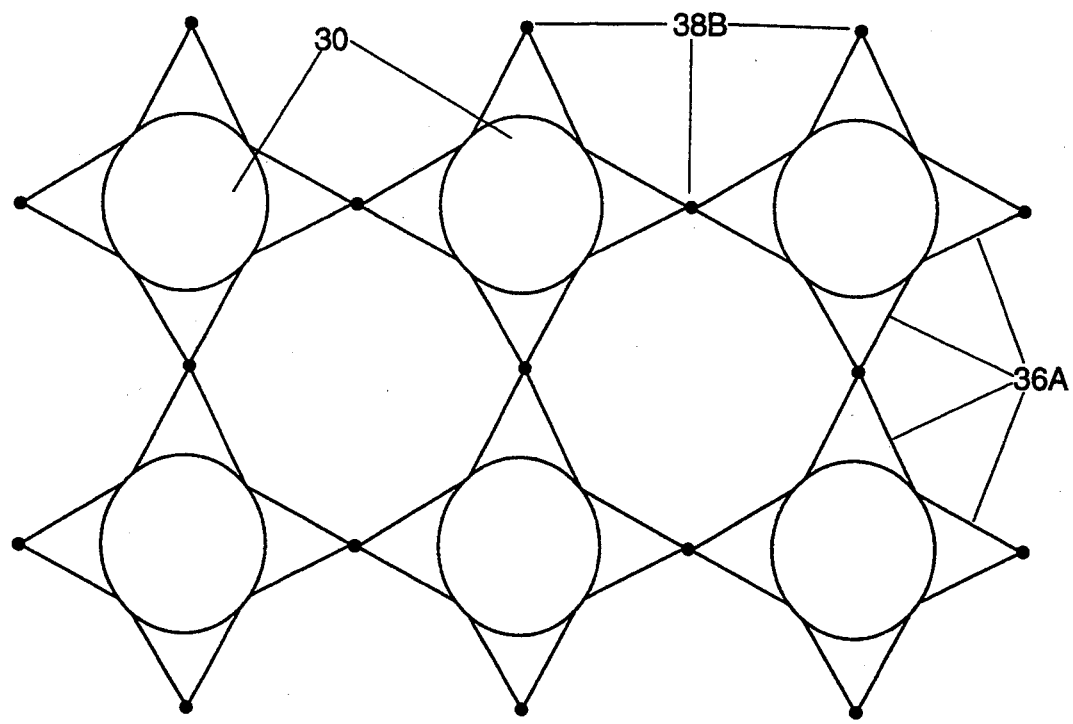

FIGS. 36B and 36C show variant array embodiments with a substantially square/rectangular array geometry. In FIG. 36B each control tether/rod base element 38B serves as a ground attachment point for four control tethers/rods 36A going to four different balloon heliostats, and four control tethers/rods are used to control the orientation (i.e., azimuth and elevation) of each of the balloon heliostats. In FIG. 36C each control tether/rod base element 38B serves as a ground attachment point for four control tethers/rods 36A going to two different balloon heliostats, and eight control tethers/rods are used to control the orientation (i.e., azimuth and elevation) of each of the balloon heliostats. The upper ends of adjacent control tether/rods coming from different base elements may optionally be connected together and looped around a pulley connected to the balloon heliostat at their common attachment point to the balloon heliostat.

Figure 37A:
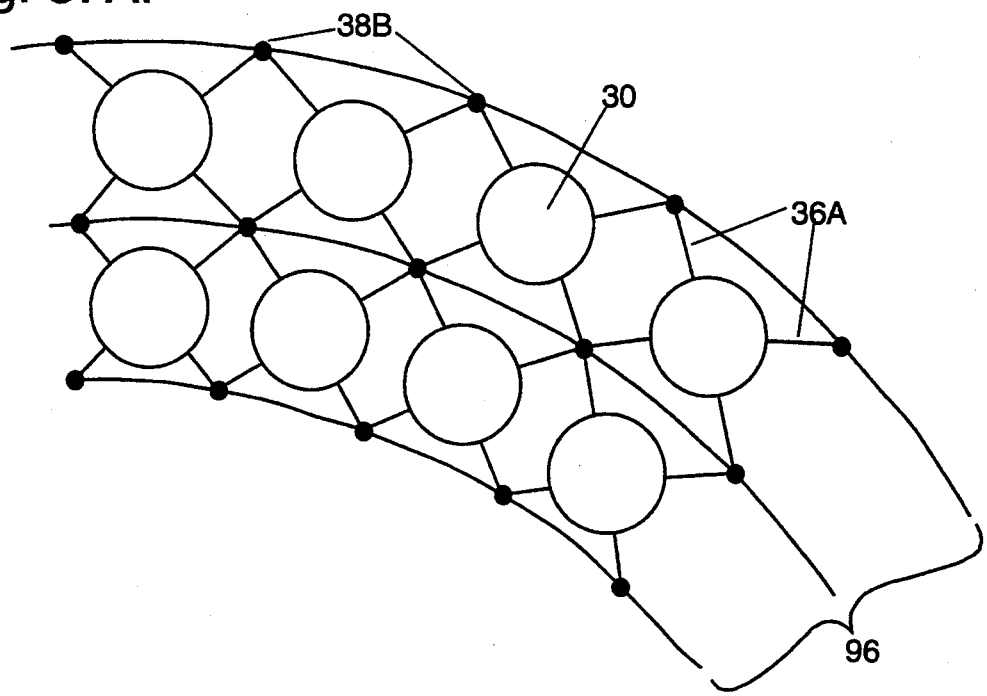
Figure 37B:
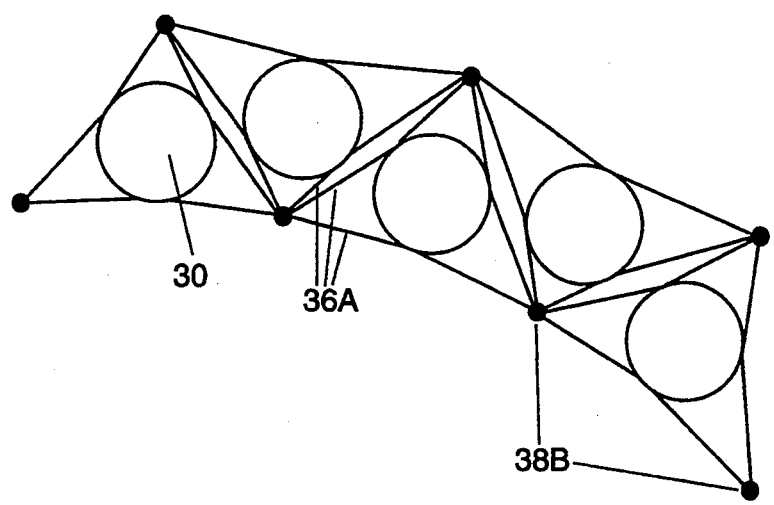

FIG. 37A shows a top view of yet another array of balloon heliostats. An array comprising plural concentric rings 96 of heliostats is shown, with the reflective surfaces of the heliostats designated by 30. Control tethers/rods are designated by 36A and control tether/rod base elements by 38B. Note that each control tether/rod base element nominally serves as a ground attachment point for four control tethers/rods going to four different heliostats. Four control tethers/rods are used to control the orientation (i.e., azimuth and elevation) of each of the reflective surfaces 30, and may attach to each of the reflective surfaces 30 directly or indirectly (e.g., through a toroidal balloon support structure, a control ring, or backing structure for the reflective surface—not shown). The array arrangement shown is basically the same as that shown in FIG. 36B, turned obliquely and wrapped around a ring structure. Of course, some adaptations will need to be made in the control tether/rod base element arrangements to account for reduction in number of heliostats in more inner rings of the array. Note also that alternate control tether/rod arrangements could be used for ring arrays (e.g., any of the arrangements of FIG. 35 or FIG. 36, also wrapped around the ring structure). One example of an alternate control tether/rod arrangement for a ring type array is shown in FIG. 37B, with each base element serving as base for six control tethers/rods in each adjacent ring and with each heliostat being controlled by three control tethers/rods.

While a plurality of representative array embodiments for balloon heliostats have been described, it should be understood that still further variants and modifications can be made within the spirit and scope of the invention. Also, arrays with a mixture of balloon heliostats and conventional (i.e., non-balloon) heliostats are also possible. Factors to be considered in the design and selection of balloon heliostat array arrangements include spacing considerations, land use efficiency, solar concentration efficiency, shadowing (if any), cost of control rods/cables, cost of ground anchor points, cost of control system, serviceability, etc.

Figure 38A:
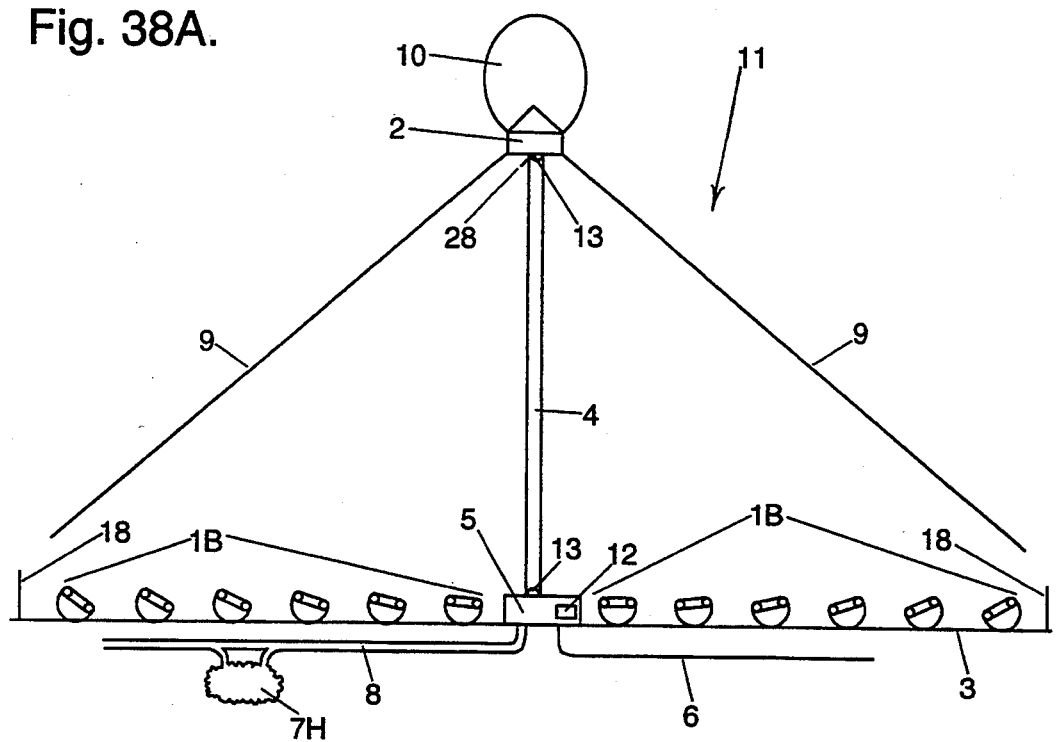
FIG. 38A illustrates a solar power concentration apparatus which is a solar central receiver powerplant using balloon heliostats.

FIG. 38A shows an exemplary solar thermal powerplant using a field of heliostats at least some of which are balloon supported heliostats 1B. The illustrated heliostats each comprise a reflective surface, support means comprising an inflated balloon for supporting said reflective surface, and control means (typically including control rods and/or control tethers) for orienting said reflective surface so as to reflect incident solar radiation 11 falling on the reflective side of said reflective surface from a solar radiation incident direction which is a function of time (either directly as sunlight or indirectly as moonlight) to a target region substantially at which a solar receiver 2 is located. The illustrated heliostats are similar in configuration to the heliostat described with reference to FIG. 3, with control rods/control tethers not shown so as not to clutter the illustration. Of course alternate heliostat configurations with balloon supported reflective surfaces can be used within the spirit and scope of the invention. While the illustrated embodiment uses heliostats with balloon supported reflective surfaces for all the illustrated heliostats in the field of heliostats, alternate embodiments may use arbitrary combinations of conventional heliostats and heliostats with balloon supported reflective surfaces in the heliostat field. Heliostats with balloon supported reflective surfaces may feature reflective surfaces which are concave on their reflective side (i.e., upper side or side facing incident solar radiation 11 falling on the reflective surface from a solar radiation incident direction, as illustrated) so as to provide some focusing of reflected light and improved concentration ratio at the solar receiver 2 and/or reduced heliostat count for given gross reflective and receiver areas.

Control means (preferably including a powerplant central control computer 12 and variable length control tethers/rods for each heliostat) are provided for orienting the reflective surface of each heliostat in the field of heliostats in two degrees of freedom (azimuth and elevation) as a function of time-of-day and time-of-year so as to reflect incident solar radiation 11 (preferably direct sunlight) to a target region in which a solar receiver 2 is located. The target region may be on the underside or inside (e.g., a cavity receiver) of the illustrated solar receiver 2. A variety of alternate receiver configurations including those with outside receiving surfaces are possible within the scope of the invention. The control means will preferably include computer means for computing the required orientation of each heliostat as a function of time, which computer means may be furnished by the powerplant central control computer 12 and/or in whole or in part by control computers associated with individual heliostats or cluster of heliostats. The powerplant central control computer 12 will preferably coordinate or control heliostat tracking, compensate for sensed winds or gusts and cloud cover effects, command heliostat defocus in emergencies, and command heliostat stow and/or cover in the event of rain, hail, blowing sand, or storm. A powerplant central control center with human operators (not shown) may be located adjacent to or remote from the location of the control computer 12 (which may also be sited in a variety of alternate locations governed by design, engineering, and operational considerations).

A heliostat alignment calibration instrument 28 may optionally be provided at a location near the solar receiver. The control means for orienting the reflective surface (of each of a plurality of heliostats) is calibrated by calibration means (including this calibration instrument 28) for precisely calibrating the orientation of (each of) the heliostat(s).

This calibration instrument 28 will typically use an optical sensor to measure solar optical power reflected from a heliostat whose orientation is being calibrated. Reflected image shape and light intensity may be measured by the calibration instrument to help achieve correct heliostat reflective surface curvature and focal point. The instrument will preferably be rotatable/orientable as required to enable it to be used to calibrate the orientation of any heliostat in the field of heliostats. A calibrated orientation heliostat will be able to be controlled in orientation in such manner as to deliver the maximum possible amount of solar power to the solar receiver.

The combination of the plurality of heliostats and the solar receiver function as a solar power concentration apparatus. Thus the embodiment illustrated in FIG. 38A provides a solar power concentration apparatus comprising a solar receiver and a plurality of heliostats, wherein at least some of said plurality of heliostats are balloon supported heliostats 1B, which balloon supported heliostats each comprise a reflective surface, support means for supporting said reflective surface above a ground surface 3 which support means includes at least one inflated balloon, and control means for orienting said reflective surface so as to reflect incident sunlight from the Sun to said solar receiver 2. The plurality of heliostats reflect incident sunlight onto said solar receiver 2, causing said solar receiver to receive a concentrated solar energy flux, which concentrated solar energy flux heats a working fluid passing through the solar receiver to a high temperature.

The target region is typically high above the ground surface 3, and the solar receiver 2 is typically supported at this high location, upheld at a specific position above the plurality of heliostats, by a tower 4. Optional one- or two-degree-of-freedom pivotable attachments 13 at the top and bottom of the tower may be used to provide means for moving the solar receiver as a function of time (in order to maximize solar power received at the solar receiver from the field of heliostats at different times of day and times of year). The tower may be a freestanding structure or may be braced against wind loads by guy wires or tethers 9 which serve as means for bracing the tower against lateral airloads. The solar receiver may optionally be upheld at least partially by aerostatic lift provided by an (optional) aerostat 10 (e.g., a Helium balloon). The use of aerostatic means for upholding a solar receiver has been described earlier in U.S. Pat. No. 4,581,897 to Mithra M. K. V. Sankrithi, entitled "Solar Power Collection Apparatus".

Concentrated solar power received at the solar receiver 2 may be used for heating or lighting purposes. For example, hot fluid heated by the incident solar power in the solar receiver may be taken out to provide heat to users via means for transmitting hot fluid 8 such as an insulated pipe. FIG. 38A shows means for transmitting hot fluid 8 and also means for storing heat 7H (e.g., insulated tanks for storing hot molten salt working fluid). These means for transmitting hot fluid 8 can transmit fluid heated by the solar receiver 2 or use waste heat from an electricity generating powerplant 5 (to be discussed subsequently). The hot fluid may be transmitted to heat-using customers or to a cooling facility (e.g., cooling tower(s)), and cooled fluid may be returned to the powerplant site. The heat may be used for industrial process heat application, or for building heating or hot water supply for industrial, commercial, residential, or other buildings.

Alternatively or additionally to producing heat and/or light, the solar power received may be used to supply power to an electricity generating powerplant 5. In this case the solar power concentration apparatus is a solar thermal powerplant, with an electricity generating powerplant 5 providing conversion means for converting at least a portion of solar power received at the solar receiver into electric power. The electricity generating powerplant 5 will typically be a thermodynamic cycle (e.g., steam cycle, Brayton cycle, Rankine cycle, or other cycle) powerplant with electricity being generated by a solar heated working fluid driving a turbine generator apparatus. Examples of working fluids which could be used include steam or superheated steam, helium, other gases, liquid (molten) salts or other liquids, or even solid granules or powders.

The electricity generating powerplant may also incorporate electric power conditioning means for conditioning the electric power to have desirable transmission characteristics (e.g., DC or AC, voltage and phase characteristics, current characteristics, time variability, filtering and transient suppression). The conditioned electric power is taken from the powerplant by means for transmitting electric power 6 (e.g., high voltage powerlines), to ultimately feed into the electric power grid and provide electric power to industrial, commercial, and/or residential customers.

Another feature illustrated in FIG. 38A is a windbreaking fence 18 which serves as means for reducing the wind loads on the plurality of heliostats in the field of heliostats. Wind and gust loads can degrade pointing accuracy of heliostats (both conventional heliostats and heliostats with balloon supported reflective surfaces) and can be major design drivers for the heliostat orientation control subsystem (including control tethers/rods and their preferably motorized length varying mechanisms for heliostats with balloon supported reflective surfaces). Thus use of windbreaks such as a windbreaking fence around all or part of the perimeter of the field of heliostats should enable more precise heliostat pointing and lighter, less expensive heliostat control subsystems. The windbreak fences may be "solid sheet" type fences or they may have some holes to permit some reduced level of wind passage through the fence. Fence designs using airfoils to deflect the wind upwards (as used in state-of-the-art blast fences for deflecting airplane jet engine exhaust) may alternatively be used. Still another alternative for a windbreaking fence is the use of a plurality of propellers/rotors/windmill type devices around the perimiter of the heliostat field, which extract power from the wind before it passes through the field of heliostats.

In a variant embodiment of the illustrated embodiment of FIG. 38A, the whole solar power concentration apparatus/solar thermal powerplant may be sited on a floating/partially floating platform such as a vessel or vessels—e.g. the illustrated ground surface 3 could be considered to be the deck surface of a large floating barge or network of barges. Heat and/or electric power transmission lines could optionally run underwater or along the water surface to shore. Heliostat pointing control could be compensated for motions of the barge "ground" surface (e.g., the powerplant central control computer could do this). The windbreaking fences 18 could be supplemented by wavebreaking water surface fences around the perimeter of the floating concentration apparatus/powerplant in this embodiment.

Figure 38B:
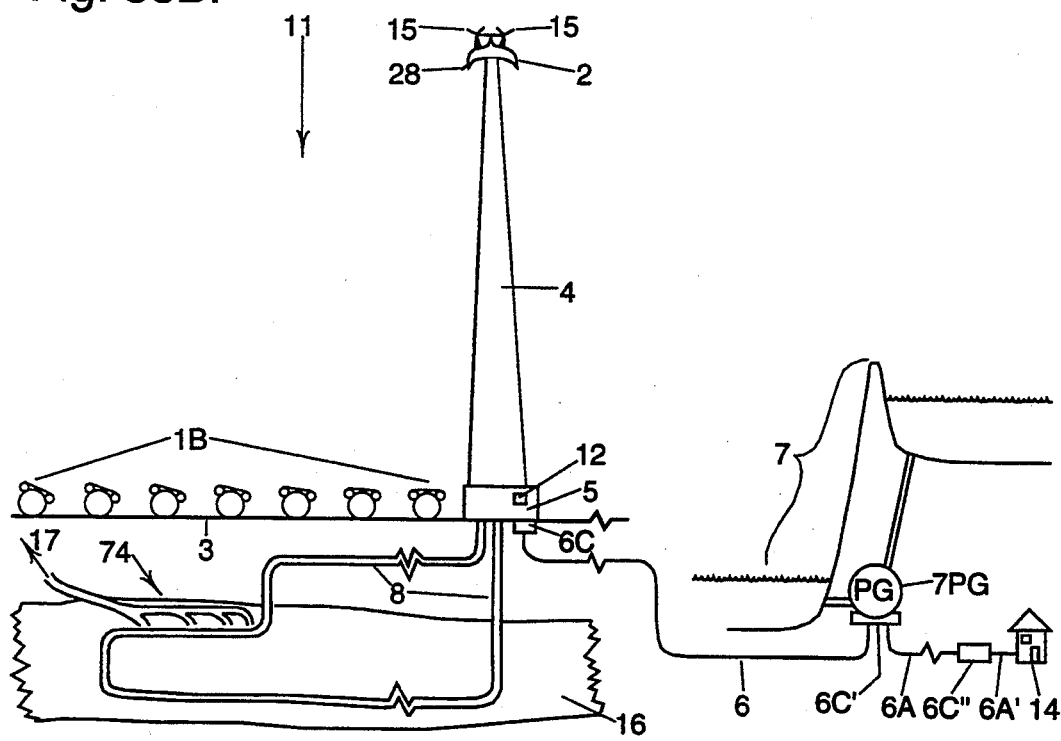
FIG. 38B presents an embodiment of a solar electric power apparatus which further illustrates the storage of solar thermal energy using hydroelectric pump/generator means and the usage of solar thermal heat to retort oil shale.

FIG. 38B shows another exemplary solar thermal powerplant using a field of heliostats wherein at least some of the heliostats are heliostats with balloon supported reflective surfaces 1B. In this embodiment the tower 4 supporting the solar receiver is a tapering structure, and the solar receiver 2 is a cavity type solar receiver. Again, the combination of the plurality of heliostats and the solar receiver functions as a solar power concentration apparatus. The embodiment of FIG. 38B also illustrates the use of optional aerodynamic thrusting means 15 for generating a leaning moment on tower 4. A typical use of the aerodynamic thrusting means is to counter wind induced tower leaning moments and to serve a function similar to that served by the optional guy wires 9 in the embodiment of FIG. 38A. The illustrated aerodynamic thrusting means comprise propellers/airscrews which are powered preferably by electricity and which are orientable in azimuth (i.e., swivellable) to counter the wind regardless of its direction. Vertical axis aerodynamic devices such as the "eggbeater windmill" device can be used alternatively, in a thrusting mode. When wind induced leaning moment is safely within the leaning structural capability capability of the tower (which may be all the time for a strong and stiff tower), the aerodynamic thrusting means 15 can be used in a power extracting mode to generate power from the wind (i.e., like a windmill).

As in FIG. 38A, the provision of an optional electricity generating powerplant 5 provides conversion means for converting at least a portion of solar power received at the solar receiver 2 into electric power.

The electical power thus generated is carried through means for transmitting electric power 6 to a second means for conditioning electric power 6C'. The second means for conditioning electric power 6C' may include means for performing voltage regulation or change, current regulation, DC/AC conversion, phase control, switching, splitting and joining electric current flows, and other regulation, control, and conditioning functions. The second means for conditioning electric power 6C' can transmit electric power from the solar thermal powerplant through second means for transmitting electric power 6A and optional third means for conditioning electric power 6C" and optional third means for transmitting electric power 6A' (and optional additional stages of conditioning electric power and transmitting electric power) to consumers of electric power represented by the building symbol 14.

The total apparatus from the field of heliostats (wherein at least some of the heliostats are heliostats with balloon supported reflective surfaces 1B) through to the consumers of electric power 14 can be characterized as a solar electric power apparatus for providing electric power to consumers of electric power, comprising:

(i) a plurality of heliostats each comprising a reflective surface, support means for supporting said reflective surface, and control means for orienting said reflective surface so as to reflect incident solar radiation to a solar receiver, wherein said support means for supporting said reflective surface includes at least one inflated balloon;

(ii) generation means for converting at least a portion of solar power carried by the light reflected by the heliostats to the solar receiver into electric power; and (iii) means for transmitting the electric power from the generation means through conditioning means for conditioning the electric power to the consumers of electric power.

Under some circumstances the second means for conditioning electric power 6C' may transmit all or part of the incoming power from the means for transmitting electric power 6 to a pump generator subsystem 7PG. The pump generator subsystem 7PG is installed in a water (or other liquid) flow path connecting two bodies of water (or other liquid) at different elevations, as illustrated. The two bodies of water or other liquid may be dammed or undammed rivers, reservoirs, lakes, inland seas, seas, oceans, or liquids in underground reservoirs (e.g., salt domes). When excess solar electric power is being produced relative to electric power consumption (e.g., as may typically occur around midday), the pump generator subsystem 7PG serves as pump means for using electric power power from the solar power concentration apparatus to pump some water/liquid from the lower body of water/liquid to the upper body of water/liquid, thereby converting some of the electrical energy from the powerplant into gravitational potential energy of the water/liquid being pumped up. When insufficient solar electric power is being produced relative to electric power consumption (e.g., as may typically be the case in the late evening), the pump generator subsystem 7PG serves as generator means for generating electic power from the passage of some water/liquid from the upper body of water to the lower body of water/liquid. In this case gravitational potential energy of the water/liquid is being converted into electrical energy by the pump generator subsystem functioning in the generator mode. The generator produces electric power to feed into the electric power grid via the second means for conditioning electric power 6C' and the second means for transmitting electric power 6A. The pump generator subsystem 7PG in conjunction with the two bodies of water/liquid at different elevations and the connecting plumbing thus together provide energy storage means for receiving electric power from the powerplant 5 (which serves as conversion means for converting at least a portion of solar power received at the solar receiver into electric power) over some time period (e.g., daytime), storing the energy over a second time period (e.g., late afternoon and/or early evening), and finally transmitting stored energy as electric power over a third time period (e.g., evening and/or night). In the generator mode of operation of the pump generator subsystem the energy storage means produces power in the same manner as does a hydroelectric powerplant.

As a variant of this energy storage embodiment, a conventional hydroelectric powerplant can be used in conjunction with the solar thermal powerplant, using simple hydroelectric generators instead of pump/generators. In this variant embodiment, the solar thermal powerplant powers the electric power grid during the daylight hours. During these hours water is prevented from flowing or allowed to flow at reduced volume per unit time though the hydroelectric generators, and river water inflow is accumulated behind the dam of the hydroelectric powerplant. Thus the water gravitational potential energy stored behind the dam increases. At night (and to a partial extent during morning and evening hours when the solar thermal powerplant is generating output power below the electric power consumption level) the water is allowed to flow through the turbine-generator units of the hydroelectric powerplant to generate power to feed the electric power grid. The power generated by the hydroelectric powerplant at night (and mornings and evenings to a limited extent) can be at a higher power level than if the hydroelectric powerplant were run continuously over 24 hours of the day, as the extra water gravitational potential energy stored over the daylight period can be extracted at night, with no change to the net daily waterflow volume. This can also result in better utilization of existing hydroelectric facilities which have extra generator capacity which they currently cannot use continually because they are often waterflow limited rather than generator limited.

In addition to or instead of use of hydroelectric means of storing electrical energy from the generator of the solar thermal powerplant using balloon heliostats, several other types of energy storage means may be provided.

Alternative energy storage means may store input electrical energy (=time integral of input electric power) as (i) gravitational potential energy, (ii) kinetic energy, (iii) chemical energy, (iv) mechnical potential energy, (v) electromagnetically stored energy, (vi) energy stored in compressed air/gas (vii) energy stored in synthesis gas energy storage means, and/or (viii) other energy storage means. The energy storage means using a pump generator subsystem as described above stores energy in the form of gravitational potential energy.

An example of kinetic energy storage means comprises use of at least one flywheel for energy storage, as known in the prior art. Kinetic energy could also be stored in a variable speed, massive train running around a closed-loop track (e.g., around the perimeter of a solar powerplant).

An example of chemical energy storage means is a battery. Another example uses electric power to electrolysize water into hydrogen and oxygen gas, which can subsequently be burnt together or with other substances (e.g., hydrogen burn with air, oxygen use to burn coal or coal-derived fuels) to power thermodynamic cycle electric power generation means or to power combustion engines for vehicles or machines, as is known in the prior art.

An example of mechanical potential energy storage means uses at least one compressed spring (linear, torsional, or other), as is known in the prior art.

An example of energy storage means using electromagnetically stored energy involves storing energy in coils of superconducting wire carrying large amounts of current in a closed loop, as has been described in prior art.

Examples of energy stored in compressed air fall under the category of compressed-air energy storage (CAES), a technology which has recently started to be used to store electric power at times of excess production for use at times of excess consumption. Compressed gases other than air can also be used.

Synthesis gas energy storage means are yet another way to store energy for subsequent use.

Further known and proposed methods in the art of storing electrical energy for subsequent use may also be used in conjunction with the solar thermal powerplant using heliostats with balloon supported reflective surfaces.

As already discussed, FIG. 38B shows means for transmitting hot fluid 8 in addition to the means for transmitting electric power 6. These means for transmitting hot fluid 8 can transmit hot working fluid heated to high temparature by passing through the solar receiver 2 (e.g., hot molten salt), or use a working fluid heated by waste heat from the powerplant 5. The hot fluid is transmitted to heat users or to a cooling facility (e.g., cooling tower(s)), and cooled fluid may be returned to the powerplant site. The heat can be used for industrial process heat application, or for building heating or hot water supply for industrial, commercial, residential, or other buildings. Alternatively, the heat can be stored in means for storing heat, and subsequently utilized for desired purposes (e.g., driving a heat engine to power an electic generator). Heat storage means proposed in the prior art include heat storage in in-situ rock structures and in various solid or liquid heat sinks, or in media which change phase through a heat of liquefication, heat of evaporation, or heat of sublimation.

Another possible application of heat from the solar power concentration apparatus involves use of a solar power concentration apparatus sited close to locations having (typically underground) deposits of oil shale, further provided with means for utilizing hot, high temparature working fluid heated by the solar power concentration apparatus to provide a heat source for retorting the oil shale (using in situ, partial in situ, or retort vessel retorting) to extract (synthetic crude) oil therefrom. This approach to solar powered retorting of oil shale could be employed in the region of the "Green River" oil shale deposits in Colorado, Wyoming, and Utah, for example. FIG. 38B illustrates solar heated retorting means 74 for retorting oil shale, wherein the means for transmitting hot fluid 8 passes through or near an oil shale bed 16, thus heating the oil shale bed sufficiently to cause in-situ retorting and thus enabling extraction of synthetic crude oil using means for extracting synthetic crude oil 17. The means for extracting synthetic crude oil could comprise pumping means which extract the synthetic crude produced from the in-situ retorting (pyrolysis) process. The solar heated pyrolysis may optionally be augmented or complemented by more conventionally heated pyrolysis (e.g., combustion means for heating the oil shale). The solar heated retorting process should greatly help in generating the requisite retorting heat without the adverse pollution impacts of other methods. The oil shale bed 16 may also optionally be used as means for storing heat, which heat can be subsequently used for desired purposes (e.g., electric power generation at night).

While FIG. 38B shows both a hydroelectric energy storage system and a solar heat retort system for oil shale, it should be understood that alternate embodiments may use these and other systems and subsystems either individually or in various combinations, within the spirit and scope of the invention.

Figure 39:
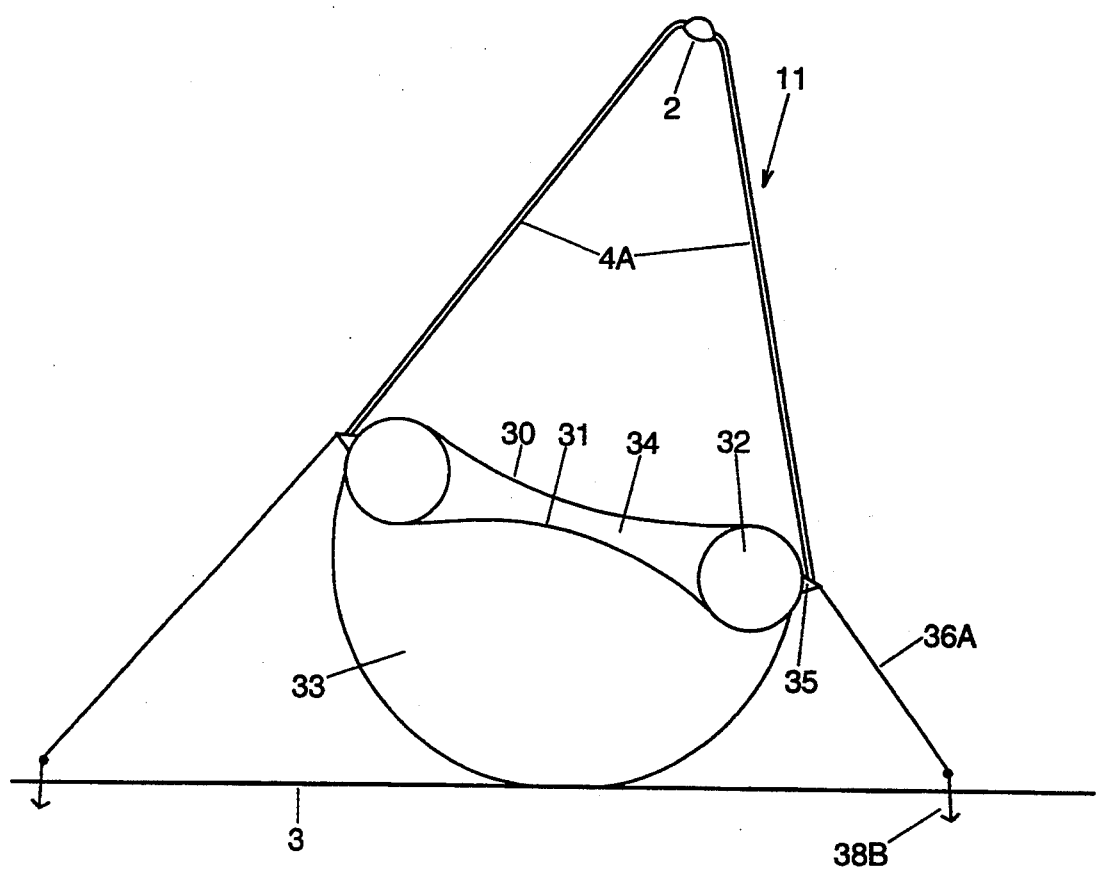
FIG. 39 shows an embodiment of a balloon heliostat with an attached solar receiver.

FIG. 39 illustrates an embodiment of a balloon heliostat with an attached solar receiver 2. While any of the disclosed types of balloon heliostats could be used (e.g., with either a base balloon, a toroidal balloon, or both), the illustrated embodiment uses a substantially semi-spherical base balloon 33 which supports a toroidal balloon 32, which in turn supports and maintains in tension a reflective surface 30 and a bottom surface 31. The enclosed volume 34 enclosed by the underside of the reflective surface (which may not be reflective), the top of the bottom surface 31, and the inner side of the toroidal balloon 32, will preferably be maintained at sub-ambient pressure so as to cause the reflective surface to adopt a concave up shape as required to focus reflected light from the Sun at the solar receiver 2. The solar receiver 2 is attached to the body of the balloon heliostat in the illustrated embodiment via receiver support structure 4A connecting the receiver 2 with a control ring 35 fitted around the periphery of the toroidal balloon 32. The control ring is the upper end attachment location for a plurality of control tethers/rods 36A, whose lower ends are secured to control tether/rod base elements 38B secured in the ground surface 3. Means for varying the effective lengths of the different control tethers/rods at different azimuthal locations around the balloon heliostat permit the balloon heliostat to be oriented in two degrees of freedom in such manner that the surface-averaged normal to the reflective surface 30 substantially aligns with the solar radiation incident direction from which incident solar radiation 11 falls on the reflective surface 30.

Hydrostatically and aerostatically supported variant embodiments of the the FIG. 39 balloon heliostat are also clearly possible.

Thus the embodiment of FIG. 39 provides a heliostat, comprising a reflective surface, support means comprising an inflated balloon for supporing said reflective surface, and control means for orienting said reflective surface so as to reflect incident solar radiation from the Sun to a target region, wherein a solar receiver is located substantially at said target region and is attached to the heliostat, wherein the reflective surface is maintained in a concave-sunward configuration and wherein the area of the target region is substantially smaller than the reflective area of the reflective surface.

The embodiment of FIG. 39 is somewhat similar to the embodiment of FIG. 30B, and if reflective membrane shaping tethers per FIG. 31F were used instead of sub-ambient pressure in the enclosed volume 34 for the purpose of shaping the reflective surface, the embodiment of FIG. 39 could also be used for space applications. Optional orientation control thrusters could also be added for this case, and the base balloon could probably be deleted.

Figure 40:
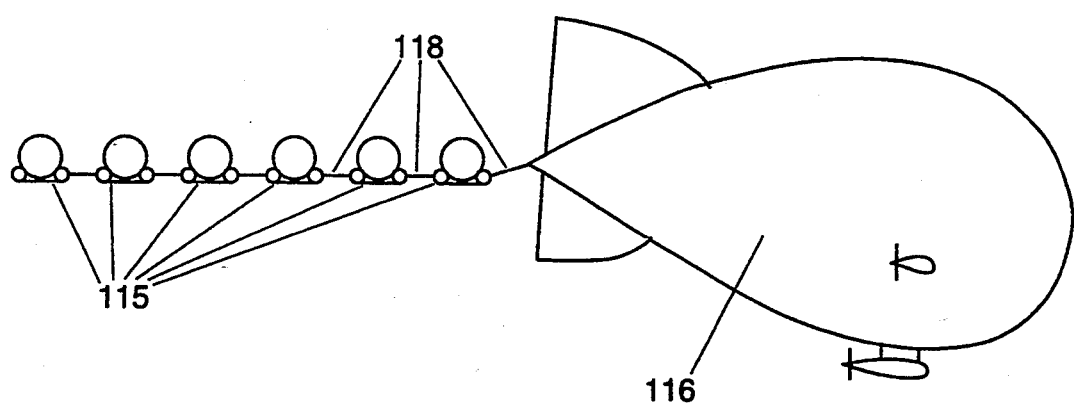
FIG. 40 shows aerostatic transport of balloon heliostats.

FIG. 40 shows a method of towing (at least partially) prefabricated balloon heliostats 115 inflated with lifting gas behind an aerostat tow vehicle 116, using at least one tow cable 118. Means are provided for inflating the inflatable balloon with a lighter-than-air than-air gas (e.g., helium or hydrogen gas). The balloon element(s) in the heliostats (e.g., base balloon and/or toroidal balloon) are filled with lifting gas (e.g., helium or hydrogen gas) prior to their transport to site. Upon delivery to site the lifting gas can be recovered for reuse, and the heliostats filled with air instead. The aerostat tow vehicle 116 may be a blimp, semirigid airship, or rigid airship. Helistat, aerocrane, cyclocrane, and other prior art fully or partially lighter than air vehicles may be used alternatively. The balloon heliostats may be carried upside down as illustrated, or in other orientations or configurations. Aerostatic towing of balloon heliostats may be an attractive way to transport heliostats to their deployment sites if they are very large heliostats (e.g., >80 ft. diameter) which would be difficult to transport over surface rights-of-way in inflated and assembled configuration.

Figure 41A:
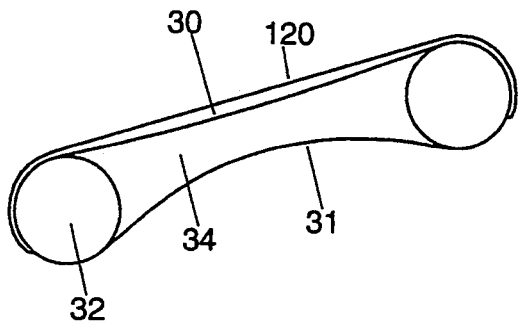
FIGS. 41A through 41C illustrate exemplary means for protecting/cleaning/conditioning the reflective surface of a balloon heliostat.
Figure 41B:
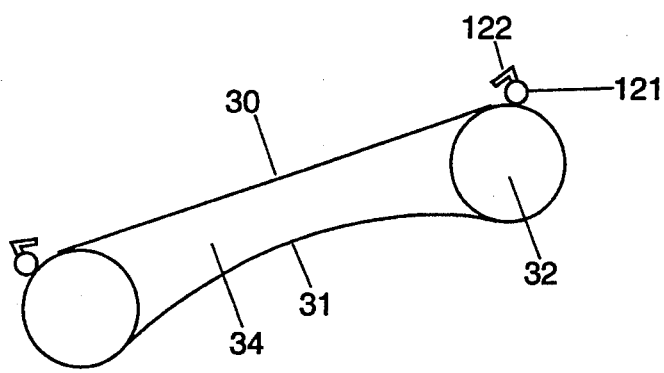
Figure 41C:
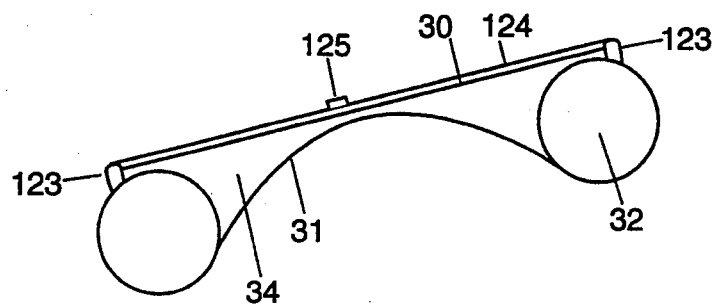

FIGS. 41A, 41B, and 41C illustrate some partial embodiments of balloon heliostats intended to illustrate means for maintaining the reflective surface 30 in good condition (including means for protecting, cleaning and conditioning). FIG. 41A shows an exemplary reflective surface 30 supported by a toroidal balloon 32, with a reflective surface protective cover 120 covering the reflective surface so as to protect it from possible damage/degradation of reflectivity due to rain, hail, sleet, blowing sand or particulates, etc. During non-use times (e.g., night) and/or during times of potential risk (e.g., rain or sand storm), the solar power concentration apparatus can be shut down and the individual balloon heliostats whose reflective surfaces are at risk can be fitted with the protective covers 120. The protective covers 120 will typically be sheets with elasticized or drawstring edges which can be pulled over around the toroidal balloon or perhaps secure to attach fittings on the toroidal balloon or a control ring. The protective covers can potentially be installed either manually or automatically or semi-automatically (e.g., by men on two hi-lift type trucks on opposite sides of the balloon heliostat). Two hi-lift trucks could also be connected via an overhead structure which carries the protective covers in a stack and means for installing/removing the covers on heliostats one by one.

An alternate roll-out protective cover has already been described with reference to FIGS. 28C and 28D.

An alternative method of providing some protection for the reflective surface in a dust /sandstorm is to simply orient the heliostats with the reflective surface pointed to leeward and downward (e.g., as in FIG. 6B) or at least as nearly vertical as possible.

FIG. 41B illustrates a reflective surface cleaning apparatus with spray nozzles 122 for cleaning the reflective surface 30. The spray nozzles are fed from a rigid ring 121 carrying spray fluid, which may also be the control ring for heliostat orientation control. The cleaning fluid could be water, a solvent such as a vinegar water mixture, or pressurized air. The spray nozzles may be mobile to enable them to be moved azimuthally around the rigid ring 121, and/or a sufficient number of spray nozzles may be provided around the perimeter of the heliostat to enable spray cleaning of substantially the whole reflective surface 30. Drain holes will preferably be provided so that cleaning fluid (or rain water) will not accumulate on the reflective surface 30. The spray head(s) will preferably not directly contact the surface to be cleaned.

An alternative method of spray cleaning the heliostat reflective surfaces would not be built into the heliostats but would rather use a sprayer from a cherry-picker or hi-lift type truck (e.g., as is used in spraying deicing fluid on aircraft wings and control surfaces). Dedicated heliostat maintenance and service vehicles may be built if needed.

FIG. 41C shows another cleaning apparatus for cleaning/conditioning the reflective surface 30 of a balloon heliostat. This embodiment shows a cleaning/conditioning apparatus 125 (which could be a washer/blower/sweeper/wiper/polisher/surface applicator) to clean/condition the reflective surface. The cleaning apparatus 125 is preferably movable along a cleaning apparatus support/guide rod/cable 124, which in turn is attached at at least one end (two illustrated) to a rigid ring 123 for supporting the support/guide rod/cable 124, which again may double as a control ring and/or a reflective surface peripheral support ring (as illustrated). Note that this device may potentially be used not only to clean the reflective surface but also to polish it or to apply a new reflective coating (full surface or patches). Movement of the cleaning/conditioning apparatus 125 may be by a variety of means, for example with translating movement along the support/guide rod/cable 124 and rotation in azimuth by rotating the support/guide rod/cable 124 relative to the rigid ring 123.

In certain instances it may also be desirable to fully or partially deflate a balloon heliostat for maintenance, service, repairs, and/or conditioning.

In summary, the embodiments illustrated in FIGS. 41A through 41C each show a balloon heliostat, further comprising means for conditioning the reflective surface (where the word "conditioning" includes but is not limited to cleaning, conditioning, protecting, and renewing the reflective surface).

While some preferred embodiments of the invention have been discussed in detail above, it should be understood that further modifications, variations, and combinations of features from the described preferred embodiments can be made within the spirit and scope of the invention.

REFERENCES

1) L. M. Murphy, "Technical and Cost Benefits of Lightweight, Stretched-Membrane Heliostats", Solar Energy Research Institute Technical Report SERI/TR-253-1818, 1617 Cole Blvd, Golden, Colo. 80401, May 1983
2) D. J, Alpert et.al., Sandia National Laboratories, Albuquerque, N. Mex., "Status of Stretched-Membrane Heliostats", pp. 87–93 in SOLAR ENGINEERING 1990, The American Society of Mechanical Engineers, United Engineering Center, 345 East 47th St, New York, N.Y. 10017, April 1990

What is claimed is:

1. A heliostat, comprising a reflective surface with a reflective side and an other side, support means for supporting said reflective surface above a ground surface, said support means comprising an inflated base balloon supported by said ground surface and located between said ground surface and said other side of said reflective surface, and control means for rotationally orienting said reflective surface as a function of time so as to reflect incident solar radiation, falling on said reflective side of said reflective surface from a solar radiation incident direction which is a function of time, to a target region 2. The heliostat of claim 1, wherein said inflated base balloon is an inflated toroidal balloon.

3. The heliostat of claim 1, wherein said support means provide means for supporting said reflective surface above a ground surface.

4. The heliostat of claim 3, wherein said inflated base balloon is an inflated base balloon supported by said ground surface.

5. The heliostat of claim 1, wherein said inflated base balloon maintains a substantially constant shape configuration when said control means changes the orientation of said reflective surface.

6. The heliostat of claim 1, wherein said inflated base balloon maintains a substantially constant volume configuration when said control means changes the orientation of said reflective surface.

7. The heliostat of claim 1, wherein said inflated base balloon as a whole changes orientation along with said reflective surface, when said control means changes the orientation of said reflective surface, 8. The heliostat of claim 1, wherein said reflective surface is a mirror.

9. The heliostat of claim 1, wherein said reflective surface is a stretched membrane reflector.

10. The heliostat of claim 1, wherein said reflective surface is concave on its reflective side.

11. The heliostat of claim 3, wherein said support means further comprises support structure anchored in said ground surface.

12. The heliostat of claim 1, further comprising means for maintaining said reflective surface in a desired shape configuration.

13. The heliostat of claim 12, wherein said reflective surface is a reflective membrane and wherein said means for maintaining said reflective surface in a desired shape configuration comprises means for minimizing reflective membrane deflections.

14. The heliostat of claim 12, wherein said reflective surface is a reflective membrane and wherein said means for maintaining said reflective surface in a desired shape configuration is provided by said support means, which support means further comprises support structure means on the periphery of said reflective membrane for supporting said reflective membrane in tension.

15. The heliostat of claim 12, wherein said reflective surface is a reflective membrane, wherein said desired shape configuration of the reflective surface is concave on its reflective side, and wherein said means for maintaining said reflective surface in said desired shape configuration comprises means for providing differential pressure across said reflective surface, with pressure acting on the reflective surface other side being lower than pressure acting on the reflective surface reflective side.

16. The heliostat of claim 15, wherein said pressure acting on said reflective surface reflective side is ambient pressure, wherein said pressure acting on said reflective surface other side is sub-ambient pressure which is contained in an enclosed volume whose bounding surfaces include said reflective surface above said enclosed volume and a bottom surface below said enclosed volume.

17. The heliostat of claim 12, wherein said reflective surface is a reflective membrane, wherein said desired shape configuration of the reflective surface is concave on its reflective side, and wherein said means for maintaining said reflective surface in said desired shape configuration comprises membrane shaping tether elements.

18. The heliostat of claim 12, wherein said support means for supporting said reflective surface also incorporates said means for maintaining said reflective surface in a desired shape configuration.

19. The heliostat of claim 1, further comprising internal tether means within said inflated base balloon for affecting the shape of said inflated base balloon.

20. The heliostat of claim 1, wherein said inflated base balloon comprises an inflated volume enclosed by plural enclosing surface elements, with adjacent enclosing surface elements attached to each other along seam lines.

21. The heliostat of claim 1, further comprising means for varying the gas pressure in said inflated base balloon.

22. The heliostat of claim 4, wherein said support means further comprises additional support means for contributing to the support of said reflective surface above said base balloon.

23. The heliostat of claim 22, wherein said additional support means comprises an inflated toroidal balloon.

24. The heliostat of claim 22, wherein said additional support means includes a substantially rigid structure of substantially toroidal topology for supporting said reflective surface around its periphery.

25. The heliostat of claim 1, wherein said inflated base balloon includes multiple related inflated chambers.

26. The heliostat of claim 3, further comprising hydrostatic support means for contributing to the support of said reflective surface above said ground surface.

27. The heliostat of claim 3, further comprising aerostatic support means for contributing to the support of said reflective surface above said ground surface.

28. The heliostat of claim 1, with means for inflating said inflated base balloon with a lighter-than-air gas.

29. The heliostat of claim 23 wherein said support means further comprises means for securing said reflective surface around its periphery to said toroidal balloon.

30. The heliostat of claim 1, wherein said inflated base balloon is an elongated approximately linear balloon, and wherein said control means for rotationally orienting said reflective surface provides means for orienting said reflective surface in a single degree of freedom.

31. The heliostat of claim 1, wherein said control means for rotationally orienting said reflective surface provides means for orienting said reflective surface in two degrees of freedom.

32. The heliostat of claim 31, wherein said two degrees of freedom are elevation angle and azimuth angle.

33. The heliostat of claim 1, wherein said control means for rotationally orienting said reflective surface includes at least one controllable positioning motor.

34. The heliostat of claim 1, wherein said control means for rotationally orienting said reflective surface includes an elongated control element and means for controlling effective length of the elongated control element.

35. The heliostat of claim 34, wherein said elongated control element is a control tether.

36. The heliostat of claim 34, wherein said elongated control element is a control rod.

37. The heliostat of claim 3, wherein said control means for rotationally orienting said reflective surface includes at least three elongated control elements, which elongated control elements provide tension links between substantially rigid structure to which said reflective surface is connected, on the first hand, and base elements affixed to said ground surface, on the other hand.

38. The heliostat of claim 37, wherein said substantially rigid structure comprises a substantially rigid control ring.

39. The heliostat of claim 37, further comprising an inflated toroidal balloon, and wherein said substantially rigid structure comprises said inflated toroidal balloon in combination with a plurality of balloon holding frames distributed around the outer periphery of said inflated toroidal balloon and pressed against said inflated toroidal balloon by means of circumferential tension bands.

40. The heliostat of claim 37, with load distribution means for distributing tensile loads from each of said elongated control elements to at least two locations on said substantially rigid structure.

41. The heliostat of claim 1, wherein said control means for rotationally orienting said reflective surface includes computer means for computing the required orientation of said heliostat as a function of time.

42. The heliostat of claim 1, wherein said control means for rotationally orienting said reflective surface is calibrated by calibration means for precisely calibrating the orientation of said heliostat.

43. The heliostat of claim 1, further comprising means for maintaining said reflective surface in good condition.

44. The heliostat of claim 29, wherein said inflated toroidal balloon exerts outward inflation-induced forces tending to maintain said reflective surface in tension.

45. The heliostat of claim 44, wherein said reflective surface is a reflective membrane, wherein a second membrane in tension is also secured around its periphery to said toroidal balloon, and wherein means are provided between said reflective membrane and said second membrane for causing said reflective membrane to deflect to a shape which is concave on the reflective side of said reflective membrane.

46. The heliostat of claim 1, further comprising damping means for damping motions of said reflective surface.

47. The heliostat of claim 1, wherein a solar receiver is located substantially at said target region.

48. The heliostat of claim 47, wherein the solar receiver is attached to the heliostat, wherein the reflective surface is maintained in a configuration which is concave on said reflective side and wherein the area of the target region is substantially smaller than the reflective area of the reflective surface.

49. A solar power concentration apparatus comprising a solar receiver located at a target region and a plurality of heliostats, wherein at least some of said plurality of heliostats are balloon supported heliostats, which balloon supported heliostats each comprises a reflective surface with a reflective side and an other side, support means for supporting said reflective surface above a ground surface, said support means comprising an inflated base balloon supported by said ground surface and located between said ground surface and said other side of said reflective surface, and control means for rotationally orienting said reflective surface as a function of time so as to reflect incident solar radiation, falling on said reflective side of said reflective surface from a solar radiation incident direction which is a function of time, to said target region.

50. The solar power concentration apparatus of claim 49, wherein said balloon supported heliostats are arranged in an orderly pattern above said ground surface, and wherein elements of said control means associated with neigboring heliostats are secured to the ground surface at common points in the interstices of said orderly pattern.

51. The solar power concentration apparatus of claim 49, wherein said solar receiver is upheld at a specific position above said plurality of heliostats.

52. The solar power concentration apparatus of claim 51, wherein said solar receiver is upheld at least partially by aerostatic lift.

53. The solar power concentration apparatus of claim 49, wherein said plurality of heliostats reflect incident solar radiation onto said solar receiver, causing said solar receiver to receive a concentrated solar energy flux, which concentrated solar energy flux heats a working fluid passing through the solar receiver to a high temperature.

54. The solar power concentration apparatus of claim 53, further provided with means for storing heat.

55. The solar power concentration apparatus of claim 53 wherein said solar power concentration apparatus is sited close to locations having deposits of oil shale, further provided with means for utilizing said high temperature working fluid to provide a heat source for retorting said oil shale to extract oil.

56. The solar power concentration apparatus of claim 49, wherein said solar power concentration apparatus is a solar thermal powerplant, which solar thermal powerplant further comprises conversion means for converting at least a portion of solar power received at said solar receiver into electric power.

57. The solar power concentration apparatus of claim 56, further comprising energy storage means for receiving electric power from said conversion means over some time period, storing the energy received over a second time period, and finally transmitting stored energy as electric power over a third time period.

58. The solar power concentration apparatus of claim 56, further comprising two bodies of water at different elevations, pump means for using electric power from said solar power concentration apparatus to pump some water from the lower body of water to the upper body of water when excess solar electric power is being produced relative to electric power consumption, and generator means for generating electric power from the passage of some water from the upper body of water to the lower body of water at times when insufficient solar electric power is being produced relative to electric power consumption.

59. The solar power concentration apparatus of claim 49, further comprising means for moving the solar receiver as a function of time, 60. The heliostat of claim 4, wherein said base balloon executes a rolling motion on said ground surface when said control means changes the orientation of said reflective surface.

61. Solar electric power apparatus for providing electric power to consumers of electric power, comprising:
(i) a plurality of heliostats each comprising a reflective surface with a reflective side and an other side, support means for supporting said reflective surface above a ground surface, said support means comprising an inflated base balloon supported by said ground surface and located between said ground surface and said other side of said reflective surface, and control means for rotationally orienting said reflective surface as a function of time so as to reflect incident solar radiation, falling on said reflective side of said reflective surface from a solar radiation incident direction which is a function of time, to a solar receiver located at a target region;
(ii) generation means for converting at least a portion of solar power carried by the solar radiation reflected by the heliostats to the solar receiver into electric power;
and
(iii) means for transmitting the electric power from the generation means, through conditioning means for conditioning the electric power, to the consumers of electric power.

* * * * *